US011860031B2

United States Patent
Kwon et al.

(10) Patent No.: US 11,860,031 B2
(45) Date of Patent: Jan. 2, 2024

(54) MINIATURIZED, LIGHT-ADAPTIVE, WIRELESS DOSIMETER SYSTEMS FOR AUTONOMOUS MONITORING OF ELECTROMAGNETIC RADIATION EXPOSURE AND APPLICATIONS OF SAME

(71) Applicant: NORTHWESTERN UNIVERSITY, Evanston, IL (US)

(72) Inventors: Kyeongha Kwon, Evanston, IL (US); Seung Yun Heo, Evanston, IL (US); Anthony R. Banks, Evanston, IL (US); John A. Rogers, Wilmette, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 17/623,935

(22) PCT Filed: Jul. 2, 2020

(86) PCT No.: PCT/US2020/040622
§ 371 (c)(1),
(2) Date: Dec. 30, 2021

(87) PCT Pub. No.: WO2021/003344
PCT Pub. Date: Jan. 7, 2021

(65) Prior Publication Data
US 2022/0364914 A1 Nov. 17, 2022

Related U.S. Application Data

(60) Provisional application No. 62/870,256, filed on Jul. 3, 2019.

(51) Int. Cl.
*G01J 1/42* (2006.01)
*G01J 1/02* (2006.01)
*G01J 1/46* (2006.01)

(52) U.S. Cl.
CPC ............. *G01J 1/429* (2013.01); *G01J 1/0204* (2013.01); *G01J 1/46* (2013.01)

(58) Field of Classification Search
CPC .. G01J 1/429; G01J 1/0204; G01J 1/46; G01J 2001/4406; G01J 2001/446; G01J 1/4204; G01J 1/4228; G01J 3/0235; G01T 1/02
See application file for complete search history.

(56) References Cited

U.S. PATENT DOCUMENTS

| 4,963,747 A | * | 10/1990 | Thacker | .................. G01T 1/185 250/389 |
| 4,970,391 A | * | 11/1990 | Uber, III | ................. H01J 47/02 250/374 |

(Continued)

OTHER PUBLICATIONS

Korean Intellectual Property Office (ISR/KR), "International Search Report for PCT/US2020/040622", Korea, dated Oct. 30, 2020.

(Continued)

*Primary Examiner* — David P Porta
*Assistant Examiner* — Djura Malevic
(74) *Attorney, Agent, or Firm* — Locke Lord LLP; Tim Tingkang Xia, Esq.

(57) ABSTRACT

A system for measuring a radiant exposure of electromagnetic radiation includes an accumulation detection module having a detector and configured to continuously monitor an electromagnetic radiation received by the detector; and an adaptive circuit configured to periodically interrogate the accumulation detection module; adjust a frequency of interrogation of the accumulation detection module based on an intensity of the electromagnetic radiation received by the detector; and autonomously transmit information related to an amount of the electromagnetic radiation received by the detector to a remote device.

44 Claims, 30 Drawing Sheets

(56) References Cited

U.S. PATENT DOCUMENTS

| | | | | |
|---|---|---|---|---|
| 5,434,419 | A * | 7/1995 | Decupper | A61L 2/24<br>250/492.1 |
| 5,500,532 | A * | 3/1996 | Kozicki | G01J 1/429<br>250/336.1 |
| 5,659,296 | A * | 8/1997 | Debe | A62B 18/088<br>128/206.17 |
| 5,666,949 | A * | 9/1997 | Debe | A62B 18/088<br>116/206 |
| 6,320,969 | B1 * | 11/2001 | Killion | H04R 25/305<br>340/636.15 |
| 6,353,324 | B1 * | 3/2002 | Uber, III | G01R 19/2509<br>324/457 |
| 6,414,318 | B1 * | 7/2002 | Uber, III | G01R 19/2509<br>250/389 |
| 6,453,051 | B1 * | 9/2002 | Killion | H04R 25/60<br>340/626 |
| 6,704,424 | B2 * | 3/2004 | Killion | H04R 25/305<br>381/323 |
| 6,747,278 | B1 * | 6/2004 | Campione | G01T 1/185<br>250/389 |
| 7,157,715 | B1 * | 1/2007 | Crain, Jr. | G01T 1/026<br>250/370.07 |
| 7,223,979 | B1 * | 5/2007 | Crain, Jr. | G01T 1/026<br>250/370.07 |
| 7,616,110 | B2 * | 11/2009 | Crump | A61B 5/1117<br>600/300 |
| 7,836,771 | B2 * | 11/2010 | Killion | H03G 3/32<br>73/647 |
| 8,378,811 | B2 * | 2/2013 | Crump | G08B 21/0446<br>128/903 |
| 8,618,930 | B2 * | 12/2013 | Papadopoulos | A61B 5/1117<br>340/539.11 |
| 9,068,887 | B1 * | 6/2015 | Bennouri | G01W 1/02 |
| 9,222,827 | B2 * | 12/2015 | Killion | G01H 3/14 |
| 9,502,155 | B2 * | 11/2016 | Lustig | H01B 7/29 |
| 9,618,635 | B2 * | 4/2017 | Fechner | H01L 27/11517 |
| 10,101,828 | B2 * | 10/2018 | Kaplan | G06F 1/3262 |
| 10,132,680 | B1 * | 11/2018 | Isikman | G01J 1/18 |
| 10,264,999 | B2 * | 4/2019 | Lacirignola | A61B 5/125 |
| 10,527,490 | B2 * | 1/2020 | Dumont | G06F 1/1632 |
| 10,660,542 | B2 * | 5/2020 | Greene | A61B 5/064 |
| 11,353,361 | B2 * | 6/2022 | Dumont | G01J 1/0488 |
| 2003/0071222 | A1 * | 4/2003 | Harvey | H01J 37/244<br>250/397 |
| 2005/0230598 | A1 * | 10/2005 | Hopkins | G01J 1/02<br>250/208.1 |
| 2006/0197753 | A1 * | 9/2006 | Hotelling | G06F 1/169<br>345/173 |
| 2007/0012965 | A1 * | 1/2007 | Sandvik | H01L 27/14618<br>257/292 |
| 2007/0214893 | A1 * | 9/2007 | Killion | H04R 3/00<br>702/191 |
| 2009/0147215 | A1 * | 6/2009 | Howell | G01J 1/0271<br>250/206 |
| 2009/0273444 | A1 * | 11/2009 | Brown | H04Q 9/00<br>340/10.1 |
| 2010/0187426 | A1 * | 7/2010 | Young | G01J 1/0209<br>250/370.07 |
| 2011/0056299 | A1 * | 3/2011 | Killion | H04R 29/001<br>73/647 |
| 2013/0341522 | A1 * | 12/2013 | Fechner | H01L 31/02005<br>250/336.1 |
| 2014/0155705 | A1 * | 6/2014 | Papadopoulos | A61B 5/1112<br>600/301 |
| 2015/0177063 | A1 * | 6/2015 | Lian | G06F 1/163<br>250/372 |
| 2016/0042835 | A1 * | 2/2016 | Lustig | H05K 9/0084<br>174/105 R |
| 2016/0131518 | A1 * | 5/2016 | Killion | H04R 3/00<br>381/57 |
| 2016/0305819 | A1 * | 10/2016 | Lian | G01J 1/429 |
| 2018/0140233 | A1 * | 5/2018 | Lacirignola | A61B 5/6814 |
| 2018/0224326 | A1 * | 8/2018 | Dumont | G01J 1/0271 |
| 2018/0271401 | A1 * | 9/2018 | Greene | A61B 5/0507 |
| 2018/0274973 | A1 * | 9/2018 | Rogers | G01J 5/10 |
| 2019/0204146 | A1 * | 7/2019 | Wei | G01J 1/0219 |
| 2019/0357277 | A1 * | 11/2019 | Park | H04B 7/26 |
| 2019/0369075 | A1 * | 12/2019 | Schwartz | G01N 27/127 |
| 2021/0398338 | A1 * | 12/2021 | Philion | G06V 20/58 |
| 2022/0061767 | A1 * | 3/2022 | Goldstein | H04R 1/1025 |
| 2023/0010742 | A1 * | 1/2023 | Troxler | G01S 5/0294 |
| 2023/0011644 | A1 * | 1/2023 | Zhao | A61B 6/54 |

OTHER PUBLICATIONS

Heo et al. Wireless, battery-free, flexible, miniaturized dosimeters monitor exposure to solar radiation and to light for phototherapy, Science Translational Medicine, vol. 10, No. 470, pp. 1-12, Dec. 5, 2018.

Kwon et al., Miniaturized, light-adaptive, wireless dosimeters autonomously monitor exposure to electromagnetic radiation, Science Advances, vol. 5, No. 12, pp. 1-9, Dec. 13, 2019.

A. C. Green, S. C. Wallingford, P. McBride, Childhood exposure to ultraviolet radiation and harmful skin effects: epidemiological evidence. Progress in Biophysics and Molecular Biology 107, 349-355 (2011).

B. K. Armstrong, A. Kricker, The epidemiology of UV induced skin cancer. J. Photochemistry and Photobiology B: Biology 63, 8-18 (2001).

J. D'Orazio, S. Jarrett, A. Amaro-Ortiz, T. Scott, UV radiation and the skin. Int. J. Molecular Sci. 14, 12222-12248 (2013).

G. P. Guy Jr, S. R. Machlin, D. U. Ekwueme, K. R. Yabroff, Prevalence and costs of skin cancer treatment in the US, 2002-2006 and 2007-2011. American J. Preventive Med. 48, 183-187 (2015).

F. Liebel, S. Kaur, E. Ruvolo, N. Kollias, M. D. Southall, Irradiation of skin with visible light induces reactive oxygen species and matrix-degrading enzymes. J. Investigative Dermatology 132, 1901-1907 (2012).

Y. Nakashima, S. Ohta, A. M. Wolf, Blue light-induced oxidative stress in live skin. Free Radical Biology and Med. 108, 300-310 (2017).

C. Regazzetti, L. Sormani, D. Debayle, F. Bernerd, M. K. Tulic, G. M. De Donatis, B. Chignon-Sicard, S. Rocchi, T. Passeron, Melanocytes sense blue light and regulate pigmentation through opsin-3. J. Investigative Dermatology 138, 171-178 (2018).

W. Noell, W. Walker, B. Kang, S. Berman, Retinal damage by visible light. Invest Ophthalmol 5, 450-473 (1966).

W. K. Noell, Possible mechanisms of photoreceptor damage by light in mammalian eyes. Vision Res. 20, 1163-1171 (1980).

F. Behar-Cohen, C. Martinsons, F. Viénot, G. Zissis, A. Barlier-Salsi, J. P. Cesarini, O. Enouf, M. Garcia, S. Picaud, D. Attia, Light-emitting diodes (LED) for domestic lighting: Any risks for the eye? Progress in Retinal and Eye Res. 30, 239-257 (2011).

A. King, E. Gottlieb, D. G. Brooks, M. P. Murphy, J. L. Dunaief, Mitochondria-derived reactive oxygen species mediate blue light-induced death of retinal pigment epithelial cells. Photochemistry and Photobiology 79, 470-475 (2004).

B. F. Godley, F. A. Shamsi, F. Q. Liang, S. G. Jarrett, S. Davies, M. Boulton, Blue light induces mitochondrial DNA damage and free radical production in epithelial cells. J. Biological Chemistry 280, 21061-21066 (2005).

C. I. Eastman, Natural summer and winter sunlight exposure patterns in seasonal affective disorder. Physiology & Behavior 48, 611-616 (1990).

Y. Shi, M. Manco, D. Moyal, G. Huppert, H. Araki, A. Banks, H. Joshi, R. McKenzie, A. Seewald, G. Griffin, E. Sen-Gupta, D. Wright, P. Bastien, F. Valceschini, S. Seité, J. A. Wright, R. Ghaffari, J. Rogers, G. Balooch, R. M. Pielak, Soft, stretchable, epidermal sensor with integrated electronics and photochemistry for measuring personal UV exposures. PloS one 13, e0190233 (2018).

J. Heydenreich, H. C. Wulf, Miniature personal electronic UVR dosimeter with erythema response and time-stamped readings in a wristwatch. Photochemistry and Photobiology 81, 1138-1144 (2005).

S. Y. Heo, J. Kim, P. Gutruf, A. Banks, P. Wei, R. Pielak, G. Balooch, Y. Shi, H. Araki, D. Rollo, C. Gaede, M. Patel, J. W. Kwak, A. E.

(56) References Cited

OTHER PUBLICATIONS

Peña-Alcántara, K.-T. Lee, Y. Yun, J. K. Robinson, S. Xu, J. A. Rogers, Wireless, battery-free, flexible, miniaturized dosimeters monitor exposure to solar radiation and to light for phototherapy. Sci. Transl. Med. 10, eaau1643 (2018).

A. Magnusson, D. Boivin, Seasonal affective disorder: an overview. Chronobiology Int. 20, 189-207 (2003).

G. Glickman, B. Byrne, C. Pineda, W. W. Hauck, G. C. Brainard, Light therapy for seasonal affective disorder with blue narrow-band light-emitting diodes (LEDs). Biological Psychiatry 59, 502-507 (2006).

D. F. Kripke, Light treatment for nonseasonal depression: speed, efficacy, and combined treatment. J. Affective Disorders 49, 109-117 (1998).

C. E. Remé, A. Wirz-Justice, M. Terman, The visual input stage of the mammalian circadian pacemaking system: I. Is there a clock in the mammalian eye? J. Biological Rhythms 6, 5-29 (1991).

A. Wirz-Justice, P. Graw, K. Kräuchi, A. Sarrafzadeh, J. English, J. Arendt, L. Sand, 'Natural' light treatment of seasonal affective disorder. J. Affective Disorders 37, 109-120 (1996).

\* cited by examiner

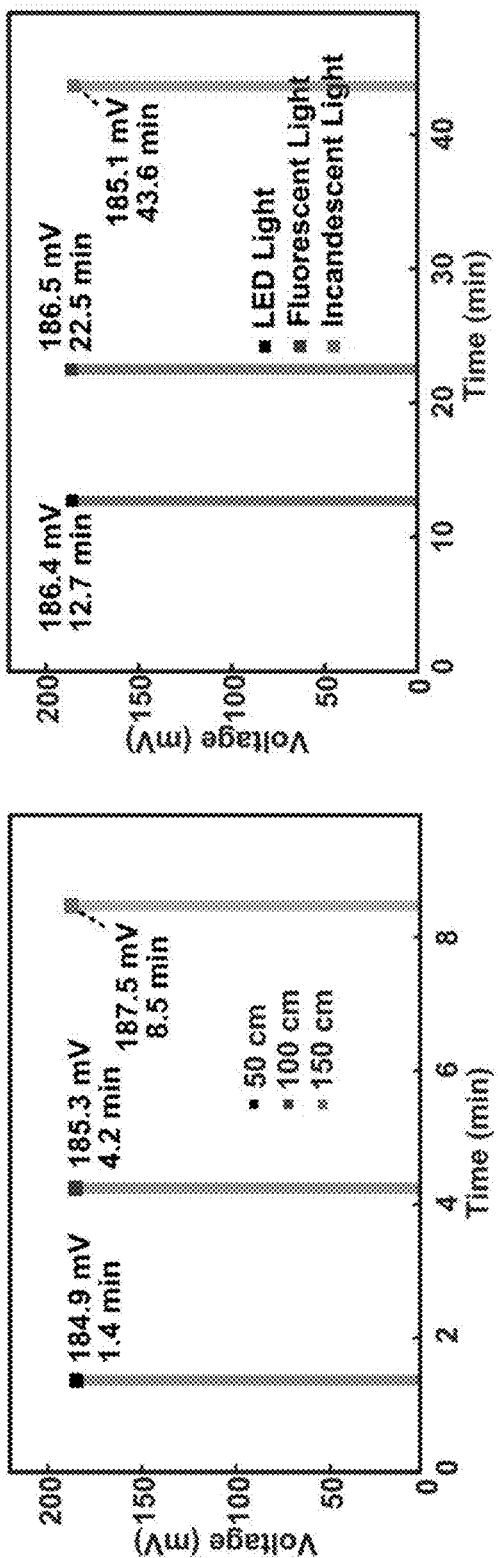
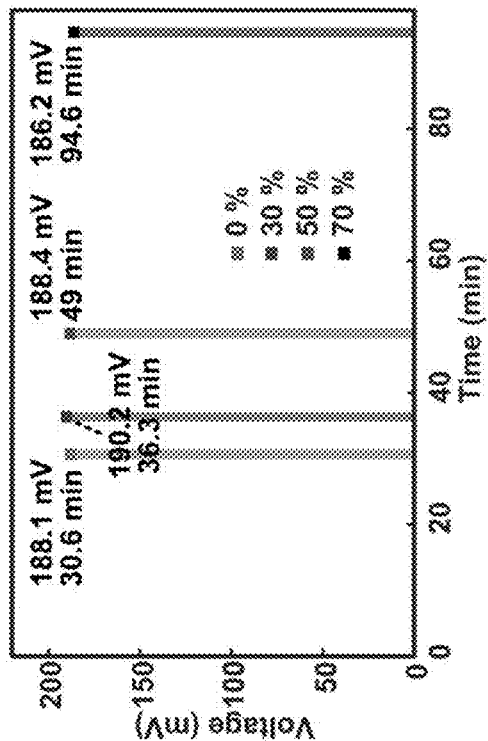
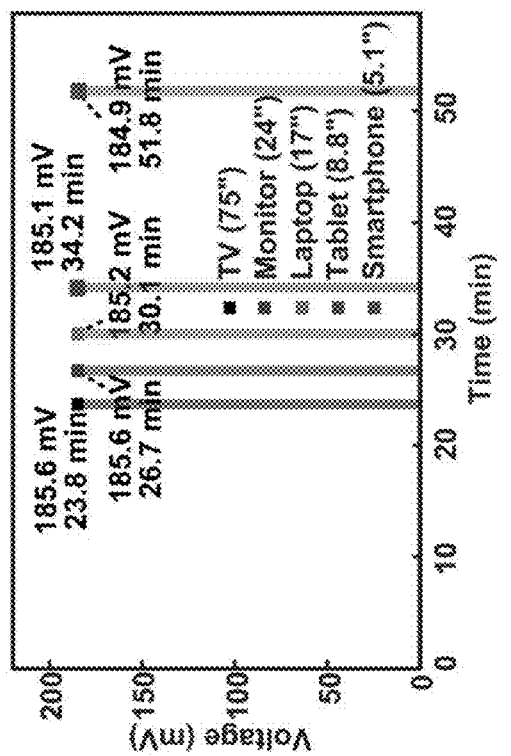
FIG. 4D
FIG. 4E
FIG. 4F
FIG. 4G

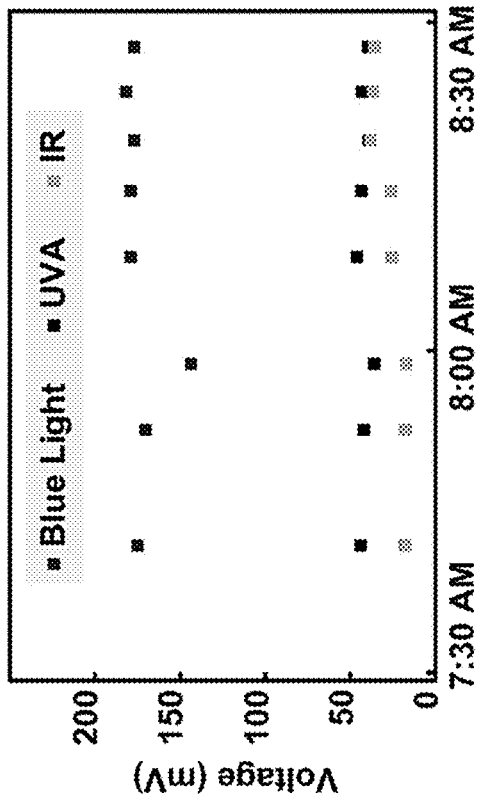
*FIG. 6E*
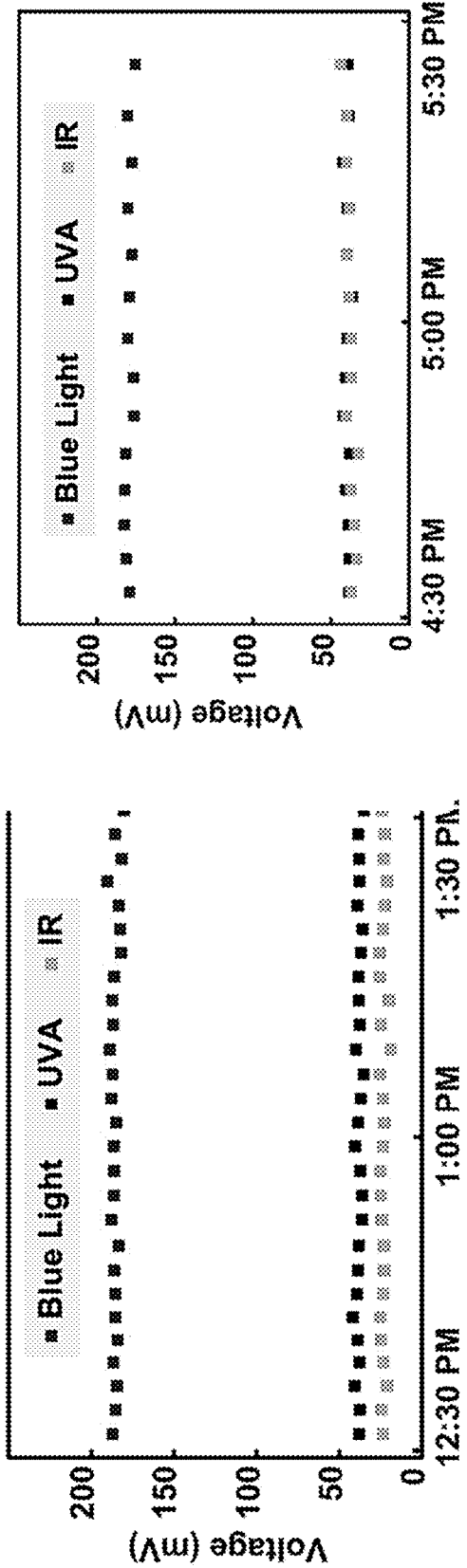
*FIG. 6G*
*FIG. 6F*

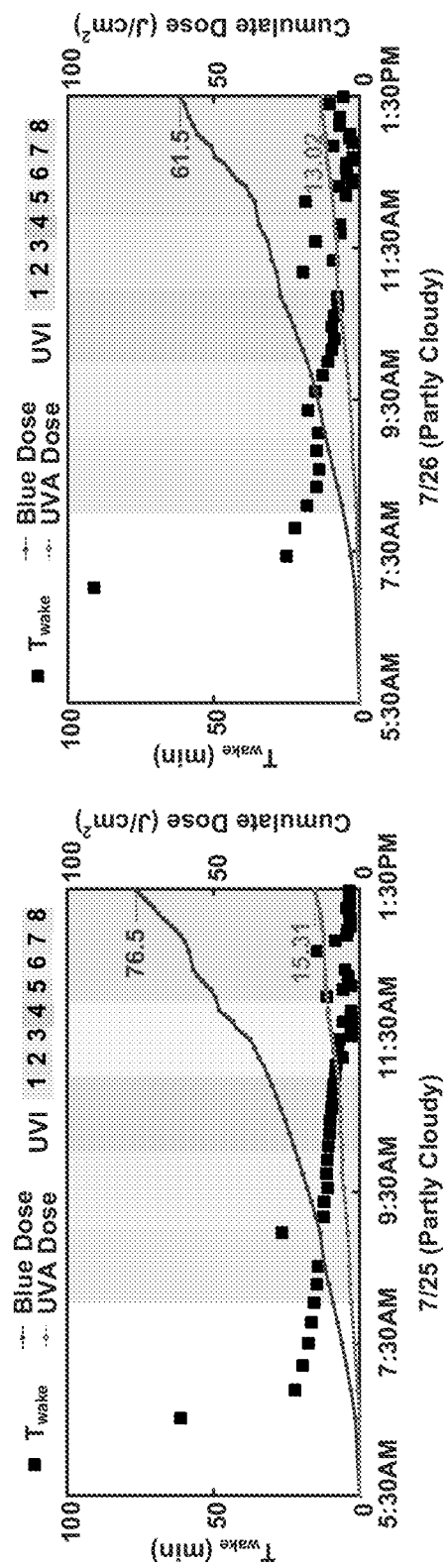
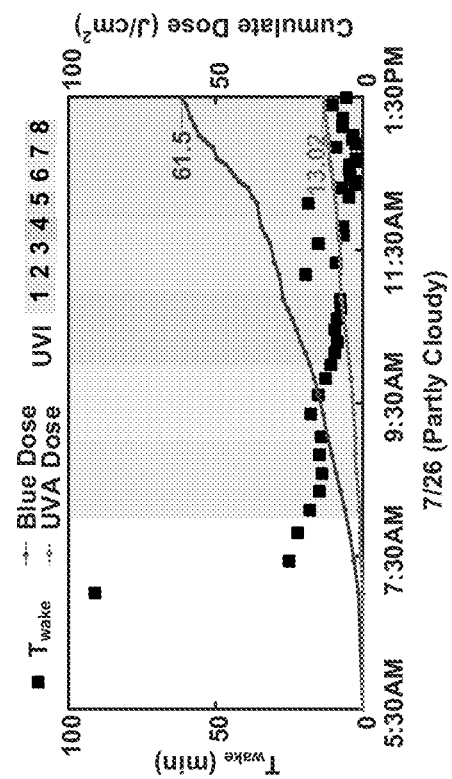
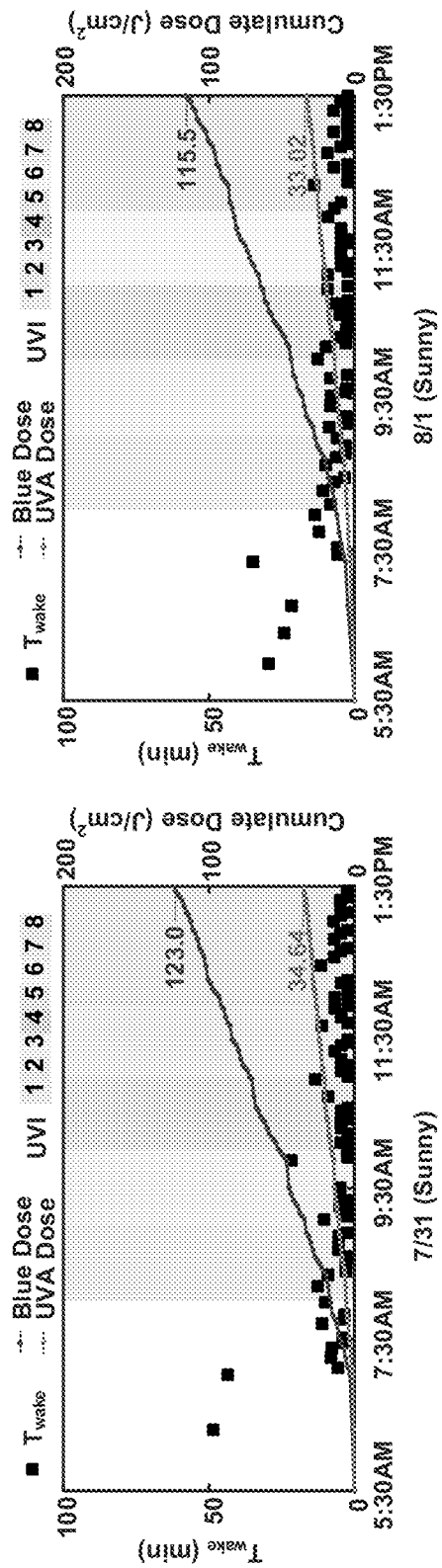
FIG. 14A
FIG. 14B
FIG. 14C
FIG. 14D

MINIATURIZED, LIGHT-ADAPTIVE, WIRELESS DOSIMETER SYSTEMS FOR AUTONOMOUS MONITORING OF ELECTROMAGNETIC RADIATION EXPOSURE AND APPLICATIONS OF SAME

CROSS-REFERENCE TO RELATED PATENT APPLICATIONS

This application claims priority to and the benefit of U.S. Provisional Patent Application No. 62/870,256, filed Jul. 3, 2019, and PCT Patent Application No. PCT/US2020/012241, filed Jan. 3, 2020, which itself claims priority to and the benefit of U.S. Provisional Patent Application No. 62/787,964, filed Jan. 3, 2019, which are incorporated herein in their entireties by reference.

FIELD OF THE INVENTION

The invention relates generally to biosensors, and more particularly, to miniaturized, light-adaptive, wireless dosimeter systems for autonomous monitoring of electromagnetic radiation exposure and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Accurate measurement of the exposure of a person, animal, plant or object to ultraviolet (UV), visible and infrared light is important for clinical, agricultural and environmental purposes. Digital electronic sensing technology provides an accurate and versatile means for determining exposure to UV, visible and infrared light. However, many traditional approaches require bulky, expensive devices comprising integrated circuits, detectors, batteries, memory, display panels and power management systems. Other conventional systems, such as wearable dosimeters devices employing NFC technology for readout and/or power, may involve (or require) frequent interaction (e.g., scanning of the device with an NFC reader) by the user in order to reset the device, prevent data loss, address power requirements, etc. Accordingly, such systems are not always practical for certain applications, such as those requiring continuous monitoring for long periods of time.

Therefore, a heretofore unaddressed need exists in the art to address the aforementioned deficiencies and inadequacies.

SUMMARY OF THE INVENTION

In one aspect, the invention relates to a system for measuring a radiant exposure of electromagnetic radiation. The system in one embodiment includes an accumulation detection module (AMD) configured to continuously monitor an exposure dose of the electromagnetic radiation, a system-powered transmission component configured to transmit exposure dose information to a remote device; and an adaptive circuit in electrical communication with the ADM and the system-powered transmission component and configured to periodically interrogate the ADM and adjust a frequency of interrogation of the AMD based on intensity of the electromagnetic radiation received by the detector.

The AMD comprises a detector configured to receive the electromagnetic radiation and generate a current responsively; an accumulation component connected in parallel to the detector and configured to receive the current generated by the detector and store electric charges corresponding to the generated current; and a discharge component connected in parallel to the detector and the accumulation component and configured to operably discharge the electric charges stored in the accumulation component.

The adaptive circuit comprises a trigger component configured to monitor a voltage across the accumulation component and generate a wake up signal when the voltage is equal to or greater than a predefined threshold voltage; at least one analog to digital converter (ADC) configured to translate the voltage into a digital input; and a processor configured to receive the wake up signal from the trigger component and in response, interrogate the voltage of the AMD via said at least one ADC; translate the digital output from said at least one ADC into the exposure dose information; transmit the exposure dose information to a remote device via the system-powered transmission component; and discharge the accumulation component via the discharge component.

In one embodiment, the detector comprises at least one photodiode.

In one embodiment, the accumulation component comprises at least one capacitor.

In one embodiment, the discharge component comprises at least one transistor.

In one embodiment, the trigger component comprises at least one comparator.

In one embodiment, the ADM is configured to independently monitor the exposure dose of two or more wavelength ranges of the electromagnetic radiation. In one embodiment, said at least one photodiode comprises a plurality of photodiodes, each being responsive to a respective wavelength range of the electromagnetic radiation, wherein the ADM comprises a plurality of channels, each channel having a respective one of the plurality of photodiodes for measuring the exposure dose of said respective wavelength range of the electromagnetic radiation, and is coupled with the adaptive circuit so as to provide integration and/or transmission of the exposure dose. In one embodiment, said two or more wavelength ranges of the electromagnetic radiation are selected from a UVA region, a UVB region, an UV region, a visible region, an infrared (IR) region, and any combinations of them.

In one embodiment, the ADM is configured to monitor the exposure dose of the electromagnetic radiation corresponding to two or more intensity domains. In one embodiment, said two or more intensity domains correspond to an outdoor intensity domain and an indoor intensity domain. In one embodiment, the ADM comprises an outdoor ADM and an indoor ADM for monitoring exposure dose of the electromagnetic radiation outdoors and indoors, respectively, coupled with the adaptive circuit so as to provide integration and/or transmission of the exposure dose, wherein said at least one photodiode comprises a plurality of photodiodes, and the outdoor ADM has one of the plurality of photodiodes, and the indoor ADM has the remaining photodiodes arranged in parallel. In one embodiment, the indoor ADM and the outdoor ADM are paired with a UVA photodiode and a switch coupled with the adaptive circuit for operably switching the system between the indoor ADM and the outdoor ADM, based on the presence or absence of UVA radiation, wherein the presence or absence of the UVA radiation results in a high or low value of an output from the UVA photodiode, respectively.

In one embodiment, the adaptive circuit is configured to switch the system between a sleep mode, wherein when the system is in the sleep mode, the system operates at a first average current consumption; and a wake mode, wherein when the system is in the wake mode, the system operates at a second average current consumption, wherein the second average current consumption is greater than the first average current consumption.

In one embodiment, the second average current consumption is at least 2 times the first average current consumption. In one embodiment, the second average current consumption is not greater than 15 μA and the first average current consumption is not greater than 1 μA. In one embodiment, the system is configured to transmit the exposure dose information to the remote device only when the system is in the wake mode. In one embodiment, the system is configured to transmit exposure dose information each time when the system switches to the wake mode.

In one embodiment, the system-powered transmission component is powered by one or more on-board batteries. In one embodiment, the one or more batteries are wiredly or wirelessly rechargeable batteries.

In one embodiment, the system-powered transmission component comprises a wireless transmission component. In one embodiment, the system-powered transmission component comprises a Bluetooth® low energy (BLE) component.

In one embodiment, the system is configured as a wearable dosimetry sensor, a skin-mounted dosimetry sensor, a millimeter-scale dosimetry sensor, an autonomous dosimetry sensor, and/or a system-powered dosimetry sensor.

In another aspect, the invention relates to a system for measuring a radiant exposure of electromagnetic radiation comprising an ADM comprising a detector and configured to continuously monitor an electromagnetic radiation received by the detector; and an adaptive circuit configured to periodically interrogate the ADM; adjust a frequency of interrogation of the ADM based on an intensity of the electromagnetic radiation received by the detector; and autonomously transmit information related to an amount of the electromagnetic radiation received by the detector to a remote device.

In one embodiment, the ADM further comprises an accumulation component configured to accumulate the information related to the amount of the electromagnetic radiation received by the detector; and a discharge component configured to erase the information accumulated in the accumulation component when the information is transmitted to the remote device.

In one embodiment, the information accumulated in the accumulation component comprises an amount of electric charges that is directly proportional to an amount of the electromagnetic radiation received by the detector over a period of time.

In one embodiment, the detector comprises at least one photodiode.

In one embodiment, the accumulation component comprises at least one capacitor.

In one embodiment, the discharge component comprises at least one transistor configured to discharge the accumulation component.

In one embodiment, the ADM is configured to independently monitor two or more wavelength ranges of the electromagnetic radiation. In one embodiment, said at least one photodiode comprises a plurality of photodiodes, each being responsive to a respective wavelength range of the electromagnetic radiation, wherein the ADM comprises a plurality of channels, each channel having a respective one of the plurality of photodiodes for measuring an exposure dose of said respective wavelength range of the electromagnetic radiation, and is coupled with the adaptive circuit so as to provide integration and/or transmission of the exposure dose. In one embodiment, said two or more wavelength ranges of the electromagnetic radiation correspond to at least an UVA wavelength region and an UVB wavelength region.

In one embodiment, said two or more wavelength ranges of the electromagnetic radiation are selected from a UVA region, a UVB region, an UV region, a visible region, an IR region, and any combinations of them. In one embodiment, the plurality of photodiodes comprises an UV photodiode, a blue photodiode, and an IR photodiode.

In one embodiment, the ADM is configured to monitor the electromagnetic radiation corresponding to two or more intensity domains. In one embodiment, said two or more intensity domains correspond to an outdoor intensity domain and an indoor intensity domain. In one embodiment, the ADM comprises an outdoor ADM and an indoor ADM for monitoring exposure dose of the electromagnetic radiation outdoors and indoors, respectively, coupled with the adaptive circuit so as to provide integration and/or transmission of the exposure dose, wherein said at least one photodiode comprises a plurality of photodiodes, and the outdoor ADM has one of the plurality of photodiodes, and the indoor ADM has the remaining photodiodes arranged in parallel. In one embodiment, the indoor ADM and the outdoor ADM are paired with a UVA photodiode and a switch coupled with the adaptive circuit for operably switching the system between the indoor ADM and the outdoor ADM, based on the presence or absence of UVA radiation, wherein the presence or absence of the UVA radiation results in a high or low value of an output from the UVA photodiode, respectively. In one embodiment, a switch is a transistor.

In one embodiment, the adaptive circuit is configured to increase the frequency of interrogation based on an increase in the intensity of the electromagnetic radiation, or decrease the frequency of interrogation based on a decrease in the intensity of the electromagnetic radiation.

In one embodiment, the adaptive circuit is configured to switch the system between a sleep mode, wherein when the system is in the sleep mode, the system operates at a first average current consumption; and a wake mode, wherein when the system is in the wake mode, the system operates at a second average current consumption, wherein the second average current consumption is greater than the first average current consumption.

In one embodiment, the second average current consumption is at least 2 times the first average current consumption. In one embodiment, the second average current consumption is not greater than 15 μA and the first average current consumption is not greater than 1 μA.

In one embodiment, the system is configured to transmit exposure dose information to the remote device only when the system is in the wake mode. In one embodiment, the system is configured to transmit exposure dose information each time when the system switches to the wake mode.

In one embodiment, the accumulation component is configured to accumulate the information until it reaches a saturation limit, and the adaptive circuit comprises a trigger component configured to monitor the accumulation component as it accumulates the information; and generate a wake up signal when the information accumulated by the accumulation component reaches a predefined threshold level, wherein the threshold level is below the saturation limit.

In one embodiment, the trigger component is configured to monitor the accumulation component via an analog signal of the ADM.

In one embodiment, the analog signal is a voltage.

In one embodiment, the trigger component is configured to convert the analog signal of the ADM to a digital signal.

In one embodiment, the trigger component comprises a comparator.

In one embodiment, the adaptive circuit further comprises at least one ADC configured to receive an analog signal of the accumulation detection module; and a processor configured to interrogate the ADM via said at least one ADC to produce exposure dose output; and transmit the exposure dose output to the remote device.

In one embodiment, the system further comprises a system-powered transmission component in electrical communication with the adaptive circuit such that the exposure dose information is transmitted the remote device via the system-powered transmission component.

In one embodiment, the system-powered transmission component is a wireless transmission component. In one embodiment, the system-powered transmission component is a BLE component.

In one embodiment, the system-powered transmission component is powered by one or more on-board batteries. In one embodiment, the one or more batteries are wiredly or wirelessly rechargeable batteries.

In one embodiment, the system further comprises a temperature sensor, an accelerometer, a position sensor, humidity sensor, sweat sensor, acoustic sensor or any combination of these.

In one embodiment, the system is configured as a wearable dosimetry sensor, a skin-mounted dosimetry sensor, a millimeter-scale dosimetry sensor, an autonomous dosimetry sensor, and/or a system-powered dosimetry sensor.

In yet another aspect, the invention relates to a method for measuring a radiant exposure of electromagnetic radiation. The method in some embodiments includes (a) receiving the electromagnetic radiation; (b) accumulating exposure dose information of the electromagnetic radiation; (c) comparing the exposure dose information to a predefined threshold level; (d) generating a wake up signal when the exposure dose information is equal to or greater than the predefined threshold level; (e) transmitting, responsively to the wake up signal, the exposure dose information to a remote device; and (f) erasing the exposure dose information, and returning to a sleep mode and repeating steps (a)-(e) for continuously monitoring the radiant exposure of the electromagnetic radiation.

In one embodiment, the accumulating step is performed with an AMD comprising a detector for generating a current responsive to the exposure of the electromagnetic radiation; an accumulation component for receiving the generated current and storing a charge responsively; and a discharge component.

In one embodiment, the erasing step comprises discharging the accumulation component via the discharge component.

In one embodiment, the method further comprises, prior to the transmitting step, interrogating the exposure dose information from the AMD.

In one embodiment, the method further comprises repeating steps (a)-(b) when the exposure dose information is less than the predefined threshold level.

In a further aspect, the invention relates to a non-transitory tangible computer-readable medium storing instructions which, when executed by one or more processors, cause the method disclosed above to be performed.

These and other aspects of the invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 2A: Photograph of a blue light dosimeter with BLE communication capabilities on the tip of an index finger. The insets show bottom and side views. FIG. 2B: Circuit and block diagrams that illustrate accumulation mode, adaptive operation and wireless interface to smartphones (BLE radio). The accumulation detection module, photodiode, supercapacitor, MOSFET, and low-power comparator are labeled ADM, PD, SC, MOS, and LPCOMP, respectively. $V_{SC}$ and $V_{REF}$ denotes the accumulated voltage on SC and the reference voltage of LPCOMP, respectively. FIG. 2C: Illustration of $V_{SC}$ as a function of time during no light, weak light, and intense light exposure conditions, and activity of CPU and BLE radio at corresponding times. FIG. 2D: Schematic, exploded view illustration of the constituent layers and components: BLE System-on-Chip (SoC), battery, MOSFET (MOS), supercapacitor (SC), blue light photodetector (PD), copper interconnects (Cu/Pi/Cu), and chip antenna. FIG. 2E: Photographic image of three ultra-low power blue light dosimeters, next to respective batteries of capacities 140 mAh, 40 mAh, and 5.5 mAh (left to right). FIGS. 2F-2H: Photographs of encapsulated sensors mounted on a pair of glasses, an earring and a smart watch. Insets in FIG. 2H shows top and bottom views of the unencapsulated device.

FIG. 3A: Voltage outputs and current consumptions of an ultra-low power, blue light dosimeter (n=1) exposed to blue light over time with constant intensity at four different intensities corresponding to low and moderate blue light conditions outdoors. The time intervals ($T_{wake}$) to 'wake' the devices from a 'sleep' state when exposed to blue light with constant intensity of different levels are indicated. FIG. 3B: Average current consumption assuming continuous use ($I_{avg}$) and average current consumption assuming use corresponding to 50% of available daylight ($I_{avg, 50\%}$) as a function of $T_{wake}$. FIG. 3C:

Projected lifetime as a function of $T_{wake}$ for batteries of capacities 140 mAh, 40 mAh, and 5.5 mAh assuming use corresponding to 50% of available daylight: lifetime=battery capacity/$I_{avg,\ 50\%}$ FIGS. 4A-4G show indoor characterization of light-powered, accumulation mode detection blue light dosimeters, according to embodiments of the invention. FIG. 4A: Photograph of an indoor blue light dosimeter held between the fingertips. FIG. 4B: Schematic, exploded view illustration of the constituent layers and components: BLE SoC, battery, a MOSFET (MOS), SCs (×3), blue light PDs (×10), copper interconnects (Cu/Pi/Cu), and chip antenna. FIG. 4C: Circuit and block diagrams of the system and its wireless interface to BLE-enabled devices for blue light monitoring indoors. FIGS. 16D-16G: Voltage output and wake-up time interval of an indoor blue light dosimeter (n=1) placed at a distance of 50 cm, 100 cm, and 150 cm from a white light phototherapy lamp (FIG. 4D), at a distance of 50 cm from artificial light sources (FIG. 4E), at a distance of 10 cm from display screens (FIG. 4F), and at a distance of 5 cm away from a tablet display equipped with 0%, 30%, 50%, and 70% blue light blocking filter (FIG. 4G). The $T_{wake}$ values are labeled.

FIG. 5A: Photographic image of a blue light dosimeter with an automated sensitivity switching scheme to allow monitoring of low intensity blue light indoors and high intensity blue light outdoors. FIG. 5B: Circuit and block diagrams of the system with wireless switching scheme between outdoor and indoor sensing circuits based on the presence or absence of UVA irradiation. Blue light photodiode, MOSFET, supercapacitor, multiplexer, selection signal, the anode voltage of a UVA PD, and wake-up signal are labeled BL PD, MOS, SC, MUX, S, $V_{UVA}$, and WuS, respectively. FIG. 5C: Voltage and 1-bit flag ('0' for indoor and '1' for outdoor) outputs as a function of time without UVA exposure (blue) and with UVA exposure (yellow). FIG. 5D: Voltage and 1-bit flag outputs as a function of time with daylight outdoors (yellow) and with a 60-LED ring light source (blue).

FIGS. 6A-6G show multichannel system: dosimeters with capabilities for simultaneous measurements in the UVA, blue, and IR, according to certain embodiments of the invention.

FIG. 6A: Photograph of an ultra-low power, 3-channel, UVA/blue/IR light dosimeter held between the fingertips. FIG. 6B: Schematic, exploded view illustration of the constituent layers and components: the BLE system on a chip (BLE SoC), battery, MOSFETs (3×MOS), supercapacitors (3×SC), UVA photodetector (UVA PD), blue light PD, IR PD, copper interconnects (Cu/Pi/Cu), and chip antenna. FIG. 6C: Circuit and block diagrams of the adaptive, accumulation mode of detection and wireless interface to a remote BLE radio (i.e. smart phones). FIG. 6D: Photographs of a multichannel sensor mounted on ear phones. FIGS. 6E-6G: Measurements obtained from a UVA/blue/IR light dosimeter (n=1) as a function of time during morning (FIG. 6E), noon (FIG. 6F), and afternoon (FIG. 6G) hours in Evanston, Illinois on April, 2019.

FIG. 10A: Experimental setup for real-time current measurements on BLE blue light dosimeter. FIGS. 10B-10D: Screenshots of Power Profiler Kits (PPK) application for the real-time current measurements on blue light dosimeter in 'run' mode (FIG. 10B), 'sleep' mode (FIG. 10C), and 'idle' mode (FIG. 10D).

FIG. 11A: Average current consumption assuming continuous use ($I_{avg}$) and average current consumption assuming use corresponding to 50% of available daylight ($I_{avg,\ 50\%}$) in connected and advertising modes, as a function of $T_{wake}$ FIG. 11B: Projected lifetime as a function of $T_{wake}$ for batteries of capacities 5.5 mAh assuming use corresponding to 50% of available daylight in connected and advertising modes: lifetime=battery capacity/$I_{avg,\ 50\%}$ Advertising-mode devices in the 50% exposure to the available daylight at a constant intensity of 7.8 mW/cm$^2$ achievesx3.0 lifetime compared to connected mode devices with an expected lifetime of 0.4 years.

FIG. 12A: Voltage output of Indoor ADM with 1 SC and 3 SCs in series separately arranged in parallel to 10 blue PDs over time with constant intensity of blue light exposure. FIG. 12B: System-level leakage current of two dosimeters that incorporates 1 SC and 3 SCs in series. The leakage current is defined as measured current necessary to maintain applied SC voltage bias of 50 mV, 100 mV, 150 mV, 200 mV, 250 mV, and 300 mV. The error bars represent the standard deviation. FIG. 12C: Photographic image of a subject in front of a white light phototherapy lamp wearing an indoor blue light dosimeter. The inset shows device mounted on the nose bridge of glasses. FIG. 12D: Measured time intervals ($T_{wake}$) between 'wake-up' events as a function of exposure distance (d) away from a white light phototherapy lamp. Fit to a functional form for (d, $T_{wake}$ [d]): $T_{wake}$ [d]=$T_{wake}$ [50 cm]×(d/50 cm)$^2$. FIG. 12E: Measured time intervals ($T_{wake}$) between 'wake-up' events as a function of % attenuation associated with a blue light blocking filter on a digital display. A tablet screen with blue light blocking filter with attenuation of 0%, 30%, 50%, and 70% as a source of exposure to an indoor blue light dosimeter placed 5 cm away from the screen to extrapolate $T_{wake}$. Fit to a functional form for (%, $T_{wake}$[%]): $T_{wake}$ [%]=$T_{wake}$ [0]/(100−%)*100. FIG. 12F: Measured time intervals ($T_{wake}$) between 'wake-up' events with and without anti-blue light film. Here, a smartphone screen with and without anti-blue light film as a source of exposure to an indoor blue light dosimeter placed 5 cm away from the screen.

FIGS. 14A-14D show respectively daily outdoor exposure over two cloudy days (July 25-July 26; Evanston, IL) and two sunny days (July 31-August 1; Evanston, IL) from 5:30 AM to 1:30 PM using a 2-channel blue/UVA dosimeter, according to embodiments of the invention. The cumulate doses of UVA/blue light over testing periods are labeled. Hourly UV index (UVI) provided by the Environmental Protection Agency (EPA).

DETAILED DESCRIPTION OF THE INVENTION

Figure 1A:
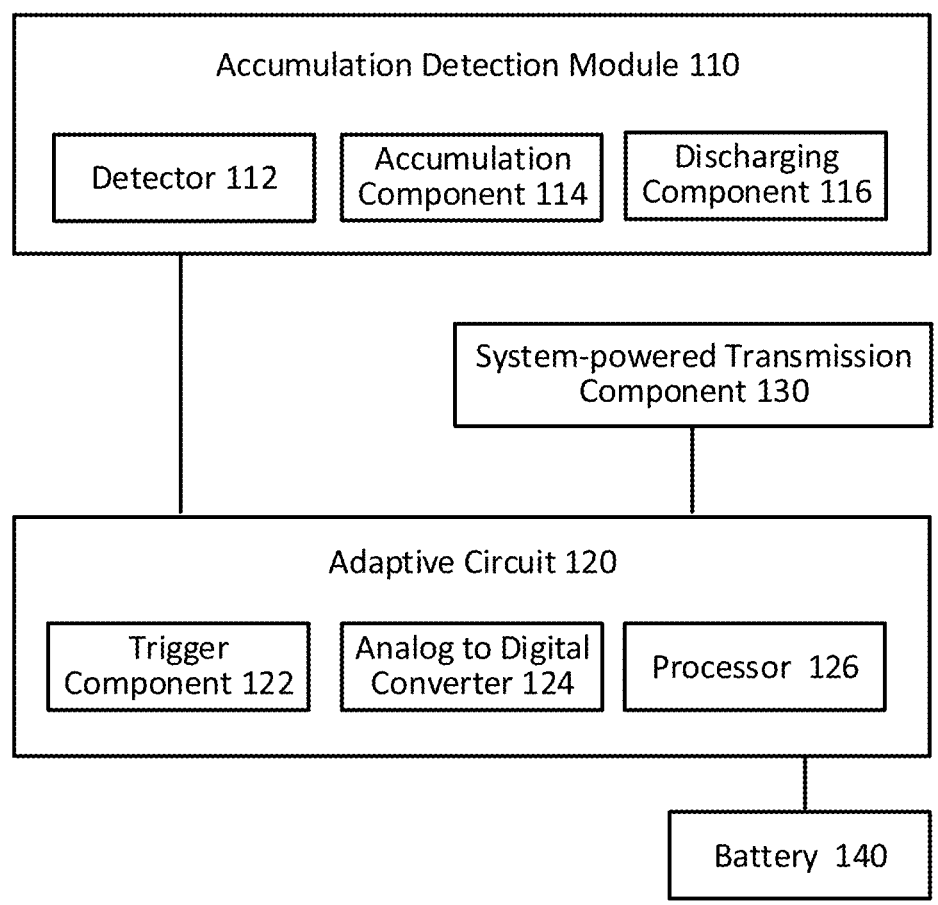
FIG. 1A shows schematically a system for measuring a radiant exposure of electromagnetic radiation according to certain embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising", or "includes" and/or "including", or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

As used in the disclosure, the phrase "bidirectional wireless communication system" refers to onboard components of the sensor that provides capability of receiving and sending signals. In this manner, an output may be provided to an external device, including a cloud-based device, personal portable device, or a caregiver's computer system. Similarly, a command may be sent to the sensor, such as by an external controller, which may or may not correspond to the external device. Machine learning algorithms may be employed to improve signal analysis and, in turn, command signals sent to the medical sensor, including a stimulator of the medical sensor for providing haptic signal to a user of the medical device useful in a therapy. More generally, these systems may be incorporated into a processor, such as a microprocessor located on-board or physically remote from the electronic device of the medical sensor.

As used in the disclosure, the term "system-powered" refers to a configuration wherein a system or component thereof is capable of functioning or otherwise operating in a powered state for an operation period without relying on external power, such as without relying on external power provided by an external power source(s); e.g., wireless power coupled to the device via a power harvester. System-powered includes, for example, a system or component thereof that is powered via at least one "on-board" power source that is configured as a component of the system, such as via battery, fuel cell, solar cell, or the like provided as a part of the system. In an embodiment, the invention provides systems having one or more system-powered components that are powered via an on-board battery such as a button cell battery or coin cell battery. Incorporation of system-powered components in dosimetry systems of some embodiments allows for autonomous, ultra power efficient operation over useful operating periods, such as greater than 6 months, and in certain embodiments greater than 9 months and in some embodiments, greater than 1 year.

As used in this disclosure, the term "long-term monitoring" refers to a wireless electronic system that can function reliably for a life time that is at least 6 months or longer, without any active maintenance, including battery recharge or replacement. As described herein, such long-term monitoring is provided herein using small form factor batteries by specially configured electronic configurations and sampling in a manner that maintains accuracy, while minimizing average power requirements.

Of course, any of the devices provided herein are compatible with short-term monitoring. "Short-term monitoring" may refer to a limited period of high frequency sampling, including ongoing and continuous transmission of sensor output to a receiver. Short-term monitoring also refers to the system entering into an instantaneous mode wherein there is real-time monitoring of the sensor output in a non-accumulating mode, such as for time-derivative parameters, including intensity. In this manner, the sensor output is not stored in the capacitor, but instead is monitored and output to the receiver. This also referred to as "instantaneous mode" sensing. Due to the increased power requirements of such instantaneous sensing, there is a power drain on the power source and so preferably there is an automated switch off of the instantaneous mode sensing, such as after a period that is not longer than 1 hour, 30 minutes, or 10 minutes. In this manner, unwanted shortening of battery lifetime is avoided. The different modes can be overridden, if desired, by a user.

As used in this disclosure, the term "accumulation mode" refers to the arrangement of a sensor whose electronic output is stored in a capacitor, thereby avoiding the need for frequent monitoring of sensor output, as well as advantageously being "self-powered." Instead, the electric potential across the supercapacitor can be less frequently monitored and, as required, the supercapacitor discharged so as to avoid over-storage and attendant leakage out of the supercapacitor. This combination of sensors and capacitors is also referred herein as a "self-powered transducer", reflecting the change of the magnitude of the physical parameter into an electrical output from the sensor, which is subsequently stored in the capacitor (or supercapacitor). The accumulation mode measures time-integral parameters, like dose, in contrast to the time-derivative parameters like intensity measured in an instantaneous mode.

As used in this disclosure, the term "instantaneous mode", in contrast, refers to the constant or at least very high frequency monitoring, of the real-time sensor output directly.

As used in this disclosure, the term "sleep mode" refers to the different states the system can have so as to maximize battery lifetime and, therefore, overall system lifetime. The different modes have different power requirements, with the instantaneous mode being highest, with a much lower power requirement in a sleep mode, such as shallow sleep, and an ultra-low power requirement for deep sleep modes. Of course, the lowest power requirement is for when the system is completely turned off.

As used in this disclosure, the term "deep sleep mode" refers to most of the system, including the communications module, being in an unenergized state, with only minimal low power requirements for the comparator and processor clock. In contrast, "shallow sleep mode" does have a higher power requirement reflecting the more active nature of the electronic system and communication with the receiver and sensor reset, as well as higher frequency sampling.

As used in this disclosure, the term "data package" refers to transmission of information relevant to the measurement of the physical parameter, such as magnitude and time, and may be used for further calculations, including rate of change, total exposure, flux and the like.

As used in this disclosure, the term "capacitor" refers to a material that can store charge and is typically formed from two conductive materials separated by a dielectric medium. A capacitor, as used herein, stores electric charge and is capable of discharging as required, including when the stored charge is sufficiently high that there is a risk of substantial unwanted charge leakage. The term capacitor may be used interchangeably with the term "supercapacitor". "Supercapacitor", as used herein, refers to a high-capacity capacitor having a capacitance value that is much higher than conventional capicitors, such as the ability to store 10 to 100 times more energy per unit mass or volume, and can rapidly accept and deliver charge, while accommodating many charge and discharge cycles. Exemplary capacitors include those having a solid dielectric, an electrostatic double-layer capacitance (EDLC) (carbon or carbon-derivative electrodes), electrochemical pseudocapacitance (metal oxide or conducting polymer electrodes), hybrid capacitors that have electrodes with differing characteristics, such as lithium-ion capacitors. An advantage of the systems and methods provided herein is that they can readily incorporate a wide range of capacitors/supercapacitors, depending on the application of interest and corresponding energy storage characteristics, cycling number and lifetime.

As used in this disclosure, the term "sensing" refers to detecting the presence, absence, amount, magnitude or intensity of a physical and/or chemical property. Useful device components for sensing include, but are not limited to, electrode elements, chemical or biological sensor elements, pH sensors, temperature sensors, strain sensors, mechanical sensors, position sensors, optical sensors and capacitive sensors.

As used in this disclosure, the term "encapsulate" refers to the orientation of one structure such that it is at least partially, and in some cases completely, surrounded by one or more other structures, such as a substrate, adhesive layer or encapsulating layer. "Partially encapsulated" refers to the orientation of one structure such that it is partially surrounded by one or more other structures, for example, wherein 30%, or optionally 50%, or optionally 90% of the external surface of the structure is surrounded by one or more structures. "Completely encapsulated" refers to the orientation of one structure such that it is completely surrounded by one or more other structures.

As used in this disclosure, the term "physical parameter" is used broadly herein, and may be one or more of exposure to UV radiation, physical motion, temperature, heat index, thermoregulation, skin hydration, sweat loss, electrolyte level, humidity, air pollution, chemical exposure, acoustic level, magnetic exposure, radiation exposure, visible light, heat, heat flux, metabolic expenditure, vibratory motion, mechanical shock, and rates of change thereof.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Electromagnetic (EM) radiation from the sun and from indoor lamps, emissive displays and other artificial sources have wavelength-specific and dose-dependent effects on underlying life processes that determine health status. The adverse influences of overexposure or underexposure to the EM radiation accumulate over time and their consequences can be latent. Specifically, excessive exposure to UV radiation and blue light from the sun or from sources of emission such as those in tanning beds and cellphones have varied associated risks. Repetitive keratinocyte damage from chronic exposure to UV radiation is the primary cause of skin cancer—the most commonly diagnosed form of cancer in the US. The shorter wavelengths of visible spectrum (VIS) generate reactive oxygen species in the skin, which can lead to DNA damage that causes inflammation as well as hyperpigmentation, and potentiates degradation of collagen and elastin, thereby contributing to photo-aging and skin wrinkling. Above certain thresholds, blue light can cause photochemical damage in retinal tissue and accelerate age-related maculopathy. Additional effects modulate retinal control of human circadian rhythms, including suppressed secretion of melatonin. On the other hand, moderate doses of UVR and VIS are essential for vitamin D production and for immunomodulation. Insufficient exposure can also lead to seasonal affective disorder (SAD), typically treated with bright light therapy.

Technologies that provide convenient, immediate access to personalized information on wavelength-specific exposure to the EM radiation could guide behaviors to prevent adverse health outcomes, from sunburns and skin cancer to mood swings and sleep disorders. Previously reported approaches focus almost exclusively on UV radiation measurements using color-changing chemical reagents or digitally sampled outputs of UV radiation photodetectors. The former provides semi-quantitative information in platforms that cannot be re-used. The latter is susceptible to sampling errors, with operating lifetimes that are limited by battery capacities. The most recent schemes involve miniaturized, highly accurate dosimeters that exploit a light-powered, continuous mode of detection and battery-free operation. Here, current from a photodetector accumulates on a storage capacitor such that the resulting voltage corresponds directly to dose, via a calibration factor. In reported systems, a miniaturized loop antenna supports NFC protocols as digital, wireless interface to the phone for data acquisition. The main disadvantage of these millimeter-scale NFC (mm-NFC) devices is that they require active user engagement for data acquisition and device reset (capacitor discharge), via a 'swipe' of the phone. An ideal platform would offer automatic and remote wireless updates, while retaining many of the other appealing attributes of the accumulation mode, mm-NFC approach.

This invention in certain aspects discloses a millimeter-scale, ultra-low power digital dosimeter system that provides continuous EM radiation dosimetry in an autonomous mode at one or multiple wavelengths simultaneously, with time-managed wireless, long-range communication to standard consumer devices. A single, small button cell battery supports a multi-year lifespan, enabled by the combined use of a light-powered, accumulation mode of detection and a light-adaptive, ultra-low power circuit design. Field studies demonstrate single-modal and multi-modal dosimetry platforms of this type, with a focus on monitoring short-wavelength blue light from indoor lighting and display systems, and ultraviolet/visible/infrared radiation from the sun.

In certain embodiments, the ultra-low power digital dosimeter system includes light-adaptive electronic control circuits with an ADM for dosimetry and a BLE system on a chip (SoC) for wireless communication. In certain embodiments, even some of the smallest button cell batteries can support more than 1.2 years of continuous operation in an 'always on' mode that functions autonomously, without requirements for any form of user engagement. The total size of the resulting device is only slightly larger than that of recently launched commercial mm-NFC dosimeter systems, thereby supporting a broad range of options for personal use, such as mounting on glasses, earphones, shoelaces, watchbands, bracelets, pendants or other accessories. Lack of interface ports, mechanical switches, and absence of need for battery replacement allows hermetic sealing of device for waterproof, sweat-resistant, and wear-resistant capabilities.

Referring to FIGS. 1A, 2B, 4C, 5B and 6C, and particularly to FIG. 1A now, a schematic view of one embodiment of a system 100 for measuring a radiant exposure of incident electromagnetic radiation is illustrated. In the exemplary embodiment shown in FIG. 1A, the system 100 comprises an ADM 110, an adaptive circuit 120, a system-powered transmission component 130, and an on-board battery 140 to power the system 100.

The key feature of the ADM according to embodiments of the invention is that it directly measures exposure dose in a continuous fashion, without any power consumption. By contrast, conventional digital approaches approximate dose through computational time integration across a series of brief measurements of intensity, each performed using active, battery-powered electronics, where increasing the sampling frequency increases the accuracy, but decreases the battery life. The ADM eliminates this trade-off, to enable highly accurate dosimetry even with extremely long intervals between active measurements. The active, light-adaptive circuit design disclosed herein automatically adjusts the temporal frequency for interrogating the ADM in a manner that depends on the intensity of the irradiation. In the absence of light, the device remains in an ultra-low power sleep mode while continuously monitoring the dose via the ADM. When the dose exceeds a set threshold value, the device briefly wakes-up, wirelessly transmits exposure information using BLE protocols, resets the ADM and then quickly returns to sleep mode. The result is an exceptionally power-efficient dosimeter that automatically regulates its operation and communication to the phone on an adaptive, as-needed basis to enable a millimeter scale form factor with a battery life of many years, corresponding to a device that is both always on and effectively everlasting, without any user engagement.

The ADM 110 is configured to continuously monitor incident electromagnetic radiation. As shown in FIG. 1A, the AMD 110 includes a detector 112, an accumulation component 114 and a discharge component 116.

The detector 112 comprises one or more photosensors, e.g., one or more photodiodes (PDs) shown in FIGS. 2B, 4C, 5B and 6C, for receiving the electromagnetic radiation and generating a current in response to the exposure of the electromagnetic radiation.

The accumulation component 114 comprises one or more capacitors, e.g., one or more supercapaciotrs (SCs) shown in FIGS. 2B, 4C, 5B and 6C, connected in parallel to the detector 114, for accumulating information, e.g., current generated by the detector 112 (one or more PDs) and storing electric charges corresponding to the generated current. The amount of electric charges is directly proportional to an amount of the electromagnetic radiation received by the detector 112 over a period of time.

The discharge component 116 comprises one or more transistor, e.g., one or metal oxide-semiconductor transistors (MOS) shown in FIGS. 2B, 4C, 5B and 6C, connected in parallel to the detector 112 and the accumulation component 114, for operably erasing or resetting the information accumulated in the accumulation component 114, for example, by discharging the electric charges stored in the accumulation component 114.

The adaptive circuit 120 is configured to periodically interrogate the ADM 110, adjust a frequency of interrogation of the accumulation detection module 110 based on intensity of incident electromagnetic radiation received by the detector 112 and autonomously transmit exposure dose output to a remote device (not shown) via the system-powered transmission component 130. In some embodiments, the frequency of interrogation is increased based on an increase in the intensity of the electromagnetic radiation. In other embodiments, the frequency of interrogation is decreased based on a decrease in the intensity of the electromagnetic radiation.

Still referring to FIG. 1A, the adaptive circuit 120 comprises a trigger component 122, at least one ACD 124 and a processor 126. The processor 126 can be one or more central processing units (CPUs), a microcontroller, a microcontroller unit (MCU), or any other processing components.

The trigger component 122 comprises at least one comparator, e.g., a low-power comparator (LPCOMP) shown in FIGS. 2B, 4C, 5B and 6C, configured to monitor a voltage across the accumulation component 114 and generate a wake up signal when the voltage is equal to or greater than a predefined threshold voltage. The predefined threshold voltage is below the saturation limit of the accumulation component 114.

Said at least one ADC 124 shown in FIGS. 2B, 4C, 5B and 6C is configured to translate an analog signal, e.g., the voltage across the accumulation detection module 110, into a digital input.

The processor, e.g., a CPU shown in FIGS. 2B, 4C, 5B and 6C, is configured to receive the wake up signal from the trigger component 122, and, in response, interrogate the voltage of the AMD 110 via said at least one ADC 124; translate the digital output from said at least one ADC 124 into the exposure dose information; transmit the exposure dose information to the remote device via the system-powered transmission component 130; and discharge the accumulation component 114 via the discharge component 114.

In some embodiments, the adaptive circuit 120 is configured to switch the system 100 between a sleep mode and a wake mode. When the system 100 is in the sleep mode, the system 100 operates at a first average current consumption. When the system 100 is in the wake mode, the system operates at a second average current consumption. The second average current consumption is greater than the first average current consumption. In some embodiments, the second average current consumption is at least 2 times the first average current consumption. In some embodiments, the second average current consumption is not greater than 15 µA and the first average current consumption is not greater than 1 µA.

In some embodiments, the system 100 is configured to transmit exposure dose information to the remote device only when the system 100 is in the wake mode. In some embodiments, the system 100 is configured to transmit exposure dose information each time when the system 100 switches to the wake mode.

Figure 6A:
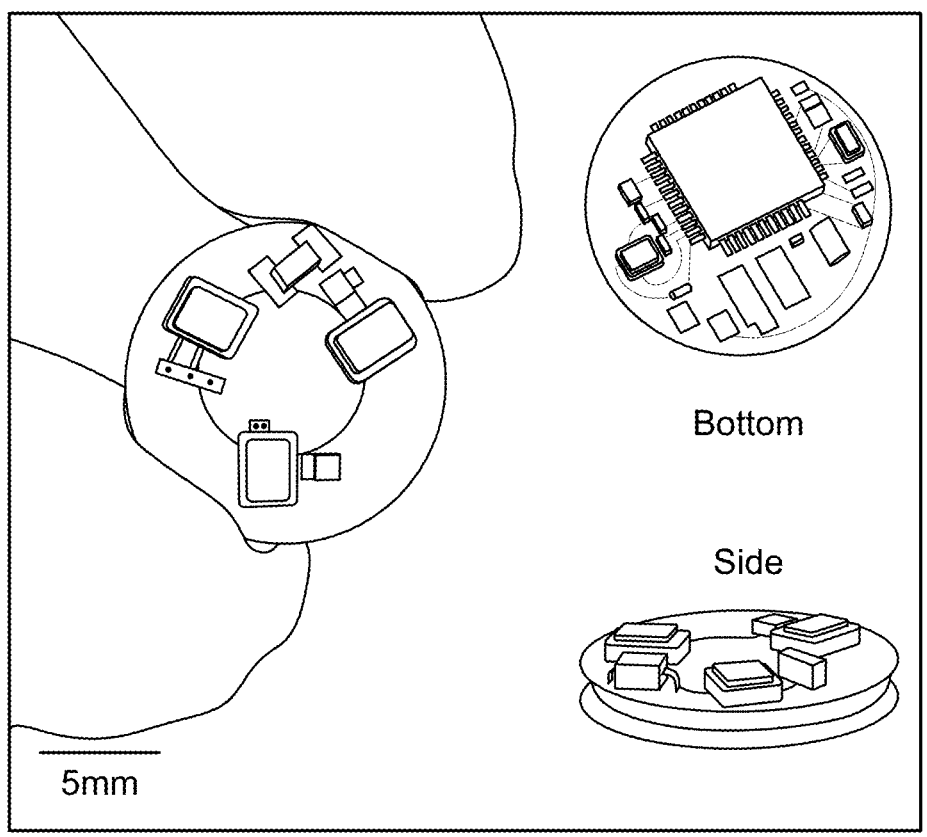
Figure 6B:
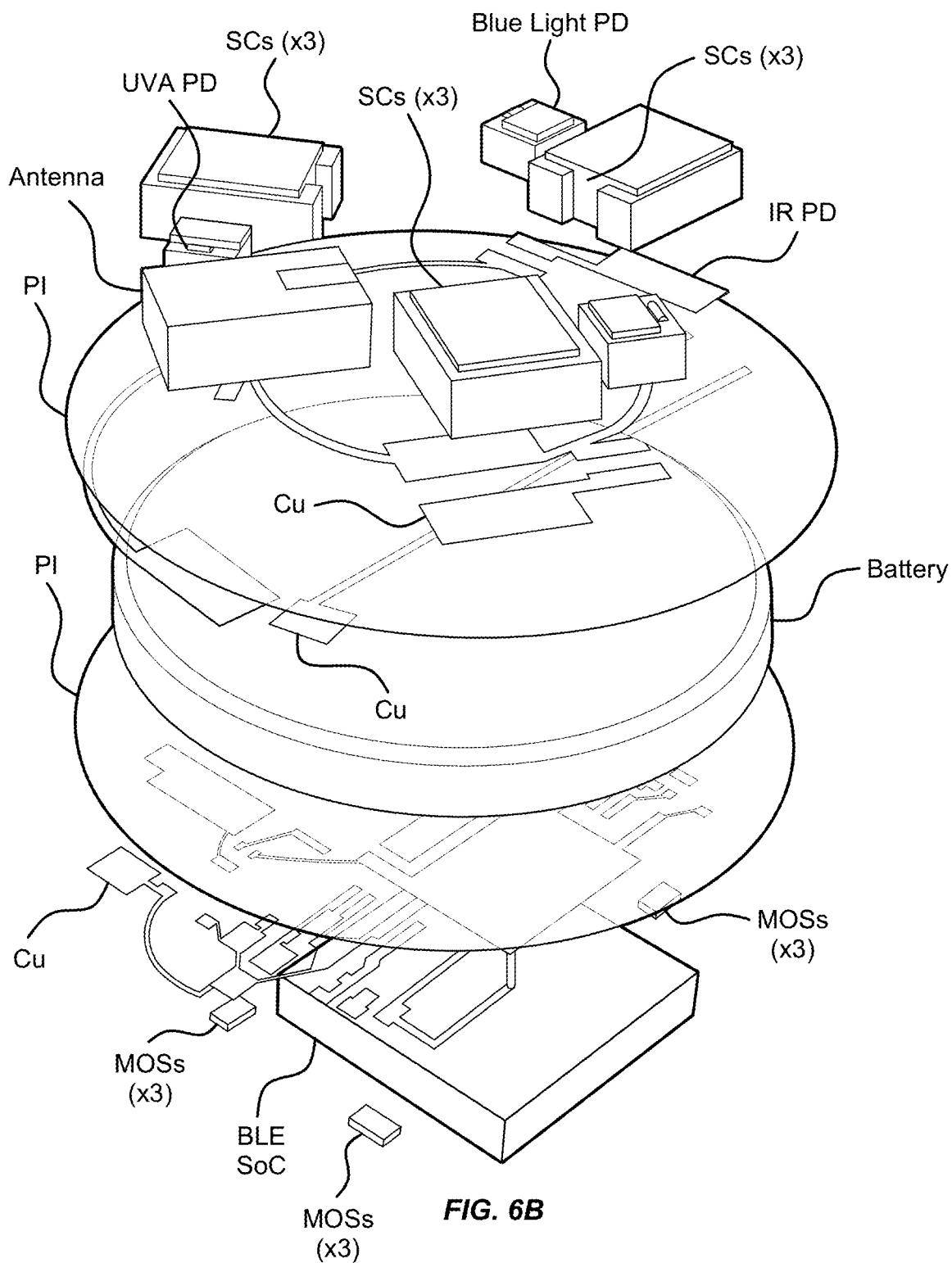
Figure 6C:
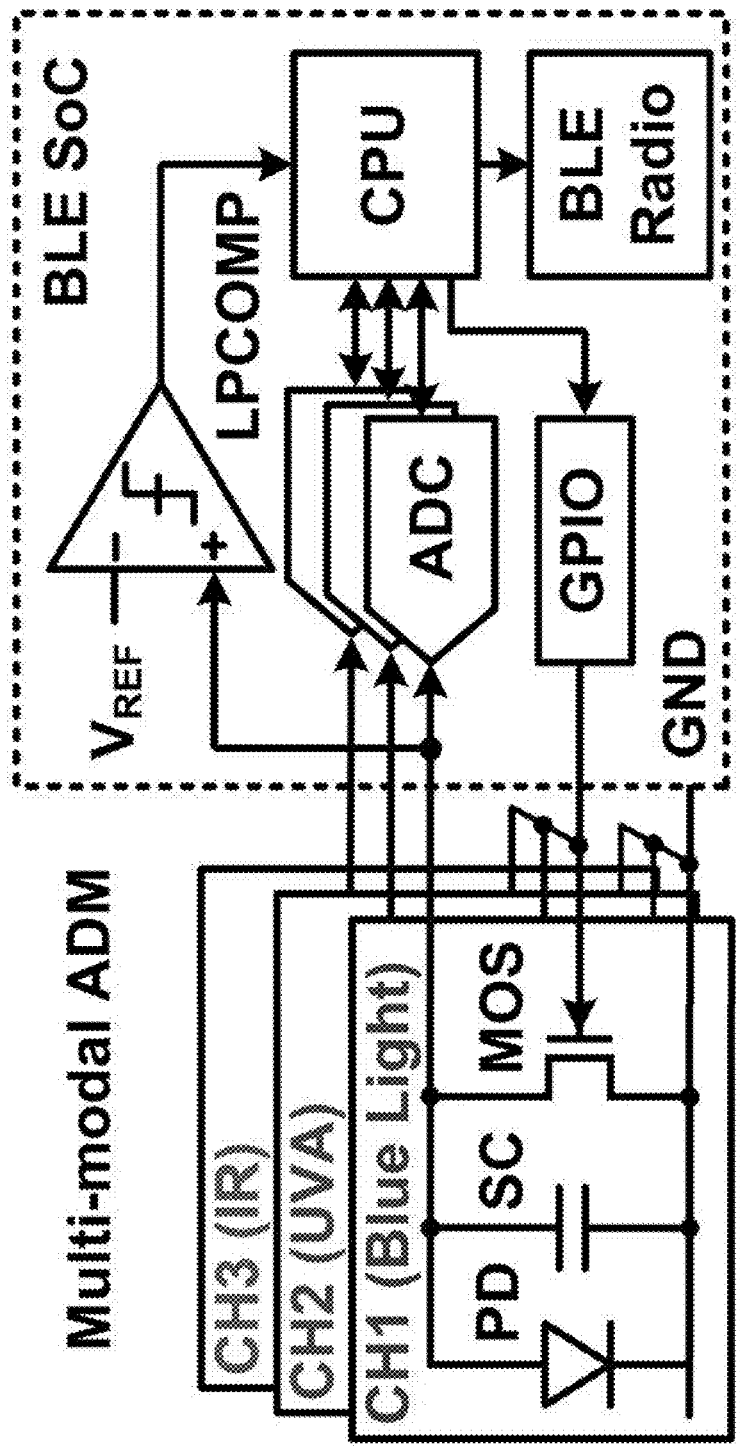

In some embodiments, the ADM comprises a plurality of channels for independently monitoring two or more wavelength ranges of the electromagnetic radiation. One embodiment of the multi-channel (multi-modal) ADM is shown in FIG. 6C, where the ADM has three channels, CH1 (blue light), CH2 (UVA) and CH3 (IR), and said at least one photodiode comprises a blue light PD, an UVA PD anfd an IR PD. Each PD is responsive to a respective wavelength range of the electromagnetic radiation. Each channel has a respective one of the plurality of photodiodes for measuring an exposure dose of said respective wavelength range of the electromagnetic radiation, and is coupled with the adaptive circuit so as to provide integration and/or transmission of the exposure dose.

In some embodiments, said two or more wavelength ranges of the electromagnetic radiation are selected from a UVA region, a UVB region, an UV region, a visible region, an IR region, and any combinations of them. In one embodiment, the plurality of photodiodes comprises an UV photodiode, a blue photodiode, and an IR photodiode.

In some embodiments, the ADM is configured to monitor the electromagnetic radiation corresponding to two or more intensity domains. One embodiment of the multi-domain ADM is shown in FIG. 5B, where said two or more intensity domains correspond to an outdoor intensity domain and an indoor intensity domain, and the ADM comprises an outdoor ADM and an indoor ADM for monitoring exposure dose of the electromagnetic radiation outdoors and indoors, respectively, which are coupled with the adaptive circuit so as to provide integration and/or transmission of the exposure dose. In this exemplary embodiment shown in FIG. 5B, the outdoor ADM has one PDs, and the indoor ADM has 10 PDs arranged in parallel. The indoor ADM and the outdoor ADM are paired with a UVA PD and a switch (e.g., MOS T3) coupled with the adaptive circuit for operably switching the system between the indoor ADM and the outdoor ADM, based on the presence or absence of UVA radiation. The presence or absence of the UVA radiation results in a high or low value of an output from the UVA photodiode, respectively.

In some embodiments, the system-powered transmission component in electrical communication with the adaptive circuit such that the exposure dose information is transmitted the remote device via the system-powered transmission component.

In some embodiments, the system-powered transmission component is a wireless transmission component, such as a BLE radio, for example, as shown in in FIGS. 2B, 4C, 5B and 6C. In some embodiments, the wireless communication module comprises a cellular communication module/chip having a direct cellular communication link with a wireless wide area network. Such cellular communication can be accomplished with, but not limited to, 2G, 3G, NB IoT, LTE-M, LTE Cat 1, 4G LTE, 5G, and/or modules, embedded into the system.

In some embodiments, the system-powered transmission component is powered by one or more on-board batteries. In some embodiments, the one or more batteries are wiredly or wirelessly rechargeable batteries.

In some embodiments, the system further comprises a temperature sensor, an accelerometer, a position sensor, humidity sensor, sweat sensor, acoustic sensor or any combination of them.

In some embodiments, the system is configured as a wearable dosimetry sensor, a skin-mounted dosimetry sensor, a millimeter-scale dosimetry sensor, an autonomous dosimetry sensor, and/or a system-powered dosimetry sensor.

According to the invention, systems/devices for monitoring/measuring the radiant exposure of electromagnetic radiation include, among other things, features of continuous monitoring of exposure, system-powered wireless transmission of exposure data, and practically everlasting battery life. These features may be achieved, at least in part, due to a light-adaptive circuit within the system that makes extremely efficient use of the battery. Because digital data storage and wireless data transmission both consume energy, the adaptive circuit may make strategic use of analog components to store exposure information in addition to strategically adjusting the frequency of data transmission based on the intensity of ambient EM radiation. In some embodiments, the adaptive circuit is configured to facilitate continuous monitoring of the incident electromagnetic radiation received by the electromagnetic radiation detector over a period of at least 6 months without power input from a power source external to and separate from the system. In some embodiments, the system may achieve months or even years of continuous operation without any action required from the user. Thus, in contrast to prior art devices, the invention may be described as a "set it and forget it" type device.

Figure 1B:
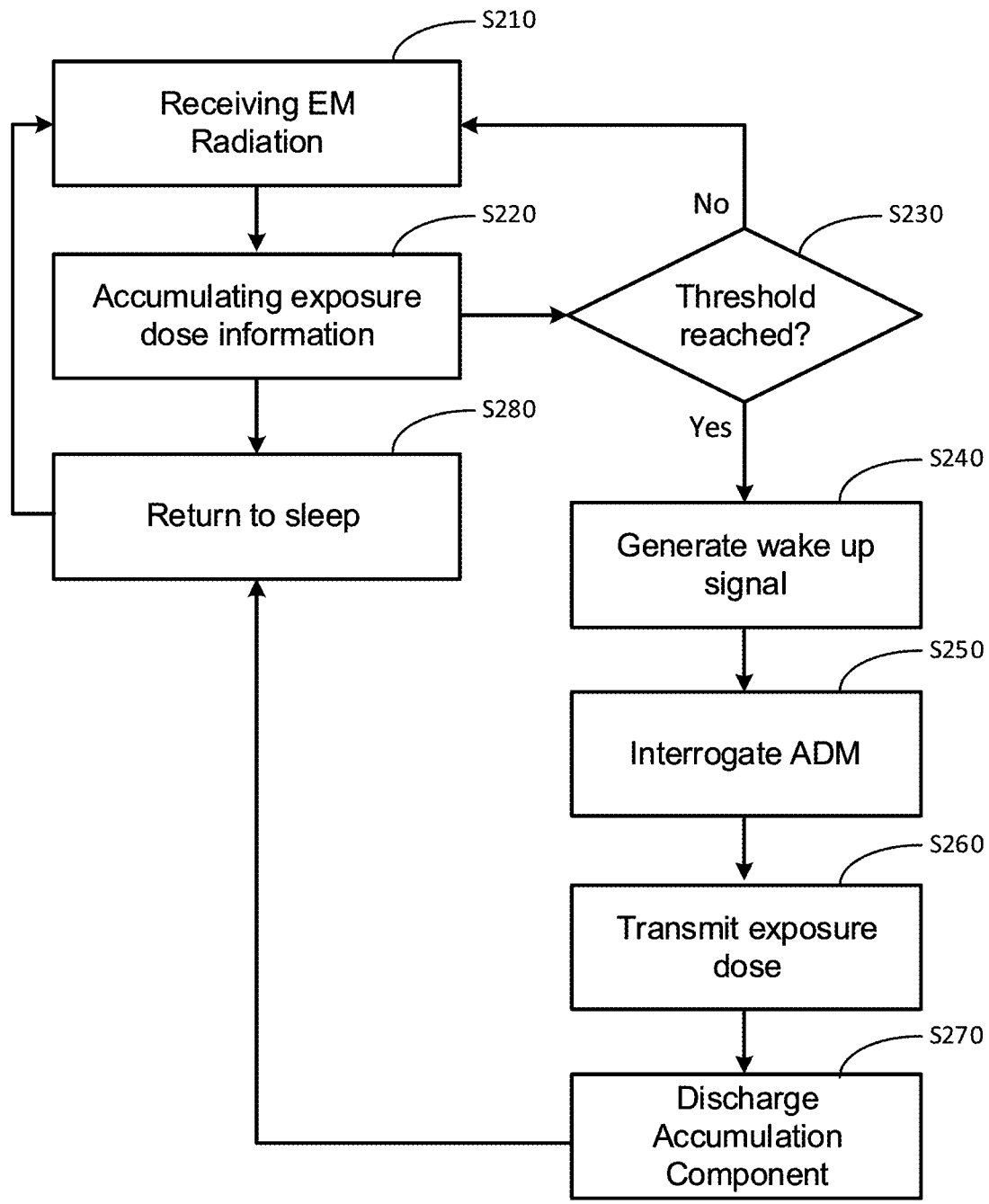
FIG. 1B shows schematically a flowchart for autonomously measuring a radiant exposure of electromagnetic radiation according to certain embodiments of the invention.

Referring now to FIG. 1B, a flowchart for monitoring/measuring a radiant exposure of electromagnetic radiation is shown according to one embodiment of the invention. The method includes the following steps.

At step S210, the electromagnetic radiation is received, for example, by the detector 112 of the ADM 110 of the dosimeter system 110 shown in FIG. 1A.

At step S220, exposure dose information of the electromagnetic radiation is accumulated, for example, by the accumulation component 114 of the ADM 110.

At step S230, the exposure dose information is compared to a predefined threshold level, for example, by the trigger component 122 of the adaptive circuit 120 of the dosimeter system 110 shown in FIG. 1A.

At step S240, a wake up signal is generated when the exposure dose information is equal to or greater than the predefined threshold level, for example, by the trigger component 122 of the adaptive circuit 120.

At step S250, the exposure dose information is interrogated from the AMD 110.

At step S260, responsively to the wake up signal, the exposure dose information is transmitted to a remote device, for example, by the system-powered transmission component 130 of the dosimeter system 110 shown in FIG. 1A.

At step S270, the exposure dose information accumulated in the accumulation component 120 of the ADM is discharged/erased, for example, by the discharge component 116, and then returning to a sleep mode at step S280 and repeating steps S210-S270 for continuously monitoring the radiant exposure of the electromagnetic radiation.

In some embodiments, the method may comprise repeating steps S210-S220 when the exposure dose information is less than the predefined threshold level. The invention also includes, among other things, different aspects and embodiments as follows.

In one aspect, the invention relates to an electronic system for monitoring a physical parameter. In one embodiment, the electronic system includes an ADM for continuously measuring the physical parameter in terms of exposure dose in an accumulation mode. The ADM is a light-powered sensing system comprising at least one PD for continuously generating photocurrent with a magnitude that is proportional to an intensity of electromagnetic radiation in response to exposure to the EM radiation, at least one capacitor coupled to the at least one PD in parallel for storing charges accumulated from the generated photocurrent of the at least one PD, and at least one transistor having a source and a drain coupled to the at least one capacitor.

The electronic system also includes a power source for operably providing power; and an SoC coupling with the ADM and the power source and operably in a sleep mode in which a minimal power is consumed, or in a run mode. The SoC comprises a wireless communication module, at least one ADC and an LPCOMP coupled to the source of the at least one transistor, and a controller coupled to the at least one ADC, the LPCOMP and the wireless communication module, and is configured such that in operation, the LPCOMP monitors a voltage across the at least one capacitor when the SoC operates in the sleep mode, and when the voltage is equal to or greater than a pre-defined threshold, generates a wake-up event that triggers the SoC to operate in the run mode in which the controller wirelessly transmits a signal of the voltage converted by the at least one ADC to a receiver through the wireless communication module, activates the at least one transistor to discharge the at least one capacitor and then returns the SoC to the sleep mode.

In one embodiment, the SoC further comprises at least one general-purpose input/output (GPIO) coupled between a gate of the at least one transistor and the controller for operably activating the at least one transistor to discharge the at least one capacitor.

In one embodiment, the at least one PD comprises a plurality of PDs, and each PD is responsive to a respective wavelength region of the electromagnetic radiation. The ADM is characterized with a plurality of channels, and each channel has a respective one of the plurality of PDs, one of the at least one capacitor coupled to said respective PD and one of the at least one transistor coupled to said capacitor, for measuring the exposure dose of said respective wavelength region of the electromagnetic radiation.

In one embodiment, the plurality of PDs comprises an UVA PD, a blue PD, and an IR PD.

In one embodiment, the at least one ADC comprises a plurality of ADCs, and each ADC is electrically couple to a respective one of the plurality of channels. The LPCOMP is configured to monitor the voltage in one of the plurality of channels, such that when the voltage is equal to or greater than the pre-defined threshold, the SoC enters the run mode and wirelessly transmits signals output from all the plurality of ADCs and simultaneously discharges said capacitors of all the plurality of channels.

In one embodiment, the at least one PD comprises a plurality of PDs, the at least one capacitor comprises a plurality of capacitors and the at least one transistor comprise a first and second transistors, where the ADM is characterized with an outdoor ADM and an indoor ADM for monitoring the exposure outdoors and indoors, respectively. The outdoor ADM has one of the plurality of PDs, one of the plurality of capacitors coupled to said PD and the first transistor coupled to said capacitor. The indoor ADM has the remaining PDs arranged in parallel, the remaining capacitors arranged in parallel and coupled to the remaining PDs and the second transistor coupled to the remaining capacitors.

In one embodiment, the indoor ADM and the outdoor ADM are paired with a UVA PD and a third transistor and operably switchable based on the presence or absence of UVA radiation, where the presence or absence of UVA radiation results in a high or low value of a voltage, $V_{UVA}$, output from the UVA PD, respectively.

In one embodiment, the SoC is configured to automatically switch between the indoor ADM and the outdoor ADM through a two-to-one multiplexer, where the two-to-one multiplexer is configured to switch the ADM to the outdoor ADM when the voltage $V_{UVA}$ is in a high value, and to the indoor ADM when the voltage $V_{UVA}$ is in a low value.

In one embodiment, a source and a drain of the third transistor are coupled to a source and a drain of the second transistor, respectively, and the UVA PD is coupled between a gate and the drain of the third transistor, such that in the outdoor ADM, the third transistor continuously discharges the indoor ADM to prevent excessive charge buildup on the corresponding capacitors.

In one embodiment, the SoC further comprises an edge detector coupled between the controller and the UVA PD for monitoring the value of the voltage $V_{UVA}$ and generating a wake-up signal upon a rising edge when the value goes from low to high, or a falling edge when the value goes from high to low, corresponding to indoor-to-outdoor or outdoor-to-indoor switches, respectively. At each and every indoor/outdoor switching, the wake-up signal causes the controller to discharge both the indoor and outdoor ADMs, to update a 1-bit flag value with '0' for indoor and '1' for outdoor that is passed to an user interface as an indicator of activation of the indoor or outdoor ADM, and then to enter the sleep mode.

In another aspect, the invention relates to an electronic system for monitoring a physical parameter. In one embodiment, the electronic system includes an ADM comprising at least one accumulation mode sensor for measuring the physical parameter by generating electrical energy associated with the physical parameter in response to a surrounding condition, and at least one energy storing device coupled to the at least one accumulation mode sensor for accumulatively storing the generated electrical energy; a power source for operably providing power; and an SoC coupling with the ADM and the power source, configured such that the stored electrical energy is monitored, and when the stored electrical energy is equal to or greater than a pre-defined threshold, a wake-up event is generated to trigger the SoC to operates in a run mode in which the physical parameter associated with the stored electrical energy is wirelessly transmitted to a receiver and the stored electrical energy in the energy storing device is discharged, and then the SoC returns to a sleep mode in which a minimal power is consumed.

In one embodiment, the electronic system is a dosimeter for monitoring exposure dose indoors, a dosimeter for adaptively monitoring exposure dose both outdoors and indoors, or a multichannel dosimeter for simultaneously monitoring exposure dose in different wavelength regions of electromagnetic radiation.

In one embodiment, the ADM further comprises at least one transistor coupled to the at least one energy storing device for operably discharging the at least one energy storing device.

In one embodiment, the SoC comprises a wireless communication module, a low-power comparator coupled to the at least one transistor, and a controller coupled to the low-power comparator and the wireless communication module, such that in operation, the low-power comparator monitors the stored electrical energy, and when the stored electrical energy is equal to or greater than the pre-defined electrical energy, generates a wake-up event that triggers the SoC to operate in the run mode in which the controller wirelessly transmits a signal associated with the stored electrical energy to a receiver through the wireless communication module, activates the at least one transistor to discharge the he at least one energy storing device and then returns the SoC to the sleep mode.

In one embodiment, the ADM operably measures exposure dose in a continuous fashion, without power consumption from the power source.

Certain aspects of the invention further provide an electronic system for monitoring one or more physical parameters. In one embodiment, the electronic system includes at least one ADM for sensing the one or more physical parameters that are accumulatively stored in the form of electrical energy based on a magnitude of the physical parameters; a wireless communication module electronically coupled to the at least one ADM; a controller electronically couple to the at least one ADM module and the wireless communication module; and a power source electronically coupled to the wireless communication system, the controller and/or the at least one ADM to power the wireless communication module, the controller, and/or the at least one ADM. They are configured such that the stored electrical energy is monitored, and when the stored electrical energy is equal to or greater than a pre-defined threshold, a wake-up event is generated to trigger the electronic system to transmit the physical parameters wirelessly to a receiver and discharge the stored electrical energy, and then return to a sleep mode in which a minimal power is consumed. In one embodiment, at least one ADM comprises at least one accumulation mode sensor, and at least one energy storing device electrically coupled to the at least one accumulation mode sensor, and wherein the electrical energy is stored in the at least one energy storing device.

In one embodiment, the controller is a CPU or a microcontroller.

In one embodiment, the wireless communication module comprises at least one of a BLE module and a NFC module.

In one embodiment, the wireless communication module automatically and periodically transmits a measured dose of the physical parameter to the receiver without an active user intervention.

In one embodiment, the at least one accumulation mode sensor comprises one or more of optical sensors, piezoelectric crystals, triboelectric sensors, acoustic sensors, mechanical sensors, pressure sensors, thermoelectric sensors, temperature sensors, temperature gradient sensors, humidity sensors, air pollution sensors, sweat or fluid sensors, electrocardiogram (ECG), Electromyography (EMG), pulse oximetry, accelerometers, and electromagnetic energy sensors for selected wavelengths including from radio wavelengths to gamma ray wavelengths.

In one embodiment, the at least one energy storing device comprises one or more of capacitors, accumulators, and rechargeable and dischargeable batteries.

In one embodiment, the surrounding condition includes one or more of electromagnetic radiation from the sun and/or artificial sources, air quality, weather, sounds, movements, and environmental changes.

In one embodiment, the sleep mode is characterized with a deep sleep mode and a shallow sleep mode, where when the voltage or the stored electrical energy is less than the pre-defined threshold, the SoC operates in the deep sleep mode in which only the low-power comparator is energized a deep sleep sampling interval, and when the voltage or the stored electrical energy is sampled with a shallow sleep sampling interval and compared to the pre-defined threshold, and a wake-up event is generated when the voltage or the stored electrical energy is equal to or greater than the pre-defined threshold, the SoC operates in the shallow sleep mode in which the low-power comparator, an ADC sampler and a processer timer are energized. In one embodiment, the deep sleep mode has an average deep sleep current in the electronic system that is less than or equal to 10 µA. In one embodiment, the deep sleep sampling interval is greater than the shallow sleep sampling interval, where the shallow sleep sampling interval is less than or equal 5 minutes.

In one embodiment, the deep sleep sampling interval and the shallow sleep sampling interval are dynamically controllable and changeable depending on operating parameters including a geographic location of the electronic system, time of day, magnitude of the physical parameter being measured and/or a user characteristic. In one embodiment, the user characteristic is one or more of skin type, sun protection parameter, age of user, ingestion of a sensitizing agent, and user sensitivity. In one embodiment, the geographic location is a field of agriculture, a museum, a beach, an outdoor venue, a sporting competition, adjacent to an industrial plant, energy plant, an agricultural grow region, UV water purification, UV sterilization, a sauna, a spa, a workout facility, a gymnasium, a gameroom, a hospital, or a rehabilitation facility.

In one embodiment, the pre-defined threshold that triggers the SoC to operate from the sleep mode to the run mode is hard programmed on the SoC, or remotely set through the receiver.

In one embodiment, the receiver is configured to receive an input of the user characteristic to dynamically vary the pre-defined threshold that controls a switch between the deep sleep mode and the shallow sleep mode.

In one embodiment, the receiver is one or more of a mobile device including a smart phone and a laptop or tablet, and a fixed receiver including a BLE system or beacon, cellular data transmission stations, a computer and a data center. The data center can be a database, data server, and/or cloud data center.

In one embodiment, the SoC further comprises a memory for storing the physical parameter to avoid unexpected data loss due to disruption of the wireless communication to the receiver.

In one embodiment, the electronic system further comprises a user-controllable switch to switch the electronic system to a power-off state, where the user-controllable switch is a mechanical switch or a wirelessly-controllable switch.

In one embodiment, the electronic system further comprises an on board actuator to alert a user to a risk condition, where the actuator is one or more of a mechanical vibrator, an electric stimulator, and an optical light source. In one embodiment, the alert is communicated to the receiver.

In one embodiment, the electronic system has an instantaneous mode for short term monitoring of the physical parameter. In one embodiment, the electronic system has a form factor that allows for a surface area profile of less than 3 cm. In one embodiment, the electronic system has an effective diameter less than 2.5 cm and a thickness less than 1 cm.

In one embodiment, the electronic system is partially or completely encapsulated by one or more encapsulation layers for thermal isolation, pressure isolation, pollutant isolation, electrical isolation and/or high external radiation isolation.

In one embodiment, the electronic system further comprises means for awaking an electronic system from a deep sleep mode. The awaking means may include at least one light emitting diode (LED) or capacitor. Example is long term shelf life prior to being opened/taken out of the package.

In one embodiment, the electronic system is configured to operate for 2 months or more without replacing or recharging the power source, preferably, 1 year or more without replacing or recharging the power source.

In one embodiment, the electronic system is configured to operate with a power consumption that is at least 25% lower than that of a comparable system that incorporates a sensor that does not offer the accumulation mode of operation; and/or with an accuracy that is at least 25% better than that of a comparable system that incorporates a sensor that does not offer the accumulation mode of operation.

In one embodiment, the electronic system is configured to be wearable by a person and/or affixed to a skin surface.

In one embodiment, the electronic system is incorporated into a piece of jewelry, an accessory, a watch, a piece of clothing, and/or to be worn underneath a piece of clothing.

In one embodiment, the physical parameter is one or more of exposure to UV radiation, physical motion, temperature, heat index, thermoregulation, skin hydration, sweat loss, electrolyte level, humidity, air pollution, chemical exposure, acoustic level, magnetic exposure, radiation exposure, visible light, heat, heat flux, metabolic expenditure, vibratory motion, mechanical shock, and rates of change thereof.

In yet another aspect, the invention relates to a system for monitoring one or more physical parameters, comprising a plurality of electronic systems deployed in a plurality of spatial-apart locations of interest. In one embodiment, the plurality of electronic systems is worn on or connected to skin of a user at plurality of distinct skin locations. Each electronic system can be any one disclosed above.

In another embodiment, the plurality of spatial-apart locations of interest is in a field of agriculture, a museum, a beach, an outdoor venue, a sporting competition, adjacent to an industrial plant, energy plant, an agricultural grow region, UV water purification, UV sterilization, a sauna, a spa, a workout facility, a gymnasium, a gameroom, a hospital, or a rehabilitation facility.

In a further aspect, the invention relates to a method of monitoring a physical parameter with an electronic system. In one embodiment, the method comprises the steps of continuously measuring a physical parameter with at least accumulation mode sensor by generating electrical energy associated with the physical parameter in response to a surrounding condition, and accumulatively storing the generated electrical energy in at least one energy storing device that is coupled to the at least one accumulation mode sensor; periodically comparing the stored electrical energy to a pre-defined threshold; and entering the electronic system in an deep sleep mode when the stored electrical energy is less than the pre-defined threshold; otherwise generating a wake-up event to trigger the electronic system to wirelessly transmit the physical parameter associated with the stored electrical energy to a receiver and to discharge the stored electrical energy in the energy storing device, and then to return to the deep sleep mode.

In one embodiment, when the stored electrical energy is equal to or greater than the pre-defined threshold, the electronic system is in a shallow-sleep mode in which all electronic components in the electronic system, except for an ADC and a timer, wait in a halt status.

In one embodiment, the method further comprises the steps of evaluating from the ADC a ready interrupt condition, thereby waking a controller to read a value, $V_{SC}$, of the ADC and compare $V_{SC}$ to the pre-defined threshold $V_{REF}$ and for $V_{SC} \geq V_{REF}$ send the physical parameter to the receiver, reset the at least accumulation mode sensor by discharging the at least one energy storing device, trigger the shallow sleep mode and provide a shallow sleep sampling interval; for $V_{SC} < V_{REF}$ enter in the deep sleep mode in which only a low power comparator is energized with a deep sleep sampling interval that is greater than a shallow sleep sampling interval.

In one embodiment, the method also includes the step of providing an instantaneous monitoring mode in which sensor output is continuously and instantaneously communicated to the receiver for short-term monitoring.

In one embodiment, the short-term monitoring is manually triggered by a user or is automatically triggered by a measured physical parameter that is greater than or equal to a user-selected reference level physical parameter.

In one embodiment, the electronic system is a dosimeter for monitoring exposure dose indoors, a dosimeter for adaptively monitoring exposure dose both outdoors and indoors, or a multichannel dosimeter for simultaneously monitoring exposure dose in different wavelength regions of electromagnetic radiation.

In one embodiment, the electronic system is attached on a skin surface or incorporated into an article of clothing or an accessory worn on a body.

In one embodiment, the method also includes the step of alerting a user wearing the electronic system as to exceeding a safe physical parameter exposure.

In one embodiment, the user wears a plurality of electronic systems over specific distinct skin locations.

In one embodiment, the method also includes the step of providing a user-characteristic to the receiver, where the user-characteristic is used to automatically determine the pre-defined threshold $V_{REF}$ tailored to the user.

It should be noted that all or a part of the methods according to the embodiments of the invention is implemented by hardware or a program instructing relevant hardware.

Yet another aspect of the invention provides a non-transitory computer readable storage medium/memory which stores computer executable instructions or program codes. The computer executable instructions or program codes enable a computer or a similar computing apparatus to complete various operations in the above disclosed methods for monitoring/measuring a radiant exposure of electromagnetic radiation. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

These and other aspects of the present invention are further described in the following section. Without intending to limit the scope of the invention, further exemplary implementations of the present invention according to the embodiments of the present invention are given below. Note that titles or subtitles may be used in the examples for the convenience of a reader, which in no way should limit the scope of the invention. Moreover, certain theories are proposed and disclosed herein; however, in no way should they, whether they are right or wrong, limit the scope of the invention so long as the invention is practiced according to the invention without regard for any particular theory or scheme of action.

EXAMPLE

Miniaturized, Light-Adaptive, Wireless Dosimeters Autonomously Monitor Exposure to Electromagnetic Radiation In this exemplary example, a millimeter-scale, ultra-low power digital dosimeter system is disclosed, which provides continuous EM radiation dosimetry in an autonomous mode at one or multiple wavelengths simultaneously, with time-managed wireless, long-range communication to standard consumer devices. A single, small button cell battery supports a multi-year lifespan, enabled by the combined use of a light-powered, accumulation mode of detection and a light-adaptive, ultra-low power circuit design. Field studies demonstrate single-modal and multi-modal dosimetry platforms of this type, with a focus on monitoring short-wavelength blue light from indoor lighting and display systems, and ultraviolet/visible/infrared radiation from the sun.

The millimeter-scale, ultra-low power digital dosimeter system includes light-adaptive electronic control circuits with an ADM for dosimetry and a BLE SoC for wireless communication. In certain embodiments, even some of the smallest button cell batteries (MS621F) can support more than 1.2 years of continuous operation in an 'always on' mode that functions autonomously, without requirements for any form of user engagement. The total size of the resulting device is only slightly larger than that of recently launched commercial mm-NFC dosimeter systems, thereby supporting a broad range of options for personal use, such as mounting on glasses, earphones, shoelaces, watchbands, bracelets, pendants or other accessories. Lack of interface ports, mechanical switches, and absence of need for battery replacement allows hermetic sealing of device for water-proof, sweat-resistant, and wear-resistant capabilities.

The key feature of the ADM is that it directly measures exposure dose in a continuous fashion, without any power consumption. By contrast, conventional digital approaches approximate dose through computational time integration across a series of brief measurements of intensity, each performed using active, battery-powered electronics, where increasing the sampling frequency increases the accuracy, but decreases the battery life. The ADM eliminates this trade-off, to enable highly accurate dosimetry even with extremely long intervals between active measurements. The active, light-adaptive circuit design disclosed herein automatically adjusts the temporal frequency for interrogating the ADM in a manner that depends on the intensity of the irradiation. In the absence of light, the device remains in an ultra-low power sleep mode (about 0.4 µA) while continuously monitoring the dose via the ADM. When the dose exceeds a set threshold value, the device briefly wakes-up (about 10 µA), wirelessly transmits exposure information using BLE protocols, resets the ADM and then quickly returns to sleep mode. The result is an exceptionally power-efficient dosimeter that automatically regulates its operation and communication to the phone on an adaptive, as-needed basis to enable a millimeter scale form factor with a battery life of many years, corresponding to a device that is both always on and effectively everlasting, without any user engagement.

Some embodiments of the device's circuit designs, operating principles and key factors that determine lifetime and accuracy are described as follows. An application focus is on dosimetry of blue light and on multi-spectral measurements in the UVR, blue, IR regions of the spectrum, with several examples in field trials studies.

Fabrication Procedures

A thin, flexible sheet (AP8535R, Pyralux) of copper (thickness, 18 µm)/polyimide (thickness, 75 µm)/copper (thickness, 18 µm) served as a substrate. A UV laser system (Protolaser U4, LPKF) ablated the copper to define conductive traces and through-hole vias. A galvanic pulsed electroplating system (Contac S4, LPKF) created conductive plugs of copper between the two patterned copper layers through the vias. In/Ag soldering paste (Ind. 290, Indium Corporation) heated at 90° C. served as solder joints for surface-mount components such as BLE, SC, UVA PD, UVB PD, blue PD, and MOSFET. Polydimethylsiloxane (PDMS) (sylgard 184, DOW corning) molded and cured at 70° C. formed a robust encapsulating structure.

Calibration of Outdoor Dosimeters

Calibration involved exposure to the outdoor sun with constant intensity on a clear day without clouds during the solar noon. Blue light (Visible Blue Light Meter, Solarmeter) and UVA photometers (Sensitive UVA Meter, Solarmeter) measured the intensity of incident solar light. Time integration of the measured intensity is the accumulated dose of blue light or of UVA exposure. A BLE-enabled phone (e.g., iPhone 6) wirelessly acquired voltage measurements of the dosimeters for all 'wake-up' events.

Real-Time Measurements of Current Consumption

The Power Profiler Kit (PPK) board (NRF6707, Nordic Semiconductor) served as a current measurement tool for the dosimeters. The PPK supplied power to BLE blue light dosimeter through the external device under test (DUT) connectors, and used its ADC to measure a voltage drop over a series of measurement resistors. The real-time current consumed by blue light dosimeter is I [A]=measured voltage drop [V]/resistor value [ohm]. The PPK provided current measurements with a resolution down to 0.2 µA and a real-time display with a resolution down to 13 µs to the desktop application. By mounting the PPK on an nRF52 development kit (DK) board (NRF52-DK, Nordic Semiconductor), the nRF52-DK provided the connection between the PPK and the computer with the PPK application. The PPK software was an app running in nRF Connect, a cross-platform development software for BLE.

BLE Communication Modalities

In a connected mode, the device must satisfy connection rules provided by the user interface to establish a connection link. The connection parameter that complies with Accessory Design Guide for Apple Devices (Release R8) is slave latency=3, and maximum connection interval=500 ms such that maximum connection interval×(slave latency+1)≤2 s. Devices under these connection rules exchange data packets with the user interface every 2 s to maintain connected status even when there is no need to transmit user data. This operation significantly degrades the overall power efficiency of the device. In an advertising mode, BLE devices send data to any listening user interface that knows the device ID without establishing any connection. This mode enables efficient BLE operations for low duty cycle applications such as those described herein.

Circuit Designs and Operating Principles

Figure 2A:
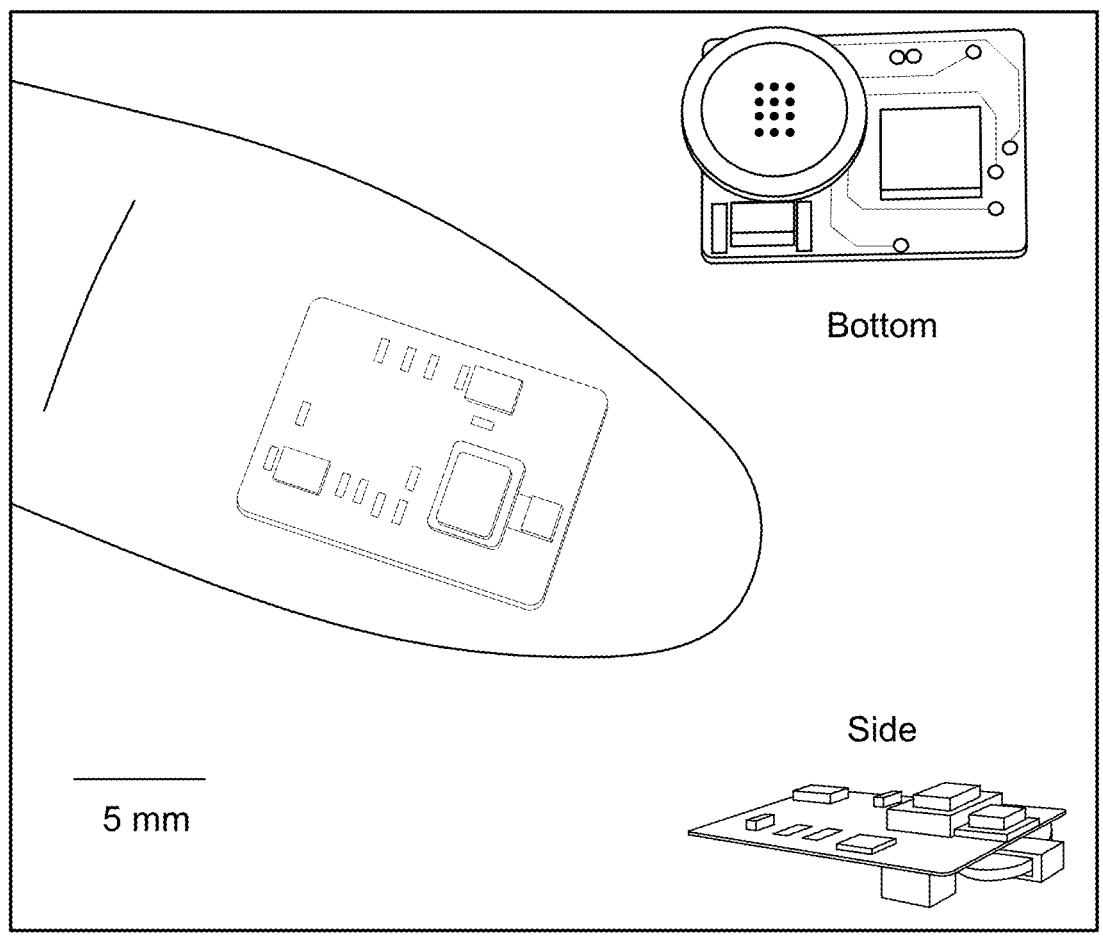
FIGS. 2A-2H show ultra-low power, light-adaptive, wireless blue light dosimeter according to certain embodiments of the invention.
Figure 2B:
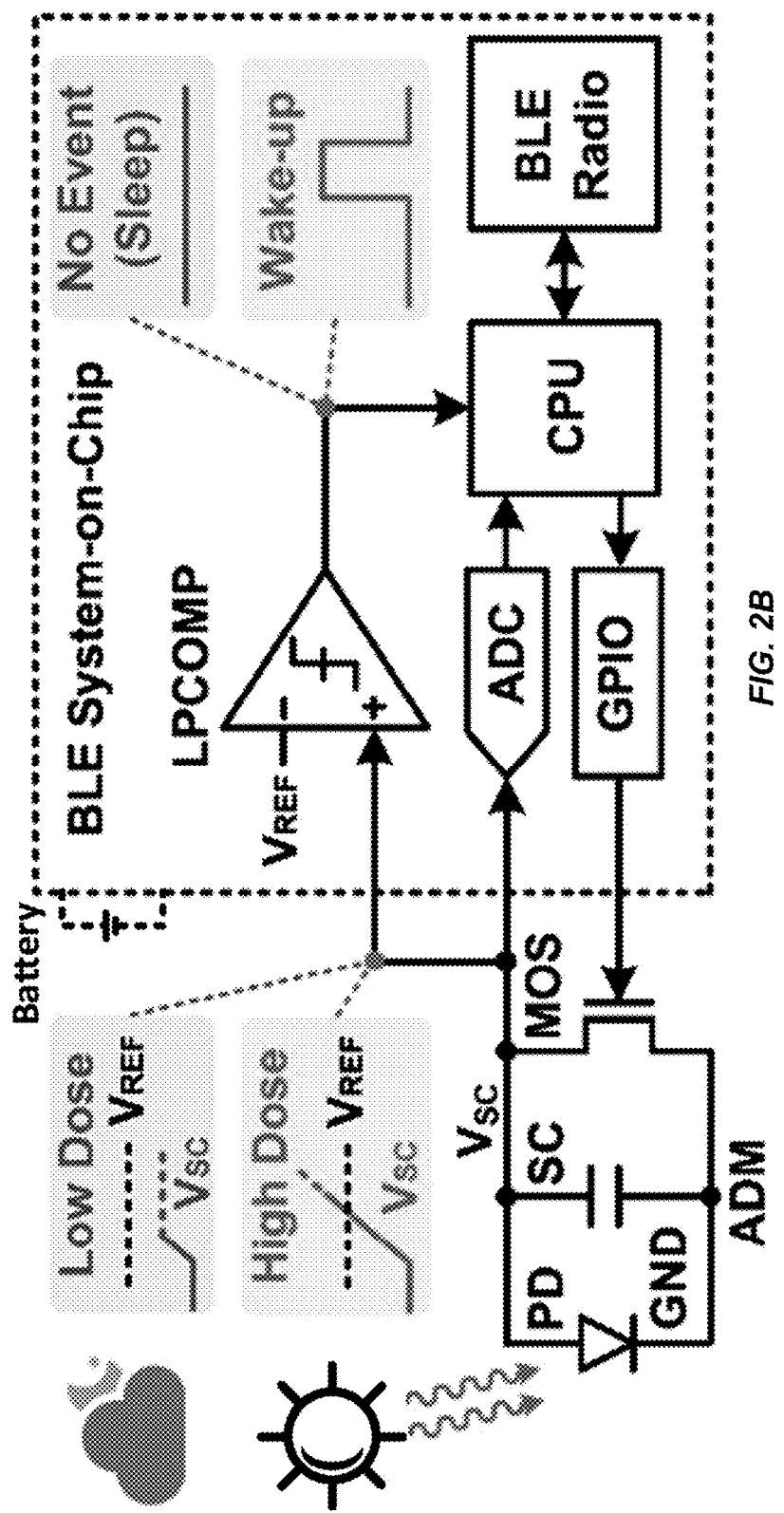
Figure 7:
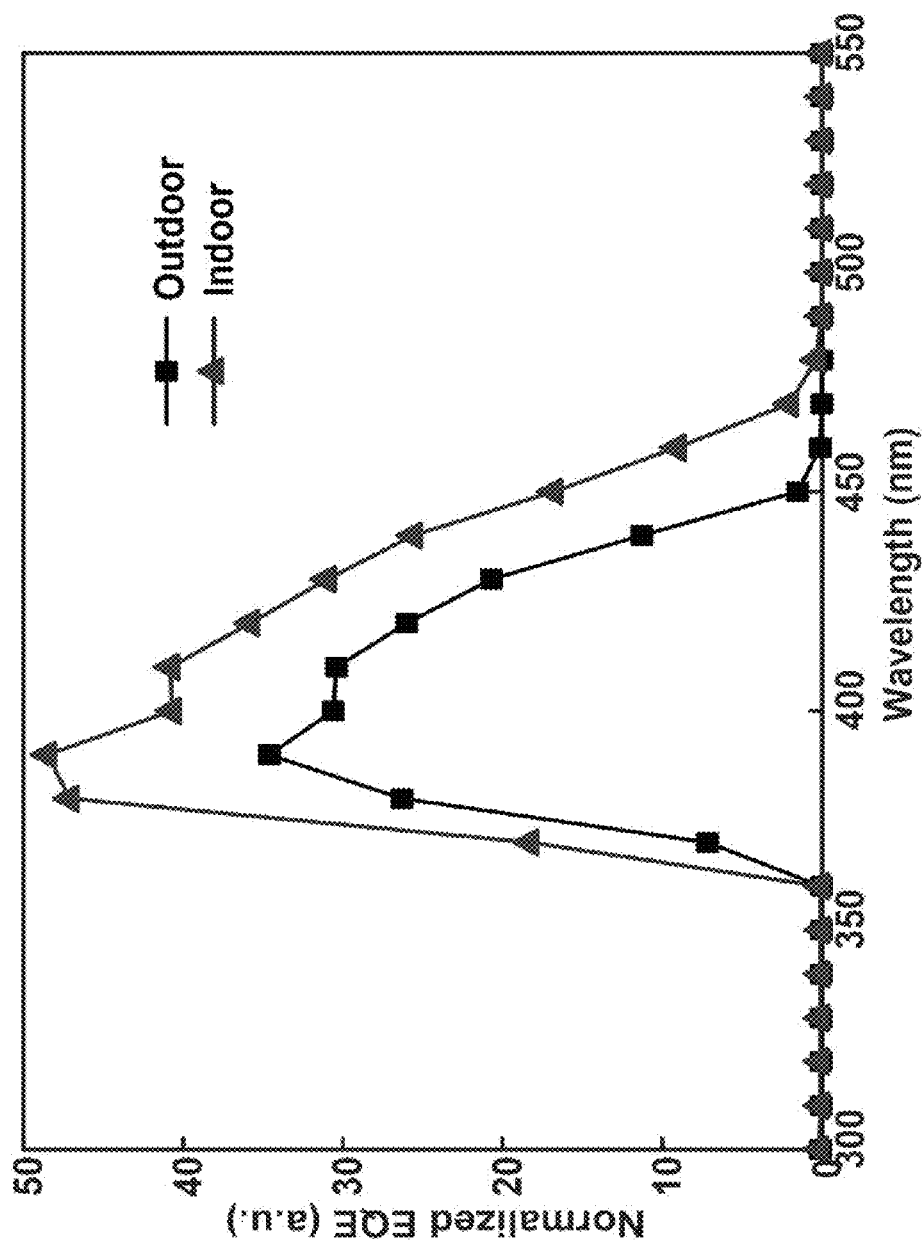
FIG. 7 shows external quantum efficiency (EQE) of a blue light PD, according to embodiments of the invention.

The device shown in FIG. 2A exploits the unique design features described above for dosimetry of blue light with an estimated operating lifetime of 1.2 years. The width (w), length (l), thickness, and weight are 8.1 mm, 10.9 mm, 3.2 mm, and 0.36 g, respectively. Two subsystems, as shown FIG. 2B, are key to efficient, ultra-low power operation and long lifetime in this miniaturized form factor: (1) the ADM, as a light-powered sensing system that continuously measures exposure dose in an accumulation mode, and (2) a BLE SoC configured with a light-adaptive circuit design to automatically switch between two operational states: 'run' and 'sleep', in response to changing irradiation conditions. The ADM includes a photodiode (PD), a supercapacitor (SC), and a MOSFET. The PD continuously and passively generates photocurrent with a magnitude that is directly and linearly proportional to the intensity of the exposure light. The SC, arranged in parallel with the PD, captures and stores the resulting accumulated charge. The corresponding voltage on the SC ($V_{SC}$) can be calibrated to the total exposure dose across a wavelength range defined by the external quantum efficiency (EQE) of the PD, as shown in FIG. 7. To prevent excessive charge buildup on the SC, the gate of a MOSFET connects to a GPIO of the BLE SoC for programmable control of current flow between the source and the drain of the MOSFET, as means to trigger the discharge of the SC.

Figure 2C:
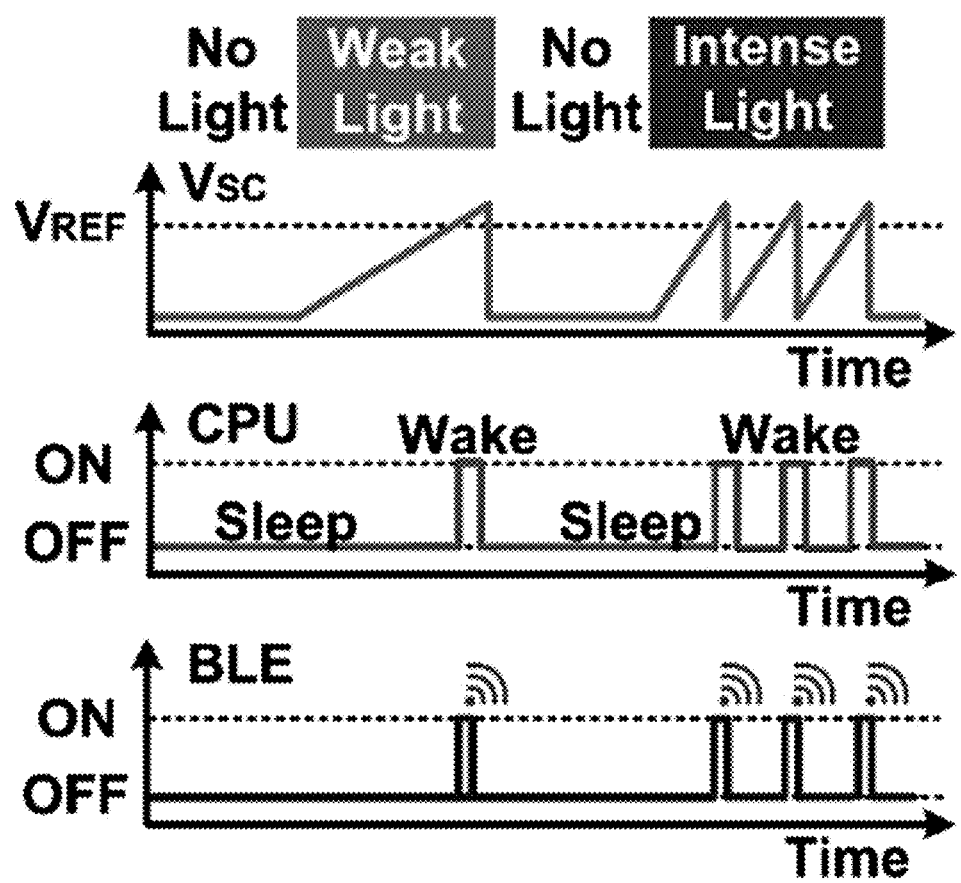
Figure 8:
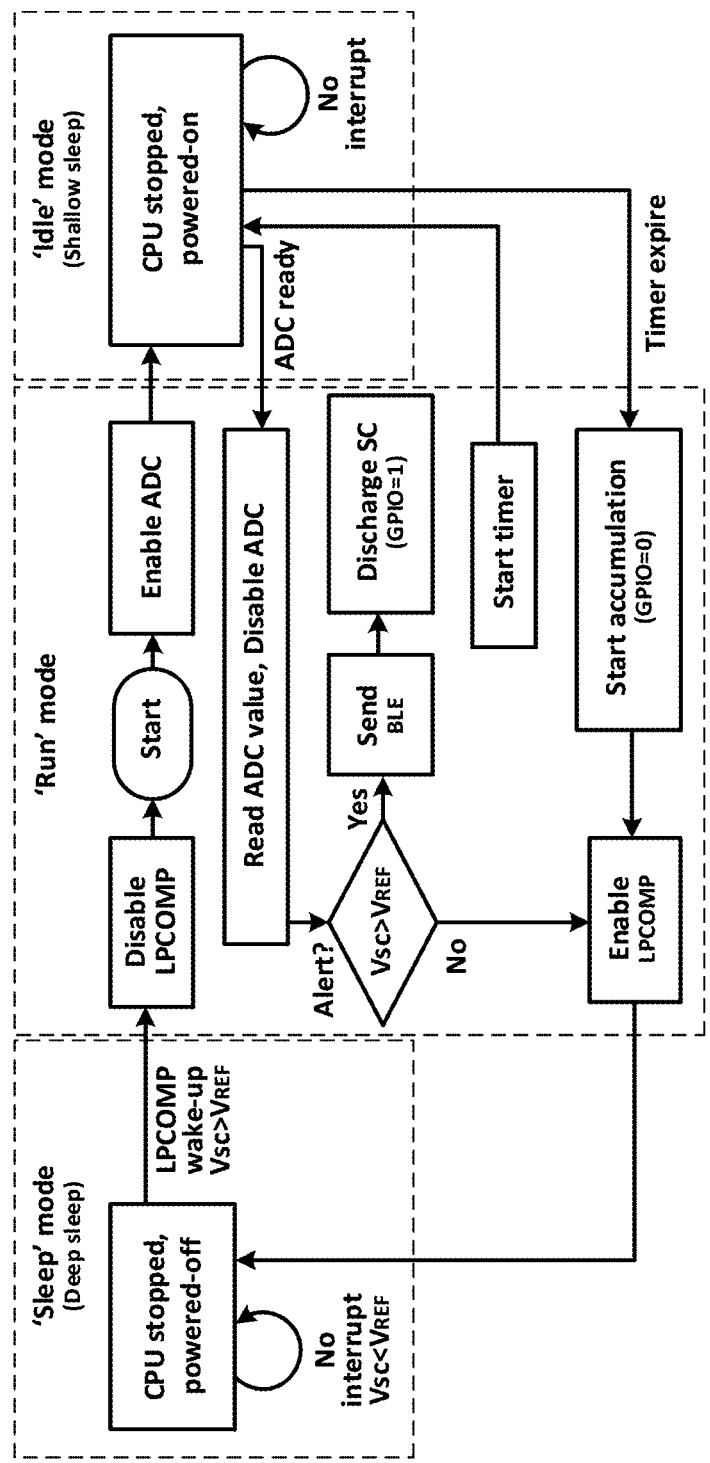
FIG. 8 shows a flowchart of a BLE blue light sensing system utilizing ultra-low power sleep/wake-up capability, according to embodiments of the invention. When BLE operation starts, CPU triggers ADC sampling and goes into 'idle' mode (shallow sleep mode), which makes the entire BLE SoC, except ADC and Timer, wait in a halt status. When the ADC reports a ready interrupt, the CPU wakes up, reads the ADC value and compares the SC voltage ($V_{SC}$) against a preprogrammed reference voltage ($V_{REF}$). At low blue-light conditions, $V_{SC}<V_{REF}$, CPU enables LPCOMP to monitor $V_{SC}$ and goes into 'sleep' mode (deep sleep mode), which powers down the entire SoC except LPCOMP. The device remains in deep sleep in no light conditions indoors or during nighttime. When $V_{SC}$ rises above $V_{REF}$, CPU wakes up and runs the program from the starting point. At high blue-light conditions ($V_{SC}>V_{REF}$), CPU alerts the user by sending BLE packets, starts discharging SC (sets GPIO as high voltage) and enters 'idle' mode. After a preprogrammed discharging duration (e.g., 5 s), CPU wakes up and finishes discharging (sets GPIO as low voltage) and goes in to 'sleep' mode.

In light-adaptive operation, a low-power comparator (LP-COMP) of the BLE SoC monitors $V_{SC}$ while the device is in an ultra-low power 'sleep' mode. When $V_{SC}$ exceeds a pre-programmed reference voltage ($V_{REF}$), the LPCOMP generates a 'wake-up' event that places the BLE SoC in a 'run' mode for about 6.5 s, with average current consumption of about 10.22 µA. In this example, the CPU wirelessly transmits the input voltage of an ADC that connects to the SC, activates the MOSFET to discharge the SC and then returns the system to 'sleep' mode. The time required to sample the input voltage of an ADC, transmit BLE packets, and discharge the SC (e.g., 5 s) determines the 'run' time. Unless the voltage on the SC exceeds $V_{REF}$, the device remains in the "sleep" mode, where the CPU and all the peripherals except LPCOMP are deactivated, thereby reducing the average current consumption to about 0.43 µA, roughly twenty times less than that associated with the 'run' mode. FIG. 2C graphically illustrates the overall operation, where in the absence of light, the device remains in 'sleep' mode until the exposure dose determined by the ADM exceeds $V_{REF}$, at which time the CPU 'wakes-up', wirelessly transmits data, discharges the ADM and returns to 'sleep'. The 'wake-up' frequency increases with increasing irradiance in the wavelength range defined by the EQE of the PD. The purpose of this light-adaptive operation is two-fold: (1) to frequently alert users of their exposure doses during high intensity irradiation conditions, while remaining in 'sleep' for extended periods during conditions of low or no irradiation, and (2) to autonomously and efficiently manage power consumption based on the need for detection. The flow diagram for the system software is shown in FIG. 8. As an additional option to avoid unexpected data loss due to disruption of the wireless connection to the phone, the system can be programmed to write dosage data into memory available on the BLE SoC, as described in detail subsequently.

Figure 2D:
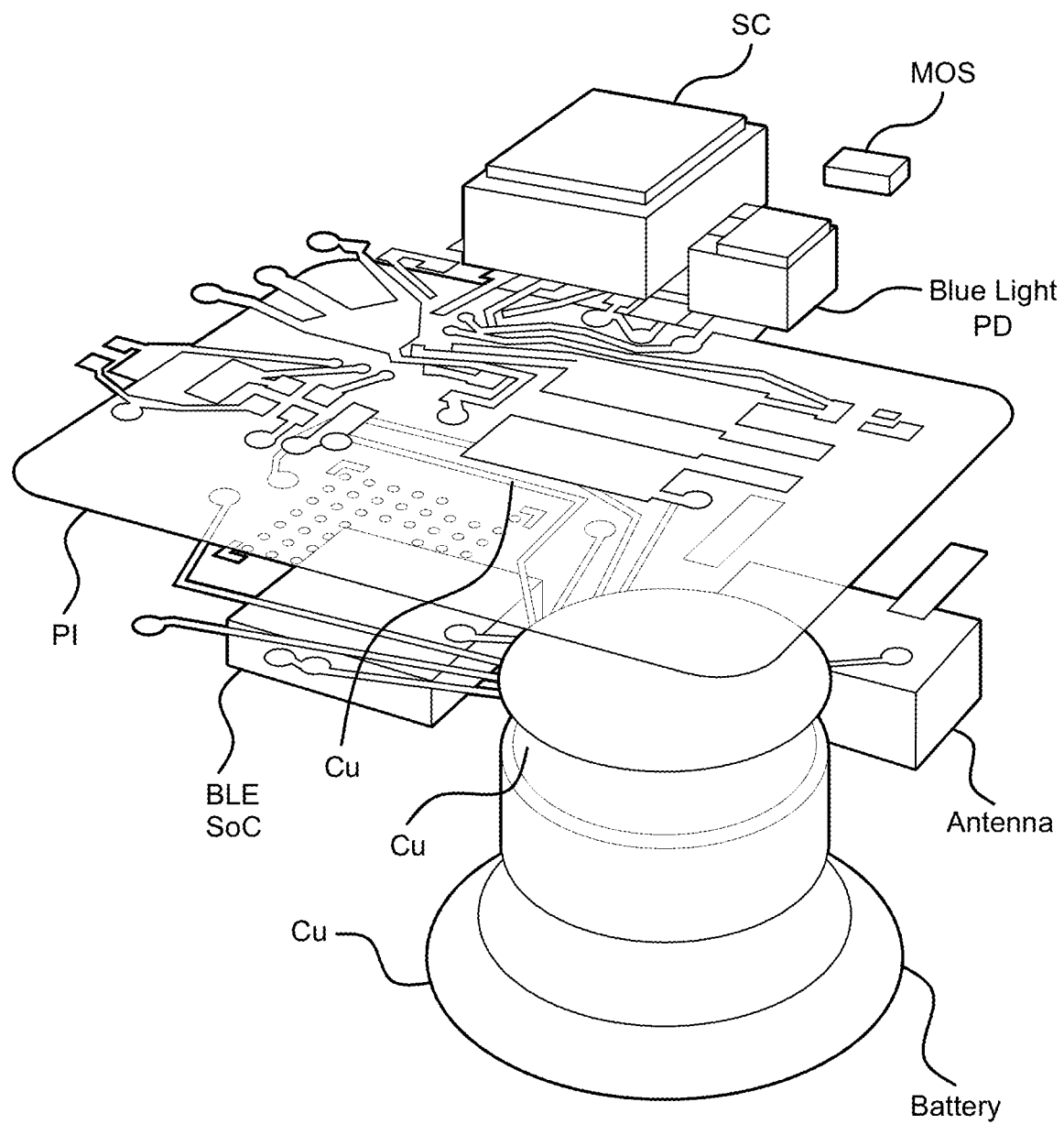
Figure 2E:
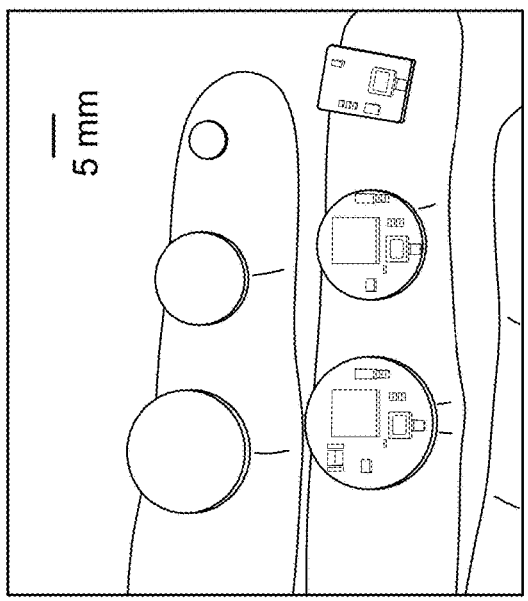
Figure 2F:
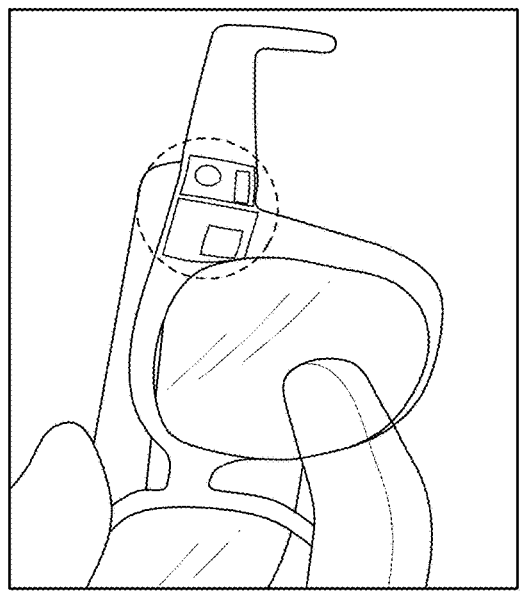
Figure 2G:
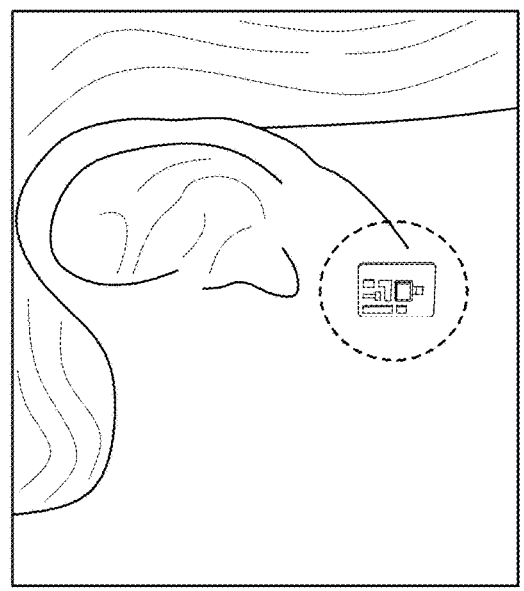
Figure 2H:
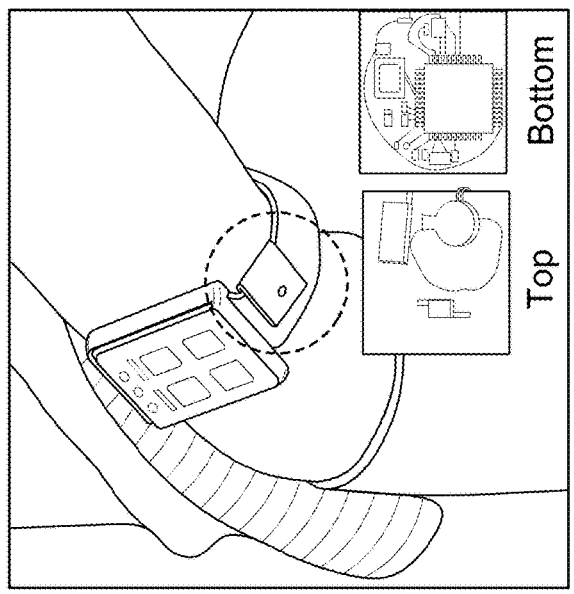

The devices use thin (e.g., 112 µm thickness) copper-clad polyimide sheets processed with a laser cutting tool to define interconnecting traces of Cu and support pads for bonding off-the-shelf, surface-mount components by soldering, as shown in FIG. 2D. The battery is a key factor in determining the overall size and weight, as well as the operating lifetime. FIG. 2E shows blue light dosimeters built with coin cell batteries that have capacities of 140 mAh, 40 mAh, and 5.5 mAh, where the device diameters (d) are 16.6 mm and 13.5 mm, and the length and width (l×w) are 8.1 mm×10.9 mm, respectively. With assumptions that (i) blue light exposure from the sun occurs at a constant intensity of 7.8 mW/cm² (moderate level outdoors), and (ii) exposure at this level occurs for a total of 6 hours in a typical day, the estimated operating lifetimes of these dosimeters are, in the order of decreasing sizes, greater than 30.9 years, 8.8 years, and 1.2 years. The miniaturized form factors allow many options and modes of use. Examples include, but are not limited to, sunglass clips (FIG. 2F), earrings (FIG. 2G) and wristband accessories (FIG. 2H). The devices in hermetic housings of different designs, as shown in FIGS. 2F-2H, enhance the operational reliability from environmental and mechanical influences.

Blue Light Dosimeters Designed for Use Outdoors

SAD is a relatively common condition in North America and a widespread cause of depression in the winter months. The treatment for SAD involves regular phototherapy using light from natural sources, or a bright white- or blue-LED illumination panels. Information from personal blue light dosimeters can help to guide behaviors that meet recommended daily doses of exposure to prevent mood disorders. This section demonstrates the use of devices with designs outlined in the previous sections, tailored for monitoring sun exposure at varying irradiance levels. Measurements of current consumption allow estimations of battery life for these use cases. The devices use a blue PD with peak responses at 390 nm (FIG. 7) and a SC with a capacitance of 11.5 mF.

Figure 3A:
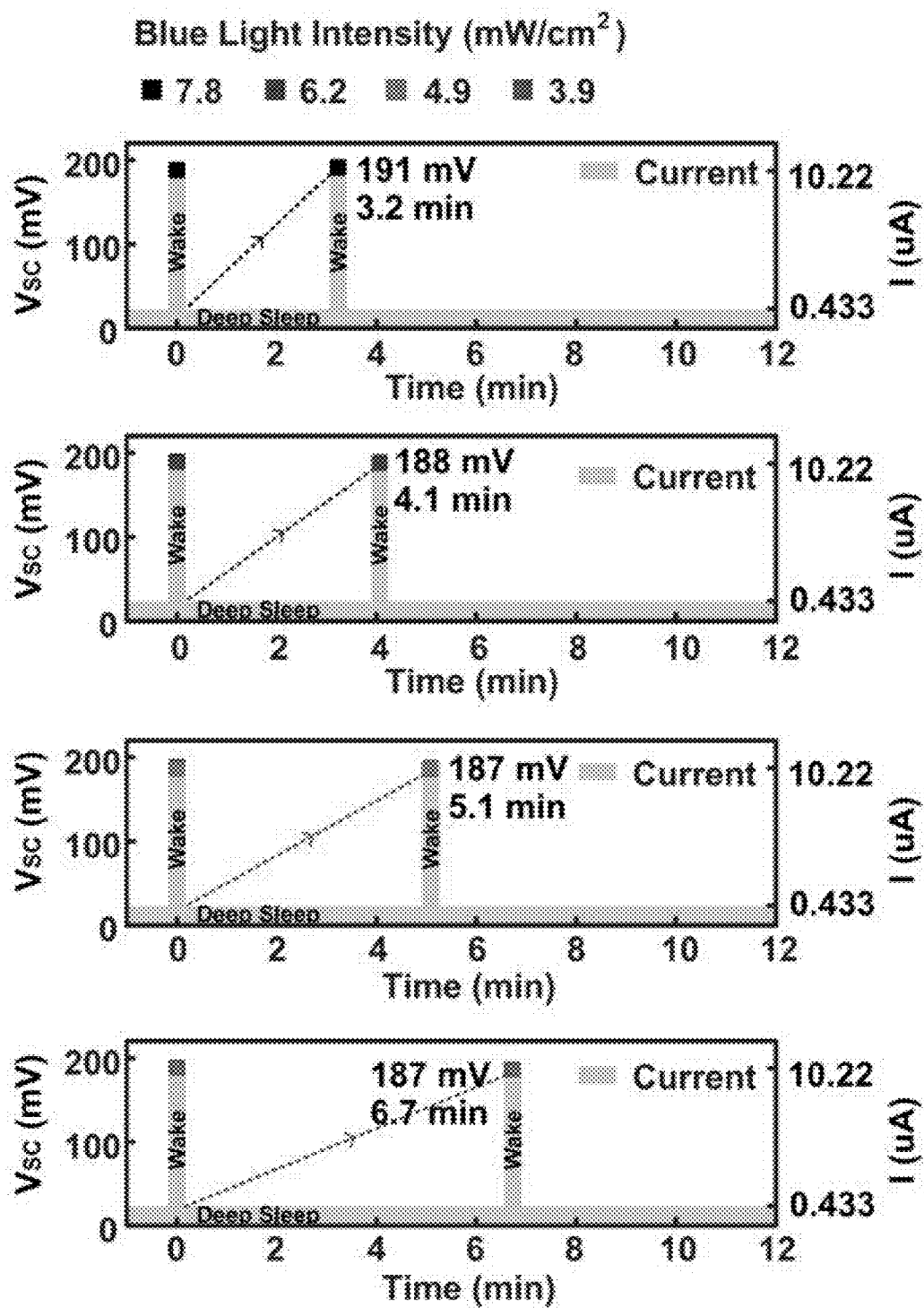
FIGS. 3A-3C show outdoor characterization and power consumption of blue light dosimeters according to certain embodiments of the invention.
Figure 3B:
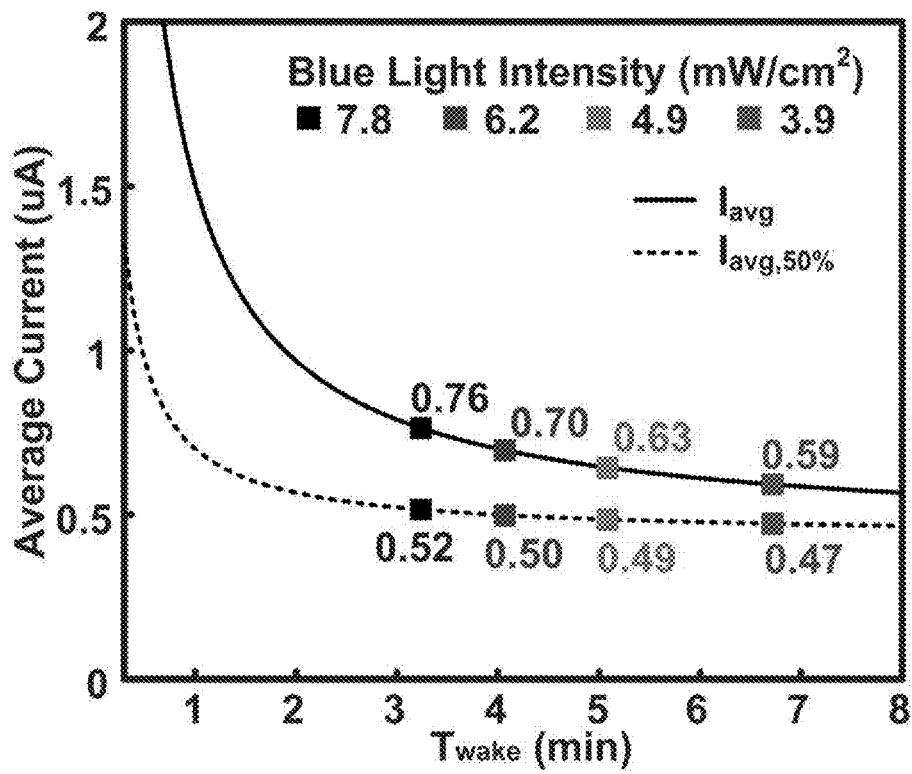
Figure 3C:
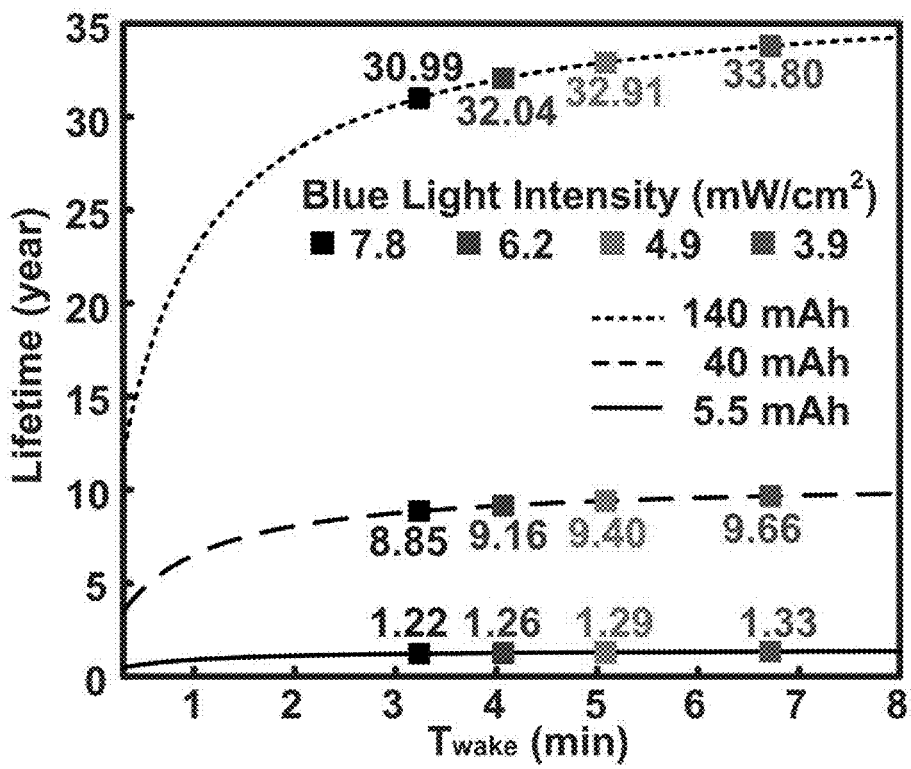
Figure 9:
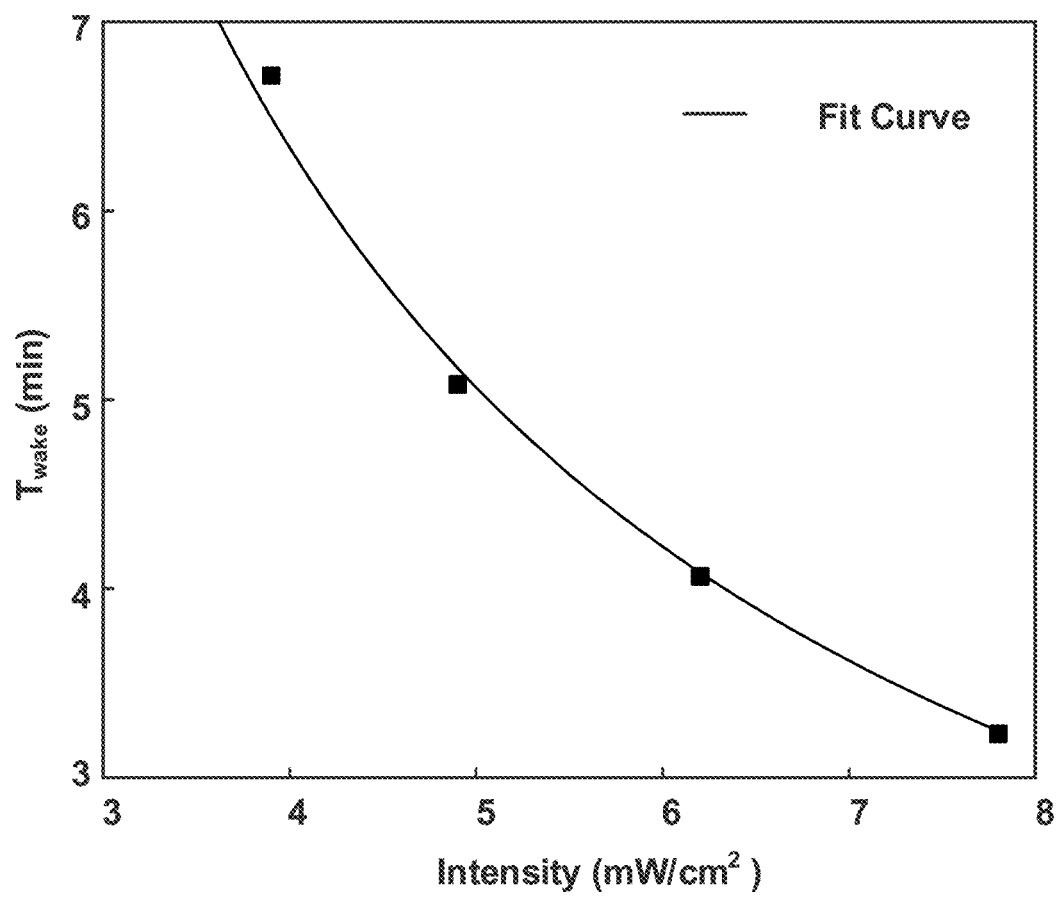
FIG. 9 shows measured time intervals ($T_{wake}$) between 'wake-up' events as a function of exposure intensity, according to embodiments of the invention. Fit Curve: Intensity [W/cm$^2$]×$T_{wake}$ [s]=Exposure dose ($D_{tot}$)=1.52 J/cm$^2$.
Figure 10A:
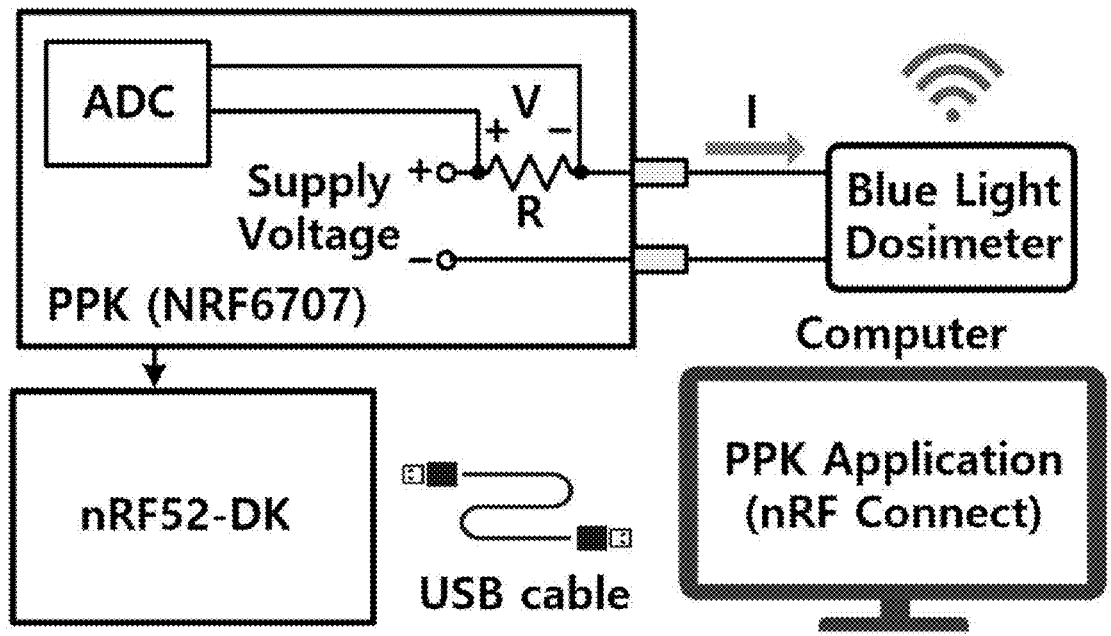
FIGS. 10A-10D show real-time current measurements of BLE blue light dosimeters, according to embodiments of the invention.
Figure 10B:
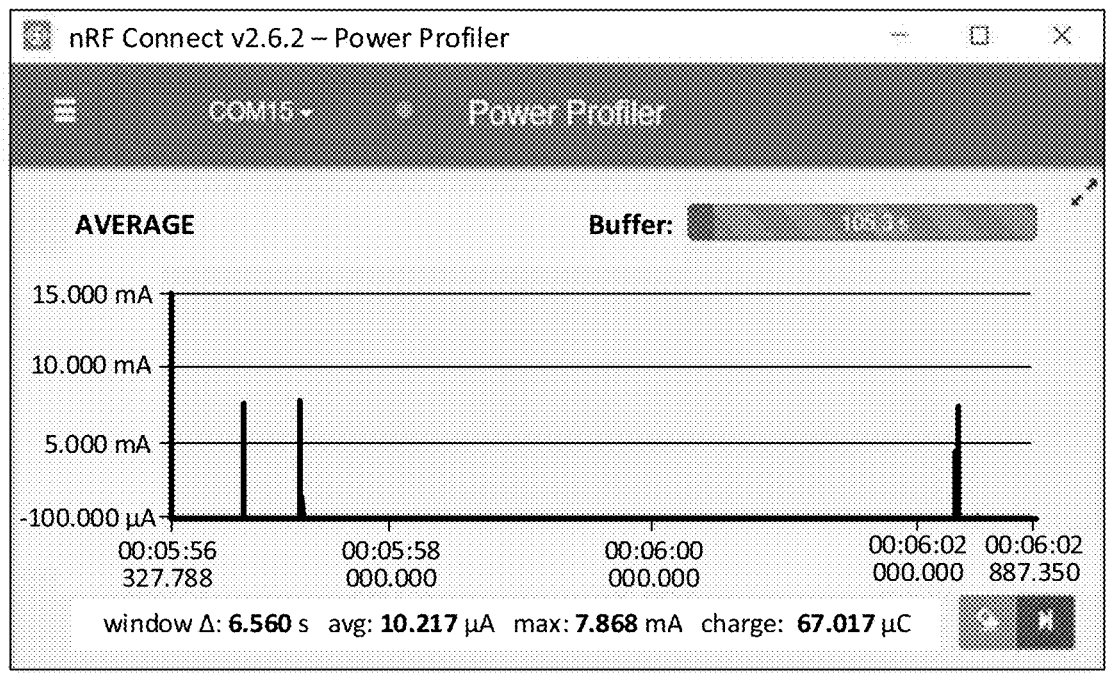
Figure 10C:
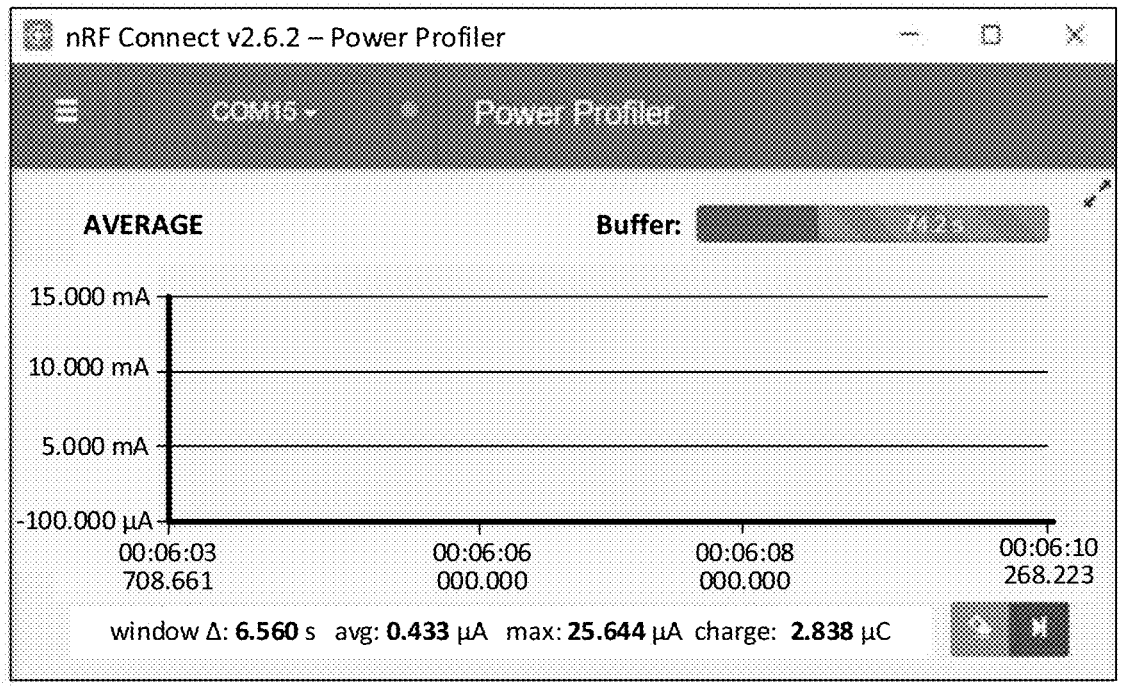
Figure 10D:
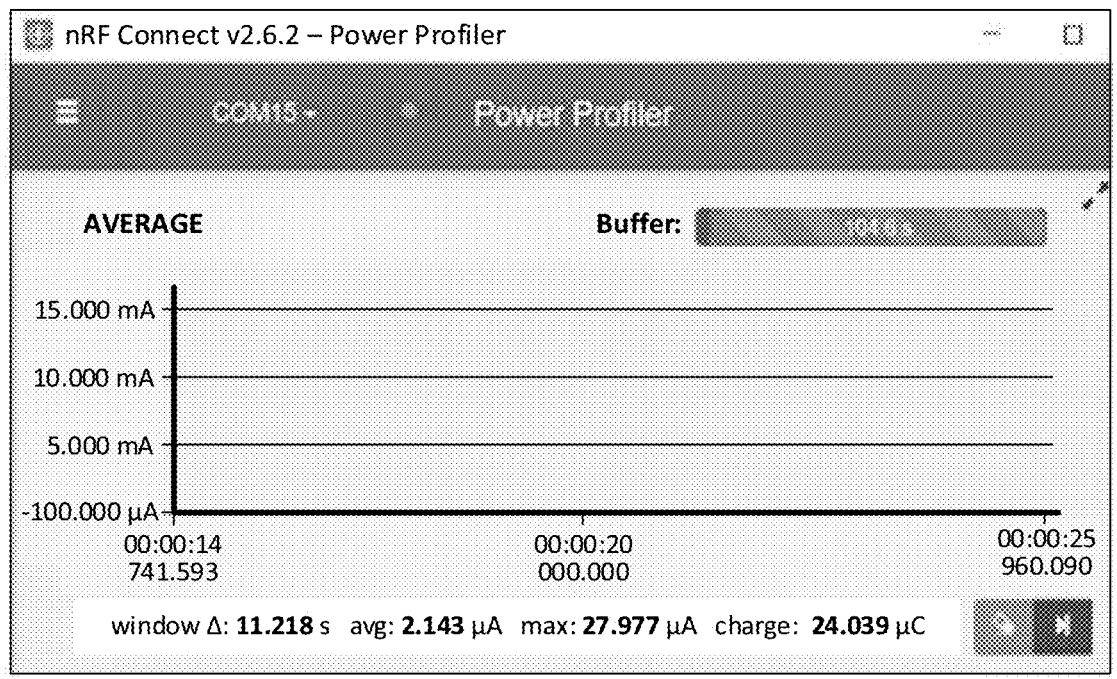
Figure 11B:
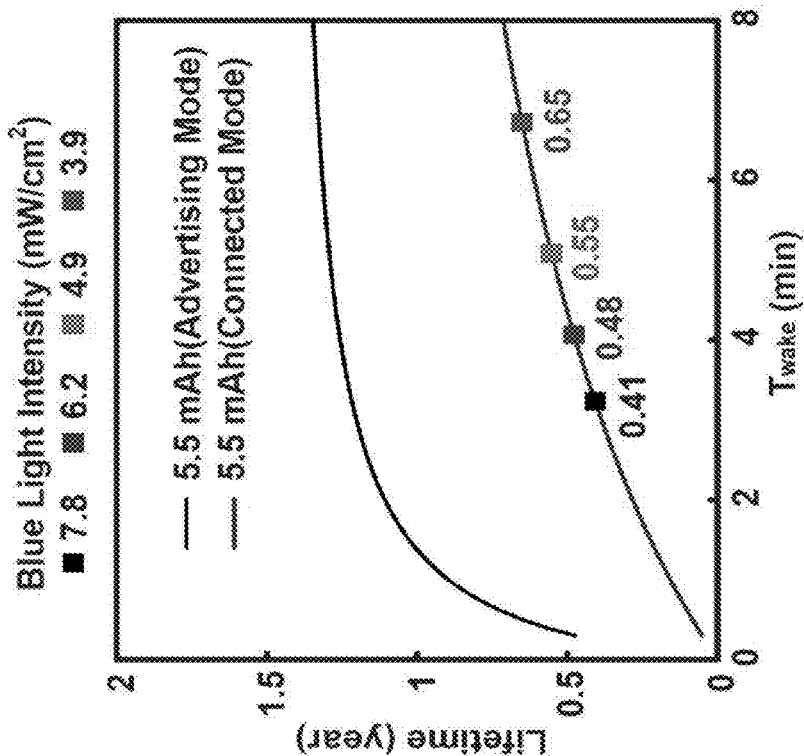
FIGS. 11A-11B show power consumption and expected lifetime of BLE dosimeters in connected mode, according to embodiments of the invention.
Figure 11A:
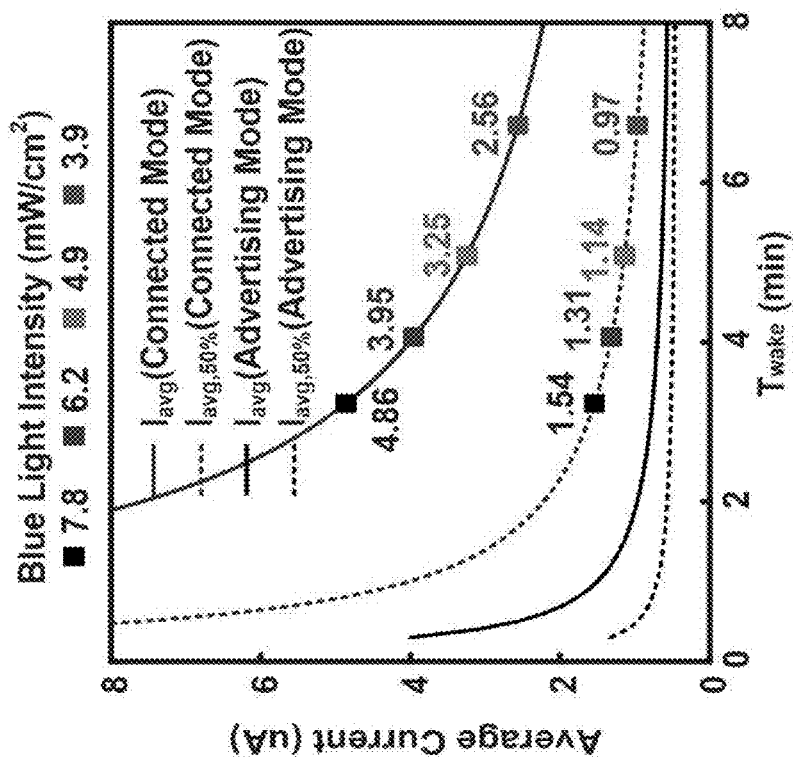

Calibration involved exposure of the device to the sun on a clear day and to the sun attenuated 80%, 63%, 50% by neutral density filters, corresponding to high to low irradiation conditions. A commercial blue-light radiometer (Visible Blue Light Meter, Solarmeter) measured the reference exposure intensity. The time integration of reference exposure intensity over Twake is the reference exposure dose. A BLE-enabled smartphone wirelessly receives alerts at each 'wake-up' event. For constant reference exposure intensities of 7.8 mW/cm², 6.2 mW/cm², 4.9 mW/cm², and 3.9 mW/cm², the time intervals between 'wake-up' events ($T_{wake}$) are 3.2 min, 4.1 min, 5.1 min, and 6.7 min, respectively, as shown in FIG. 3A. As the irradiation intensity decreases, $T_{wake}$ increases proportionally (FIG. 9) such that the exposure dose ($D_{tot}$) of blue light at each 'wake-up' event is $D_{tot}$=Intensity [W/cm²]×$T_{wake}$ [s]=1.52±0.03 J/cm2. $T_{wake}$ is a determining factor in computing the average current ($I_{avg}$) consumption of the device: $I_{avg}$=[$I_{run,avg}$× $T_{run}$+$I_{sleep,avg}$×($T_{wake}$−$T_{run}$)]/$T_{wake}$. FIGS. 10A-10D show measurements of teal-time current consumption. BLE dosimetry can occur in two wireless BLE transmission modalities: connected and advertising modes. The devices measured here operates in advertising mode. The current measurements for connected mode are shown in FIGS. 11A-11B. The average current consumption, as shown FIGS. 10A-10D, in the 'sleep' mode is $I_{sleep,avg}$=0.43 µA and in the 'run' mode is $I_{run,avg}$=10.22 µA. The runtime after wake-up events is $T_{run}$=$T_{ADC}$+$T_{BLE}$+$T_{DSC}$=6.56 s, where $T_{ADC}$ and $T_{BLE}$ is the time required to sample the ADC input voltage and to transmit the sampled data via BLE, respectively, and $T_{DSC}$ is a pre-programmed time (e.g., 5 s) to fully discharge the SC. In light-adaptive operation, as the irradiation intensity increases, $T_{wake}$ decreases proportionally and $I_{avg}$ increases. For constant exposure intensities of 7.8 mW/cm², 6.2 mW/cm², 4.9 mW/cm², and 3.9 mW/cm², the $I_{avg}$ are 0.76 µA, 0.70 µA, 0.63 µA, and 0.59 µA, respectively (FIG. 3B). The average current for 365×6 hours of use per year corresponding to 50% of the available daylight is $T_{avg,50\%} = I_{avg} \times 6$ [h]/24 [h] + $I_{sleep,avg} \times 18$ [h]/24 [h]. In the 50% exposure condition, the device lifetime is lifetime [h]=battery capacity [mAh]/$I_{avg,50\%}$ [mA]. As an illustrative example, a device powered by a button cell battery with a capacity of 5.5 mAh, continuously exposed at a constant intensity of 7.8 mW/cm², has an expected lifetime of 1.2 years (FIG. 3C), with an average current of $I_{avg,50\%}$=0.52 µA for 50% of the available daylight. With assumptions that (i) blue light exposure from the sun occurs at a constant intensity of 7.8 mW/cm² (moderate level outdoors), and (ii) exposure at this level occurs for a total of 6 hours in a typical day, the estimated operating lifetimes of these dosimeters are, in the order of decreasing sizes, more than 30.9 years, 8.8 years, and 1.2 years.

On-chip data retention capabilities can be used to prevent data loss upon loss of a wireless connection to the phone. The BLE SoC (nRF5283, Nordic Semiconductor) supports 4 KB static random access memory (SRAM) that can be used for this purpose. As a specific example of this mode of operation, the device can be programmed to store the latest 10 measurement events (10×2 Bytes) in the SRAM. Transmission of the entire data set then occurs upon each 'wake-up' event. When the phone is within the communication range of the device, the application reads and compares the acquired data array to the data history stored on the phone and performs updates with any new data, as necessary. With the SRAM used in this manner, the average current consumption in 'sleep' mode increases to $I_{sleep,avg}$=0.788 µA, roughly two times greater than that associated with operation without the SRAM. For transmission of the data set, the average current consumption in 'run' mode is $T_{run,avg}$=10.459 µA, and the runtime after wake-up events is $T_{run}$=7 s. Devices with SRAM data retention in the 50% exposure condition at an intensity of 7.8 mW/cm² consume an average current of $I_{avg,50\%}$=0.88 µA, roughly 1.7 times greater than operation without the SRAM; the corresponding lifetimes are therefore smaller by a factor of 0.59.

Conventional BLE dosimeters numerically integrate values of intensity measured in a fixed schedule (e.g., once per 30 s) that balances accuracy and power consumption, in a manner described previously. Between measurements, the CPU remains powered on but in an 'idle' mode (shallow 'sleep' mode) that does not involve execution of any instructions. Here, the average current ($I_{idle,avg}$) is about 2.14 µA (FIG. 10D), roughly five times more than that associated with the 'sleep' mode. Device designs with SRAM data retention like those described in the previous paragraph in the 50% exposure condition at an intensity of 7.8 mW/cm² offer operating lifetimes of 0.72 years with a 5.5 mAh battery, compared to only 8.02 weeks for an otherwise similar device with a conventional, instantaneous-mode of operation with a typical value of $T_{wake}$=30 s.

As an alternative to the 'analog' accumulation-mode sensing of the ADM described previously, BLE devices can be programmed to operate in an equivalent 'digital' accumulation-mode that involves frequently sampling the intensity from the PD, computing the corresponding dose and then storing this information locally in SRAM. When the digitally accumulated dose exceeds a certain level, wireless transmission occurs. Between measurement and transmission, device remains in an 'idle' mode until the sampling timer expires. The average current consumption in 'run' mode for data sampling/storage and for BLE transmission are $I_{run,data}$=2.64 µA and $I_{run,BLE}$=4.89 µA, respectively, and the runtime is $T_{run}$=5.28 s. The average current consumed with $T_{wake}$=30 s and $T_{BLE}$=3.2 min as in an exposure scenario involving daylight at a constant intensity of 7.8 mW/cm² is $I_{avg,50\%}$=2.21 µA. The projected lifetime is 14.8 weeks, roughly two times more than that associated with a conventional, instantaneous-mode device at a typical value of $T_{wake}$=30 s, but still far less than that enabled by the ADM and light-adaptive mode highlighted in the exemplary study.

Blue Light Dosimeters Designed for Use Indoors

Figure 4A:
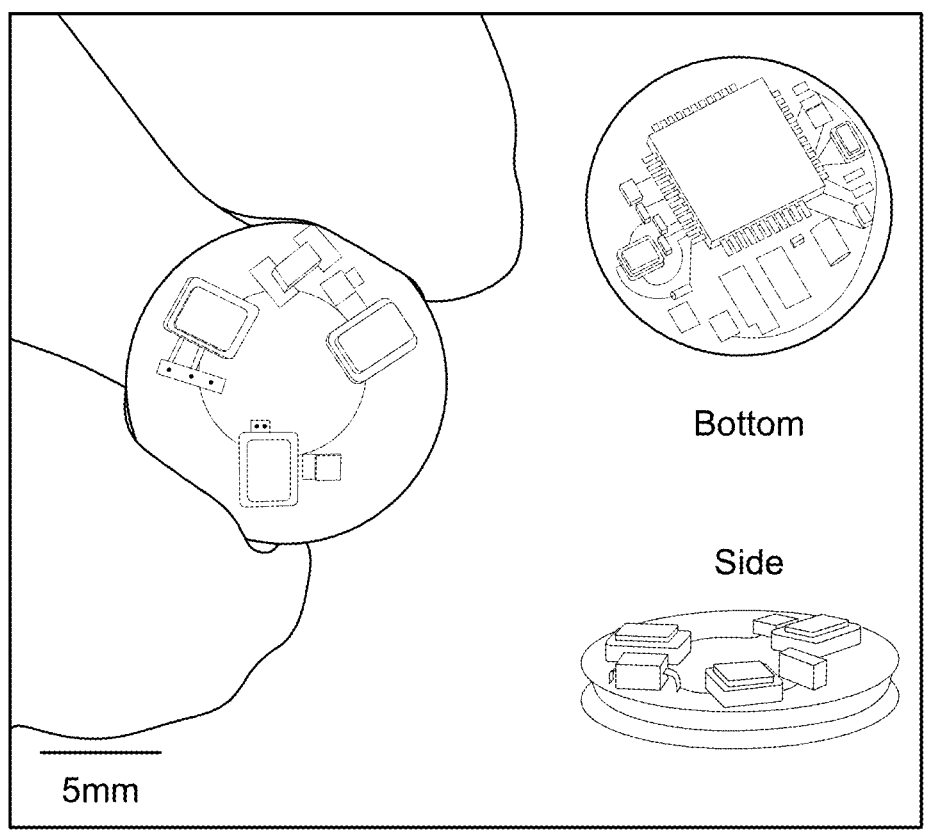
Figure 4B:
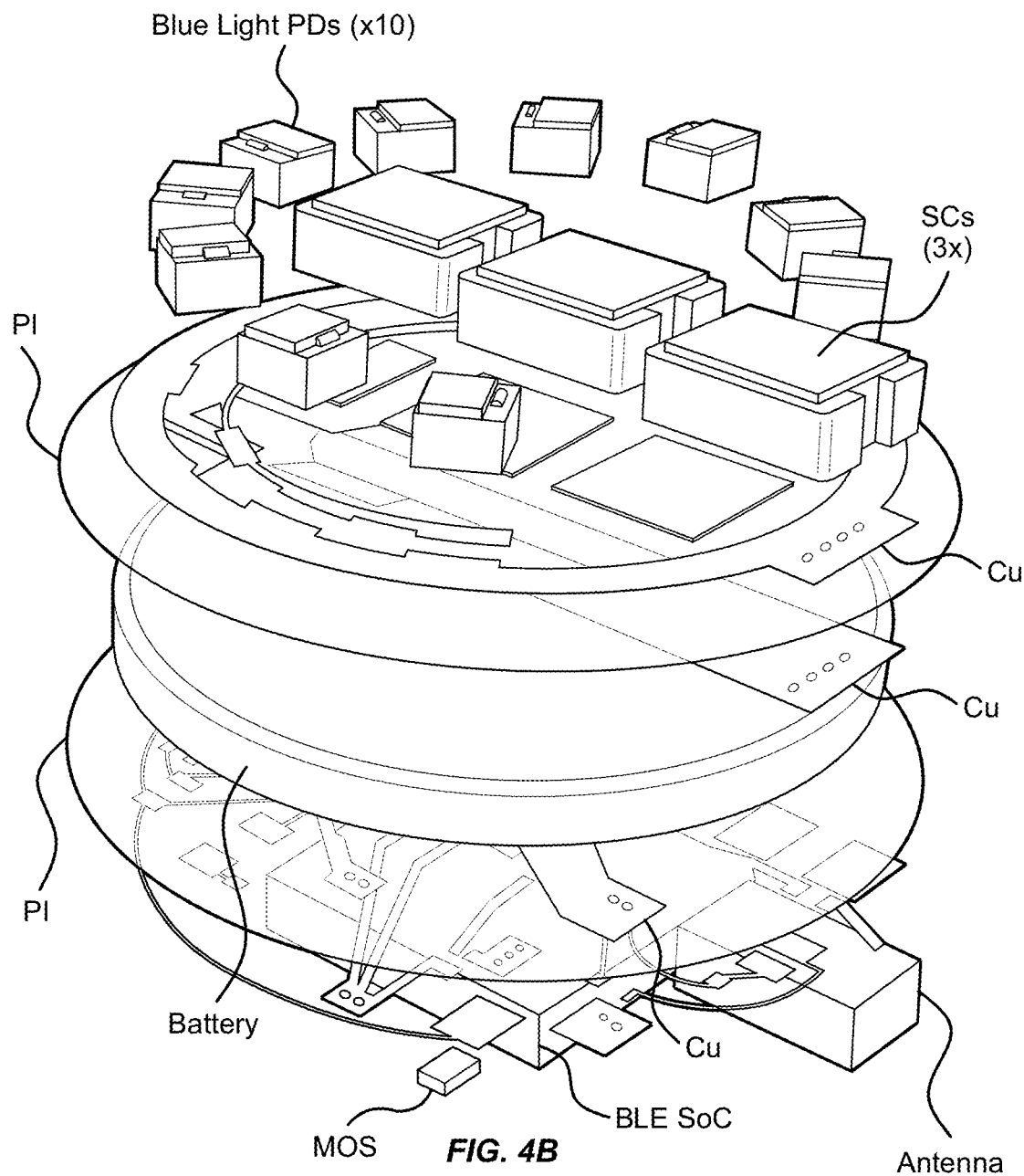
Figure 4C:
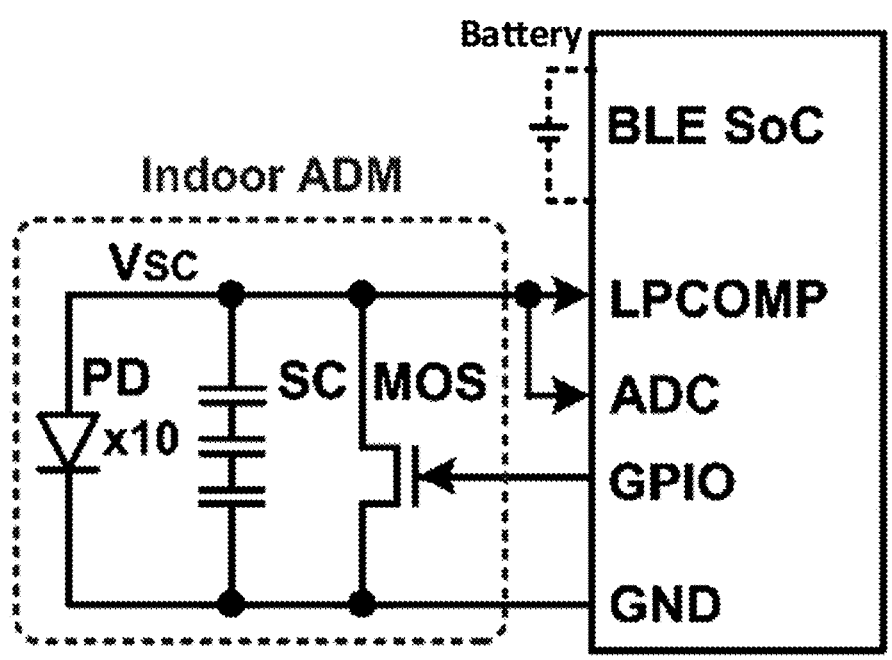
Figure 12A:
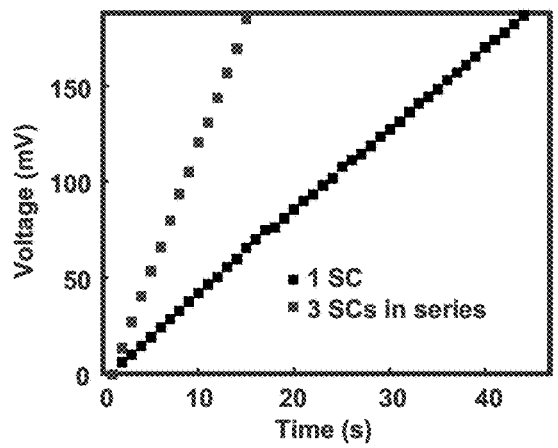
FIGS. 12A-12F show blue light dosimeters with high detection sensitivity for monitoring short-wavelength blue light from indoor lighting and display systems, according to embodiments of the invention.
Figure 12B:
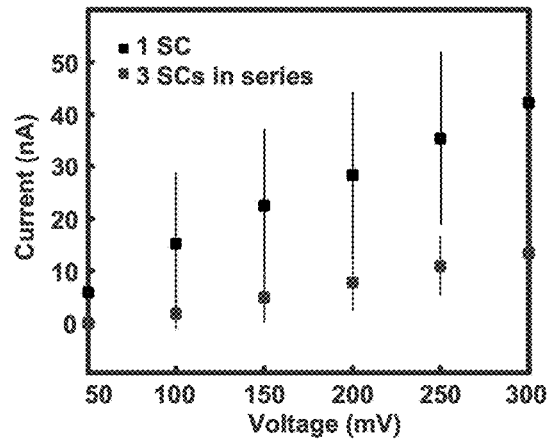

Artificial lights and electronic displays emit blue light at much lower intensities than those associated with daylight outdoors. Nevertheless, the close proximity of the screens to the eyes, together with the long exposure times late into the evening and nighttime, lead to health risks. Blue light dosimeters for indoor use (FIGS. 4A-4B) adopt designs similar to those for outdoors, but with a collection of ten blue PDs in parallel and three 7.5 mF SCs in series (FIG. 4C) to increase the photocurrent and decrease the storage capacitance, for increased sensitivity (FIGS. 12A-12B). The off-the-shelf, blue PDs for indoor monitoring dosimeters have peak response at 390 nm and higher effective responsivity than those used for outdoor applications (FIG. 7). The resulting devices powered by a standard coin cell battery with a capacity of 40 mAh have diameters and thicknesses of 13.5 mm and 3.9 mm, respectively.

Figure 12C:
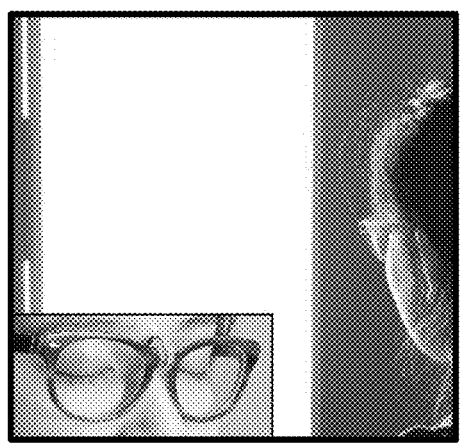
Figure 12D:
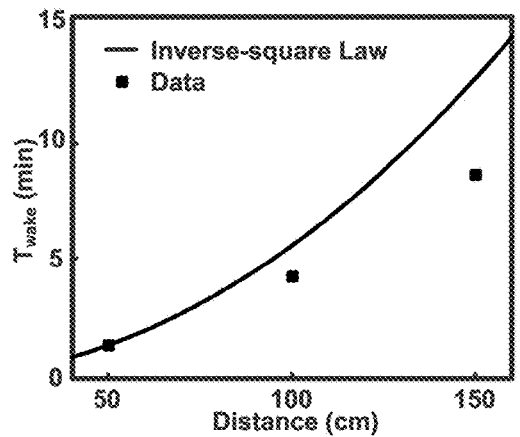
Figure 12E:
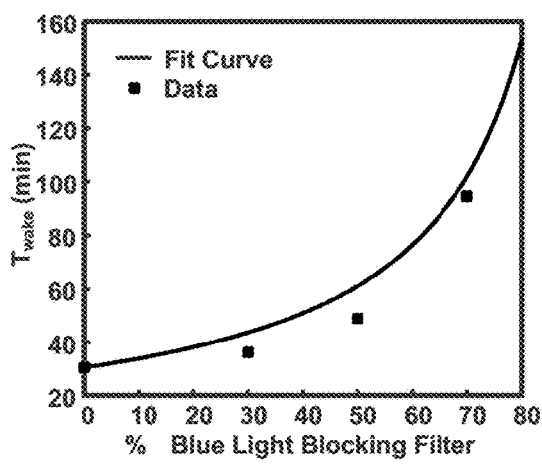
Figure 12F:
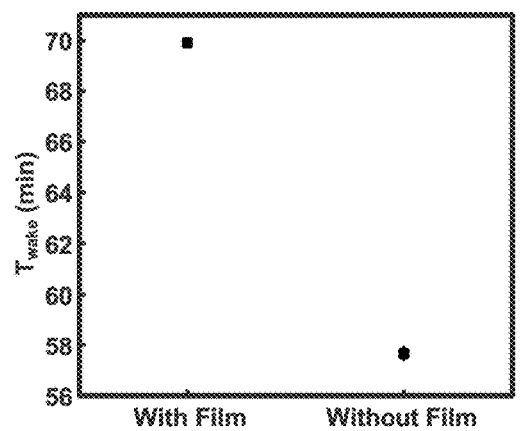

Representative results from exposure to various indoor light sources including a white light phototherapy lamp, different types of artificial light bulbs, and various electronic displays are in FIGS. 4D-4G. Measurements at distances (d) 50 cm, 100 cm, and 150 cm from a white light source used for treatment of SAD (FIG. 12C) indicate $T_{wake}$ values of 1.38 min, 4.24 min, and 8.47 min, respectively (FIG. 4D). Based on the inverse-square law for light propagation from a point source, the exposure intensities roughly scale inversely proportional to d². $T_{wake}$ as a function of the inverse square of d is in FIG. 12D. The measured exposure dose is equivalent over each $T_{wake}$, such that $T_{wake}$ is linearly related to the exposure intensity. Variation from linearity in FIG. 12D occurs because the light source in this case includes an array of LEDs, which cannot be accurately approximated as a point source. $T_{wake}$ of a device at 50 cm from LED, fluorescent, and incandescent light sources are 12.72 min, 22.48 min, and 43.63 min, respectively (FIG. 4E). These results are in agreement with the relative emission spectra of LED, fluorescent, and incandescent bulbs near the blue region of the spectrum. Values of $T_{wake}$ for a device at a distance of 10 cm from a television, a computer monitor, a laptop screen, a tablet computer display, and a smartphone display are 23.75 min, 26.73 min, 30.07 min, 34.19 min, and 51.78 min, respectively (FIG. 4F). All the computers displayed an identical white screen during exposure. As expected, the results show that the largest display screen, the television, emits the most amount blue light and the smallest display screen, the smartphone, radiates the least amount of blue light. A tablet display equipped with a blue light blocking filter with settings of 0%, 30%, 50%, and 70% (FIG. 4G) yield $T_{wake}$ 30.60 min, 36.32 min, 49.00 min, and 94.62 min, respectively. A plot of $T_{wake}$ as a function of attenuation percentage is in FIG. 12E. The mismatch between the detection spectrum of the PD and the filtered spectrum of the tablet partly contributes to the deviation from linearity in FIG. 12E. Additional exposure experiment with and without a commercial anti-blue light film is in FIG.

12F. The $T_{wake}$ with and without anti-blue light film are 69.91±0.06 min and 57.66±0.24 min, respectively. The experiment reveals that the commercial blue-light film (ZOVER) blocks approximately 17.52% of radiation near 390 nm.

Blue Light Dosimeters Designed for Adaptive Use Both Outdoors and Indoors

Figure 5A:
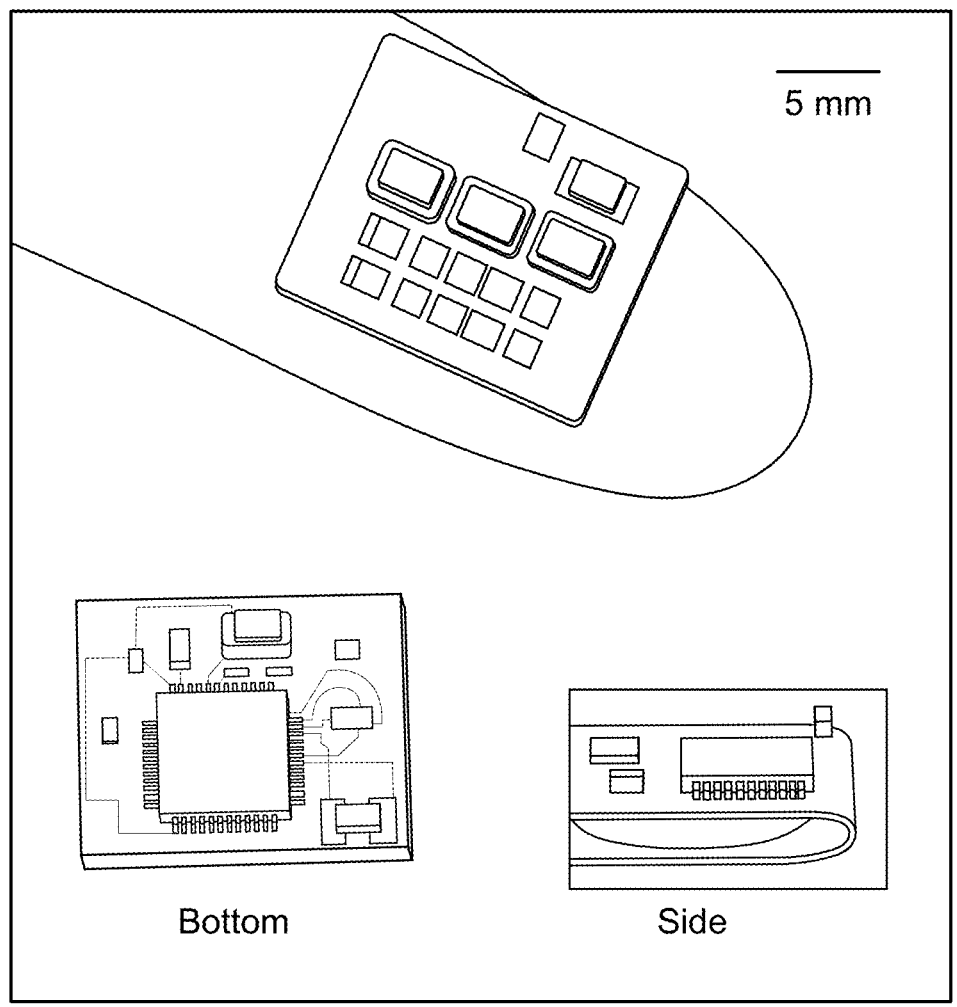
FIGS. 5A-5D show outdoor/indoor dual use blue light dosimeters with an automated, wireless sensitivity-switching scheme according to certain embodiments of the invention.
Figure 5B:
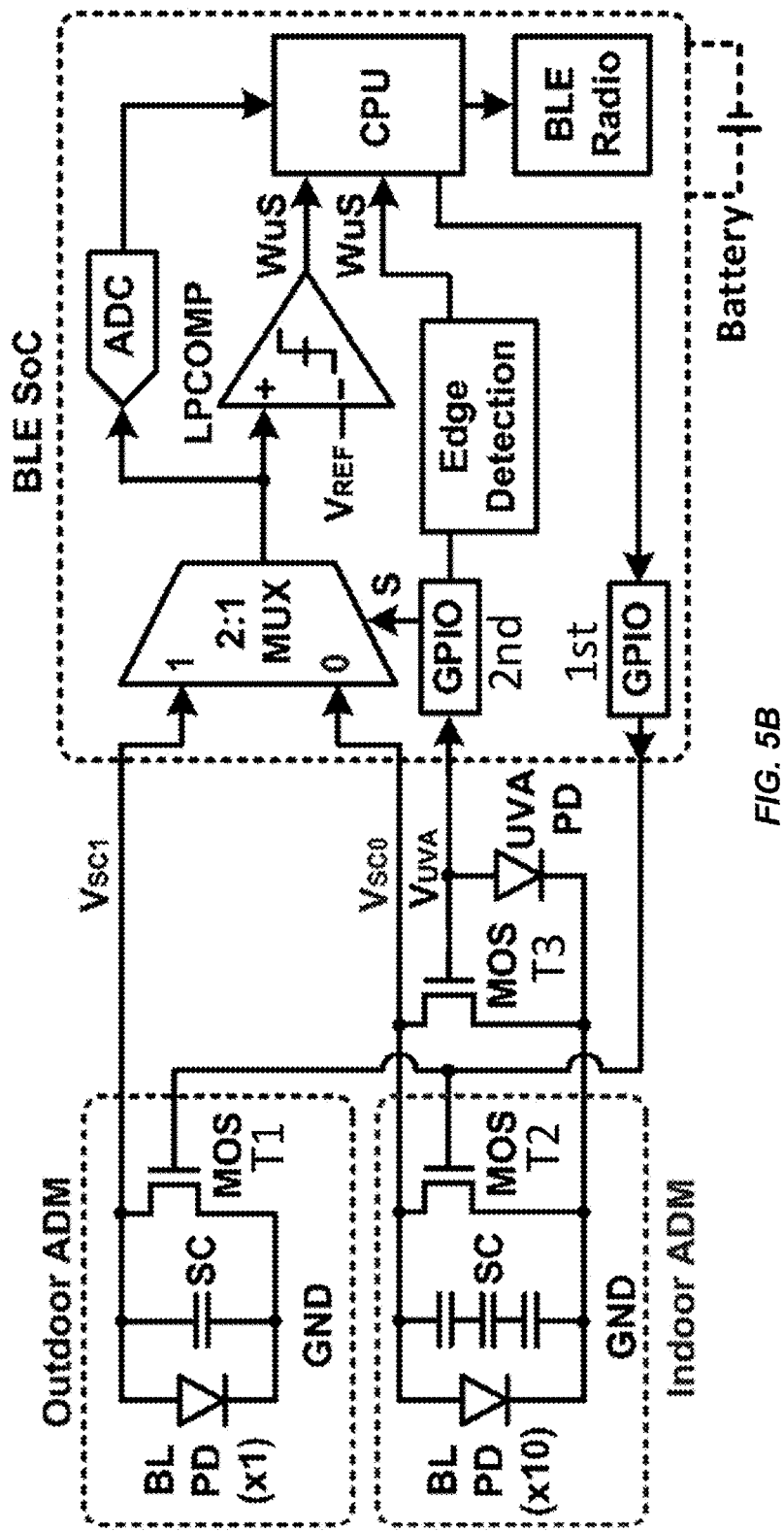

Blue light dosimeters capable of use in scenarios that involve tracking of exposure both indoors and outdoors can be realized using an automated, wireless scheme for switching between parallel sensing circuits based on the presence (outdoors) or absence (indoors) of UVA irradiation, as in FIG. 5A. The width (w), length (l), thickness, and weight are 12.32 mm, 14.78 mm, 4.21 mm, and 1.09 g, respectively, with a 40 mAh battery. The circuit shown in FIG. 5B includes separate ADMs configured for monitoring outdoors (1 blue PD, 1 SC, 1 MOS (T1)) and indoors (10 blue PDs, 3 SCs, 1 MOS (T2)) paired with an UVA PD and a MOS (T3). The BLE SoC is configured to automatically switch between the two ADMs for low (outdoor) and high (indoor) detection sensitivity based on the voltage input from the UVA PD ($V_{UVA}$) via a 2:1 multiplexer (MUX) based on a selection signal (S). A GPIO connected to UVA PD is set to HIGH ('1') or LOW ('0') in the presence or absence of UVA radiation, respectively. The GPIO read value serves as the selection signal. Under solar exposure, $V_{UVA}$ is HIGH, S is '1', and the 2:1 MUX output switches to the outdoor ADM which connects to an LPCOMP and an ADC for light-adaptive operation using $V_{REF}$ as described above. In this state, the MOS paired with the UVA PD continuously discharges the indoor ADM to prevent excessive charge buildup on the corresponding SC. In the absence of UVA radiation ($V_{UVA}$=LOW, S='0'), the 2:1 MUX output switches to the indoor ADM. An edge detector monitors the GPIO value and generates a wake-up signal (WuS) upon a rising (when the input goes from '0' to '1') or falling (when the input goes from '1' to '0') edge, corresponding to indoor-to-outdoor and outdoor-to-indoor switches, respectively. At every indoor/outdoor switching, a GPIO 'wake-up' event causes the CPU to discharge both ADMs, to update a 1-bit flag value ('0' for indoor and '1' for outdoor) that is passed to the user interface as an indicator of activation of the indoor or outdoor ADM, and to enter 'sleep' mode again. When a LPCOMP 'wake-up' event occurs, the CPU operates in the same manner as described in previous sections, and additionally transmits the first 1-bit of a flag value to the user interfaces. User interfaces check whether the most significant bit (MSB) of the received BLE data is '0' or '1' and project the exposure dose indoor (MSB='0') and outdoor (MSB='1'), respectively.

Figure 5C:
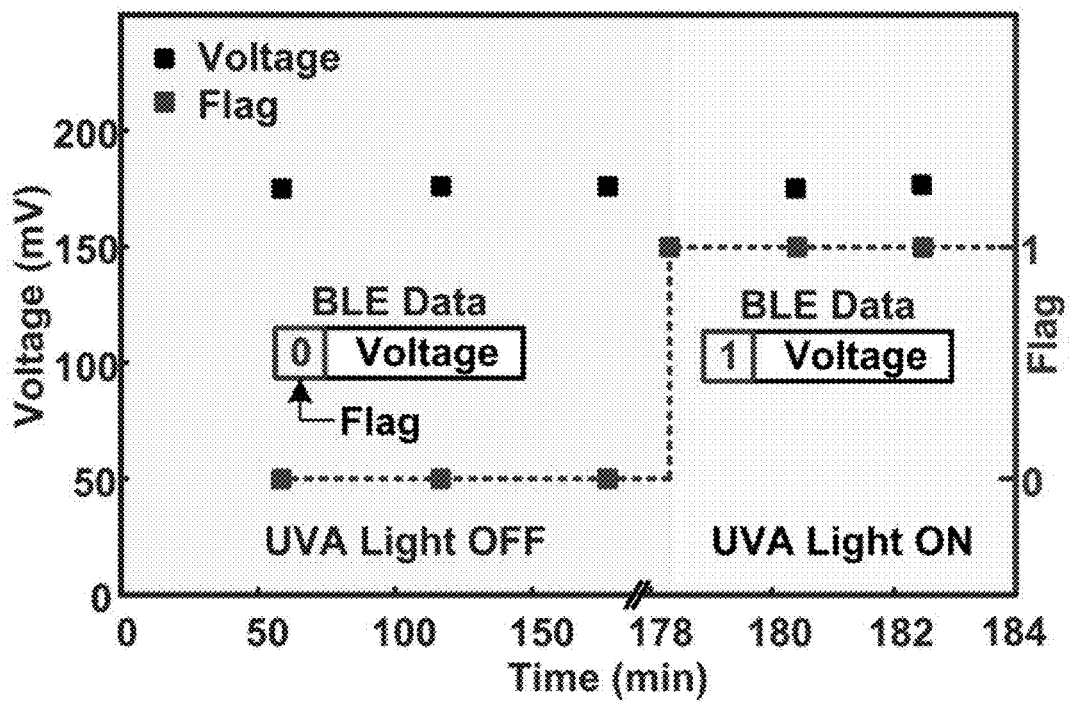
Figure 5D:
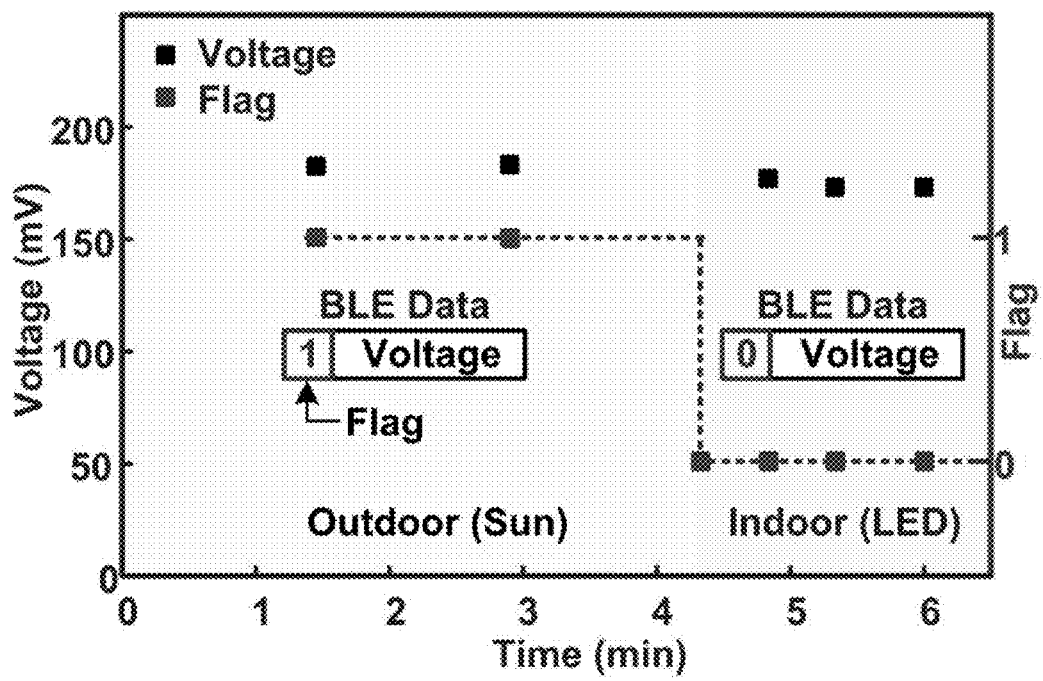

The voltage and MSB as a function of time without UVA exposure and with UVA exposure are in FIG. 5C. Here, dosimeters used the same blue PD for both outdoor and indoor circuits (FIG. 7) in order to illustrate the switching operation between ADMs of high or low detection sensitivity. In these experiments, a blue light lamp (Giraffe Blue Spot PT, GE Healthcare) exposes the devices to a constant intensity with and without UVA light (UVL-26, Analytik Jena). During periods without UVA, the device 'wakes-up' when the voltage output of the indoor ADM ($V_{SC0}$) exceeds 175.77±0.58 mV with a flag value of '0', and the $T_{wake}$ is 59.21±1.44 min. With the introduction of UVA, the device 'wakes-up' and updates the flag value of '1' to the user interface. During periods of UVA exposure, the device 'wakes-up' when the voltage output of the indoor ADM ($V_{SC1}$) exceeds 175.95±1.06 mV with a flag value of '1', and the $T_{wake}$ is 2.07 min. This operation is consistent with a 29 times higher sensitivity for the indoor ADM compared to the outdoor ADM. Demonstration of a blue light dosimeter with automated switching in real-life exposure conditions is in FIG. 5D. Here, sunlight outdoors and a 60-LED ring light indoors serve as sources of exposure, as a BLE-enabled phone wirelessly acquires $V_{SC0}$ or $V_{SC1}$ and a 1-bit flag output. Blue light/UVA intensity from the sun and from the LED lights measured with photometers are 9.8/3.6 mW/cm² and 2.5/0 mW/cm², respectively. During outdoor testing, the device 'wakes-up' when $V_{SC1}$ exceeds 183.13±0.38 mV with a flag value of '1' and a constant $T_{wake}$ of 1.45 min for an exposure dose of 853 mJ/cm². When indoors, UVA is absent and the device wakes up and updates the flag value of '0'. During indoor testing, the device wakes up when $V_{SC0}$ exceeds 174.57±2.19 mV with a flag value of '0' and shows $T_{wake}$ of 29.67±0.58 s for an exposure dose of 74 mJ/cm². The results show 11.5 times higher sensitivity for indoor ADM compared to outdoor ADM. This discrepancy is attributed to the drastic differences in the emission spectra near 390 nm between the two exposure sources.

Figure 6D:
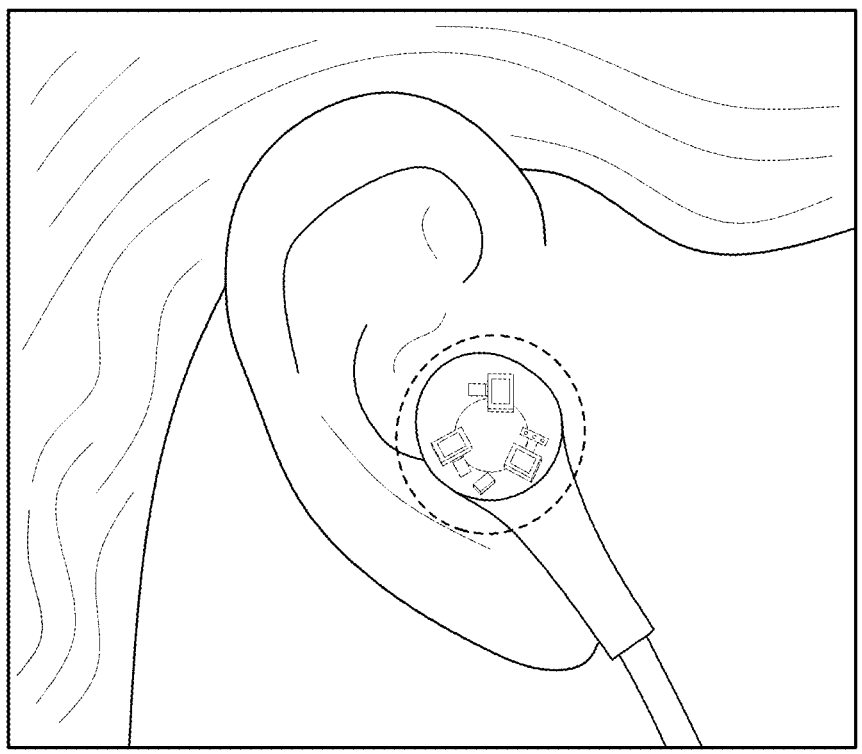
Figure 13:
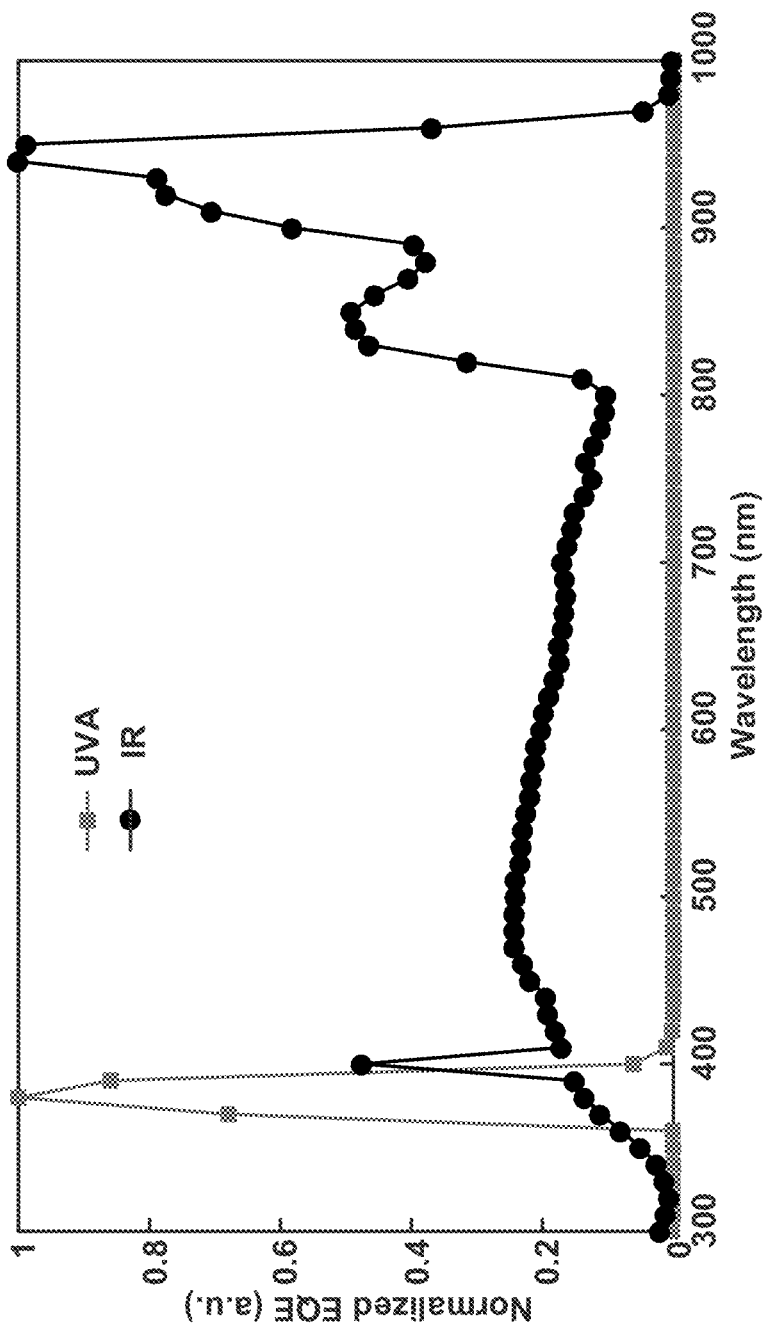
FIG. 13 shows external quantum efficiency (EQE) of UVA PD and IR PD, according to embodiments of the invention.

Multichannel Dosimeters for Wavelengths in UVA, Blue, and IR Regions of the Solar Spectrum The underlying designs and operating principles can be easily extended to allow simultaneous dosimetry at up to seven different wavelength bands across the solar spectrum, from the UV to VIS and infrared (IR). A 3-channel device shown in FIG. 6A measures exposure dose at UVA, blue, and IR with an estimated operating lifetime of 8.8 years for outdoors using the same exposure assumptions previously. Here, the diameter and thickness are 13.5 mm and 3.92 mm, respectively. The components include a UVA PD, a blue PD, an IR PD, three 11.5 mF SCs, three MOSFETs, a BLE SoC, and a 40 mAh battery (FIG. 6B). The peak response wavelengths of UVA and IR PDs are 380 nm and 940 nm, respectively (FIG. 13). The circuit configuration (FIG. 6C) exploits three separate ADCs on the BLE SoC, each connected to separate ADMs. Here, the LPCOMP monitors the ADC associated with the blue light sensing system (CH1), such that device enters 'run' mode and wirelessly transmits all three ADC values when $V_{SC}$ of CH1 exceeds $V_{REF}$. Blue light is chosen as a parameter to trigger a 'wake-up' event. The gates of the three MOSFETs connect to a single GPIO to allow simultaneous discharge of all three SCs following a 'wake-up' event. An example of a three-channel dosimeter mounted on earphones is in FIG. 6D.

Data collected under these conditions and wirelessly transmitted to a smartphone are in FIGS. 6E-6G. Nine 'wake-up' events occur in the morning, and $T_{wake}$ decreases from 12.28 min to 4 min during sunrise. The measured doses of blue and UVA during the morning exposure are 13.5 J/cm² and 4.5 J/cm², respectively. Measurements around noon involve 27 'wake-up' events, and $T_{wake}$ remains approximately constant at 2.16±0.07 min. The exposure doses of blue and UVA during noon are 40.5 J/cm² and 11.8 J/cm², respectively. In the afternoon, there are 15 'wake-up' events. The $T_{wake}$ increases from 3.25 min to 5.45 min during sunset with total blue and UVA doses of 22.5 J/cm² and 7.1 J/cm², respectively. FIGS. 14A-14D show results from a field-test using a 2-channel device to measure UVA and blue light exposure outdoors over 4 days (July 25-July 26, July 31-August 1; Evanston, IL). The cumulate doses of UVA/blue light on July 25, July 26, July 31, and August 1 from 5:30 AM to 1:30 PM are 15.31/76.5 J/cm2, 13.02/61.5 J/cm2, 34.64/123.0 J/cm2, and 33.02/115.5 J/cm2, respectively.

The combined use of adaptive circuit designs and accumulation detection schemes provide the foundations for compact, wireless digital platforms capable of continuous monitoring of EMR exposure at a personalized level, across one or multiple wavelengths in an autonomous mode that adjusts continuously to surrounding conditions. These highly accurate, millimeter-scale systems function in an always-on state, with multi-year lifetimes that can be considered, in a practical sense, to be everlasting for most envisioned applications. Automatic reporting of exposure data via far-field wireless links to standard consumer electronic devices serves as the basis for information that can be used to guide healthy behaviors. These technical capabilities, taken together with a negligible user burden associated with data acquisition, power management, battery replenishment and wearability, represent an ideal collection of features. Alignment with low-cost, volume manufacturing suggest a potential for scaled deployment to help prevent risks of skin cancer, mood disorders, ocular damage and other conditions associated with EM radiation exposure.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various non-patent literature publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

LIST OF REFERENCES

[1]. A. C. Green, S. C. Wallingford, P. McBride, Childhood exposure to ultraviolet radiation and harmful skin effects: epidemiological evidence. *Progress in Biophysics and Molecular Biology* 107, 349-355 (2011).

[2]. B. K. Armstrong, A. Kricker, The epidemiology of UV induced skin cancer. *J. Photochemistry and Photobiology B: Biology* 63, 8-18 (2001).

[3]. J. D'Orazio, S. Jarrett, A. Amaro-Ortiz, T. Scott, UV radiation and the skin. *Int. J. Molecular Sci.* 14, 12222-12248 (2013).

[4]. G. P. Guy Jr, S. R. Machlin, D. U. Ekwueme, K. R. Yabroff, Prevalence and costs of skin cancer treatment in the US, 2002-2006 and 2007-2011. *American J. Preventive Med.* 48, 183-187 (2015).

[5]. F. Liebel, S. Kaur, E. Ruvolo, N. Kollias, M. D. Southall, Irradiation of skin with visible light induces reactive oxygen species and matrix-degrading enzymes. *J. Investigative Dermatology* 132, 1901-1907 (2012).

[6]. Y. Nakashima, S. Ohta, A. M. Wolf, Blue light-induced oxidative stress in live skin. *Free Radical Biology and Med.* 108, 300-310 (2017).

[7]. C. Regazzetti, L. Sormani, D. Debayle, F. Bernerd, M. K. Tulic, G. M. De Donatis, B. Chignon-Sicard, S. Rocchi, T. Passeron, Melanocytes sense blue light and regulate pigmentation through opsin-3. *J. Investigative Dermatology* 138, 171-178 (2018).

[8]. W. Noell, W. Walker, B. Kang, S. Berman, Retinal damage by visible light. *Invest Ophthalmol* 5, 450-473 (1966).

[9]. W. K. Noell, Possible mechanisms of photoreceptor damage by light in mammalian eyes. *Vision Res.* 20, 1163-1171 (1980).

[10]. F. Behar-Cohen, C. Martinsons, F. Viénot, G. Zissis, A. Barlier-Salsi, J. P. Cesarini, O. Enouf, M. Garcia, S. Picaud, D. Attia, Light-emitting diodes (LED) for domestic lighting: Any risks for the eye? *Progress in Retinal and Eye Res.* 30, 239-257 (2011).

[11]. A. King, E. Gottlieb, D. G. Brooks, M. P. Murphy, J. L. Dunaief, Mitochondria-derived reactive oxygen species mediate blue light-induced death of retinal pigment epithelial cells. *Photochemistry and Photobiology* 79, 470-475 (2004).

[12]. B. F. Godley, F. A. Shamsi, F. Q. Liang, S. G. Jarrett, S. Davies, M. Boulton, Blue light induces mitochondrial DNA damage and free radical production in epithelial cells. *J. Biological Chemistry* 280, 21061-21066 (2005).

[13]. C. I. Eastman, Natural summer and winter sunlight exposure patterns in seasonal affective disorder. *Physiology & Behavior* 48, 611-616 (1990).

[14]. Y. Shi, M. Manco, D. Moyal, G. Huppert, H. Araki, A. Banks, H. Joshi, R. McKenzie, A. Seewald, G. Griffin, E. Sen-Gupta, D. Wright, P. Bastien, F. Valceschini, S. Seité, J. A. Wright, R. Ghaffari, J. Rogers, G. Balooch, R. M. Pielak, Soft, stretchable, epidermal sensor with integrated electronics and photochemistry for measuring personal UV exposures. *PloS one* 13, e0190233 (2018).

[15]. J. Heydenreich, H. C. Wulf, Miniature personal electronic UVR dosimeter with erythema response and time-stamped readings in a wristwatch. *Photochemistry and Photobiology* 81, 1138-1144 (2005).

[16]. S. Y. Heo, J. Kim, P. Gutruf, A. Banks, P. Wei, R. Pielak, G. Balooch, Y. Shi, H. Araki, D. Rollo, C. Gaede, M. Patel, J. W. Kwak, A. E. Peña-Alcántara, K.-T. Lee, Y. Yun, J. K. Robinson, S. Xu, J. A. Rogers, Wireless, battery-free, flexible, miniaturized dosimeters monitor exposure to solar radiation and to light for phototherapy. *Sci. Transl. Med.* 10, eaau1643 (2018).

[17]. A. Magnusson, D. Boivin, Seasonal affective disorder: an overview. *Chronobiology Int.* 20, 189-207 (2003).

[18]. G. Glickman, B. Byrne, C. Pineda, W. W. Hauck, G. C. Brainard, Light therapy for seasonal affective disorder with blue narrow-band light-emitting diodes (LEDs). *Biological Psychiatry* 59, 502-507 (2006).

[19]. D. F. Kripke, Light treatment for nonseasonal depression: speed, efficacy, and combined treatment. *J. Affective Disorders* 49, 109-117 (1998).

[20]. C. E. Remé, A. Wirz-Justice, M. Terman, The visual input stage of the mammalian circadian pacemaking system: I. Is there a clock in the mammalian eye? *J. Biological Rhythms* 6, 5-29 (1991).

[21]. A. Wirz-Justice, P. Graw, K. Kräuchi, A. Sarrafzadeh, J. English, J. Arendt, L. Sand, 'Natural' light treatment of seasonal affective disorder. *J. Affective Disorders* 37, 109-120 (1996).

What is claimed is:

1. A system for measuring a radiant exposure of electromagnetic radiation, comprising:
an accumulation detection module (AMD) configured to continuously monitor an exposure dose of the electromagnetic radiation, wherein the AMD comprises a detector configured to receive the electromagnetic radiation and generate a current responsively; an accumulation component connected in parallel to the detector and configured to receive the current generated by the detector and store electric charges corresponding to the generated current; and a discharge component connected in parallel to the detector and the accumulation component and configured to operably discharge the electric charges stored in the accumulation component;
a system-powered transmission component configured to transmit exposure dose information to a remote device; and
an adaptive circuit in electrical communication with the ADM and the system-powered transmission component and configured to periodically interrogate the ADM and adjust a frequency of interrogation of the AMD based on intensity of the electromagnetic radiation received by the detector, wherein the adaptive circuit comprises a trigger component configured to monitor a voltage across the accumulation component and generate a wake up signal when the voltage is equal to or greater than a predefined threshold voltage; at least one analog to digital converter (ADC) configured to translate the voltage into a digital input; and a processor configured to receive the wake up signal from the trigger component and in response:
interrogate the voltage of the AMD via said at least one ADC;
translate the digital output from said at least one ADC into the exposure dose information;
transmit the exposure dose information to a remote device via the system-powered transmission component; and
discharge the accumulation component via the discharge component.

2. The system of claim 1, wherein the detector comprises at least one photodiode.

3. The system of claim 1, wherein the accumulation component comprises at least one capacitor.

4. The system of claim 1, wherein the discharge component comprises at least one transistor.

5. The system of claim 1, wherein the trigger component comprises at least one comparator.

6. The system of claim 1, wherein the ADM is configured to independently monitor the exposure dose of two or more wavelength ranges of the electromagnetic radiation.

7. The system of claim 6, wherein said at least one photodiode comprises a plurality of photodiodes, each being responsive to a respective wavelength range of the electromagnetic radiation, wherein the ADM comprises a plurality of channels, each channel having a respective one of the plurality of photodiodes for measuring the exposure dose of said respective wavelength range of the electromagnetic radiation, and is coupled with the adaptive circuit so as to provide integration and/or transmission of the exposure dose.

8. The system of claim 7, wherein said two or more wavelength ranges of the electromagnetic radiation are selected from a UVA region, a UVB region, an UV region, a visible region, an infrared (IR) region, and any combinations of them.

9. The system of claim 1, wherein the ADM is configured to monitor the exposure dose of the electromagnetic radiation corresponding to two or more intensity domains.

10. The system of claim 9, wherein said two or more intensity domains correspond to an outdoor intensity domain and an indoor intensity domain.

11. The system of claim 10, wherein the ADM comprises an outdoor ADM and an indoor ADM for monitoring exposure dose of the electromagnetic radiation outdoors and indoors, respectively, coupled with the adaptive circuit so as to provide integration and/or transmission of the exposure dose, wherein said at least one photodiode comprises a plurality of photodiodes, and the outdoor ADM has one of the plurality of photodiodes, and the indoor ADM has the remaining photodiodes arranged in parallel.

12. The system of claim 11, wherein the indoor ADM and the outdoor ADM are paired with a UVA photodiode and a switch coupled with the adaptive circuit for operably switching the system between the indoor ADM and the outdoor ADM, based on the presence or absence of UVA radiation, wherein the presence or absence of the UVA radiation results in a high or low value of an output from the UVA photodiode, respectively.

13. The system of claim 1, wherein the adaptive circuit is configured to switch the system between:
a sleep mode, wherein when the system is in the sleep mode, the system operates at a first average current consumption; and
a wake mode, wherein when the system is in the wake mode, the system operates at a second average current consumption, wherein the second average current consumption is greater than the first average current consumption.

14. The system of claim 13, wherein the second average current consumption is at least 2 times the first average current consumption.

15. The system of claim 14, wherein the second average current consumption is not greater than 15 µA and the first average current consumption is not greater than 1 µA.

16. The system of claim 13, wherein the system is configured to transmit the exposure dose information to the remote device only when the system is in the wake mode.

17. The system of claim 16, wherein the system is configured to transmit exposure dose information each time when the system switches to the wake mode.

18. The system of claim 1, wherein the system-powered transmission component is powered by one or more on-board batteries.

19. The system of claim 18, wherein the one or more batteries are wiredly or wirelessly rechargeable batteries.

20. The system of claim 18, wherein the system-powered transmission component comprises a wireless transmission component.

21. The system of claim 20, wherein the system-powered transmission component comprises a Bluetooth® low energy (BLE) component.

22. The system of claim 1, being configured as a wearable dosimetry sensor, a skin-mounted dosimetry sensor, a millimeter-scale dosimetry sensor, an autonomous dosimetry sensor, and/or a system-powered dosimetry sensor.

23. A system for measuring a radiant exposure of electromagnetic radiation, comprising:
an accumulation detection module (ADM) comprising a detector and configured to continuously monitor an electromagnetic radiation received by the detector; and
an adaptive circuit configured to periodically interrogate the ADM; adjust a frequency of interrogation of the ADM based on an intensity of the electromagnetic radiation received by the detector; and autonomously transmit information related to an amount of the electromagnetic radiation received by the detector to a remote device,
wherein the adaptive circuit is configured to increase the frequency of interrogation based on an increase in the intensity of the electromagnetic radiation, or decrease the frequency of interrogation based on a decrease in the intensity of the electromagnetic radiation; and
wherein the adaptive circuit is configured to switch the system between:
a sleep mode, wherein when the system is in the sleep mode, the system operates at a first average current consumption; and
a wake mode, wherein when the system is in the wake mode, the system operates at a second average current consumption, wherein the second average current consumption is greater than the first average current consumption.

24. The system of claim 23, wherein the second average current consumption is at least 2 times the first average current consumption.

25. The system of claim 24, wherein the second average current consumption is not greater than 15 µA and the first average current consumption is not greater than 1 µA.

26. The system of claim 23, wherein the system is configured to transmit exposure dose information to the remote device only when the system is in the wake mode.

27. The system of claim 26, wherein the system is configured to transmit exposure dose information each time when the system switches to the wake mode.

28. The system of claim 23, wherein the accumulation component is configured to accumulate the information until it reaches a saturation limit, and wherein the adaptive circuit comprises:
a trigger component configured to monitor the accumulation component as it accumulates the information; and generate a wake up signal when the information accumulated by the accumulation component reaches a predefined threshold level, wherein the threshold level is below the saturation limit.

29. The system of claim 28, wherein the trigger component is configured to monitor the accumulation component via an analog signal of the ADM.

30. The system of claim 29, wherein the analog signal is a voltage.

31. The system of claim 29, wherein the trigger component is configured to convert the analog signal of the ADM to a digital signal.

32. The system of claim 29, wherein the trigger component comprises a comparator.

33. The system of claim 28, wherein the adaptive circuit further comprises:
at least one analog to digital converter (ADC) configured to receive an analog signal of the accumulation detection module; and
a processor configured to interrogate the ADM via said at least one ADC to produce exposure dose output; and transmit the exposure dose output to the remote device.

34. A system for measuring a radiant exposure of electromagnetic radiation, comprising:
an accumulation detection module (ADM) comprising a detector and configured to continuously monitor an electromagnetic radiation received by the detector;
an adaptive circuit configured to periodically interrogate the ADM; adjust a frequency of interrogation of the ADM based on an intensity of the electromagnetic radiation received by the detector; and autonomously transmit information related to an amount of the electromagnetic radiation received by the detector to a remote device; and
a system-powered transmission component in electrical communication with the adaptive circuit such that the exposure dose information is transmitted the remote device via the system-powered transmission component.

35. The system of claim 34, wherein the system-powered transmission component is a wireless transmission component.

36. The system of claim 35, wherein the system-powered transmission component is a Bluetooth® low energy (BLE) component.

37. The system of claim 34, wherein the system-powered transmission component is powered by one or more on-board batteries.

38. The system of claim 37, wherein the one or more batteries are wiredly or wirelessly rechargeable batteries.

39. A method for measuring a radiant exposure of electromagnetic radiation, comprising:
(a) receiving the electromagnetic radiation;
(b) accumulating exposure dose information of the electromagnetic radiation;
(c) comparing the exposure dose information to a predefined threshold level;
(d) generating a wake up signal when the exposure dose information is equal to or greater than the predefined threshold level;
(e) transmitting, responsively to the wake up signal, the exposure dose information to a remote device; and
(f) erasing the exposure dose information, and returning to a sleep mode and repeating steps (a)-(e) for continuously monitoring the radiant exposure of the electromagnetic radiation.

40. The method of claim 39, wherein the accumulating step is performed with an accumulation detection module (AMD) comprising a detector for generating a current responsive to the exposure of the electromagnetic radiation; an accumulation component for receiving the generated current and storing a charge responsively; and a discharge component.

41. The method of claim 40, wherein the erasing step comprises discharging the accumulation component via the discharge component.

42. The method of claim 40, further comprising, prior to the transmitting step, interrogating the exposure dose information from the AMD.

43. The method of claim 39, further comprising repeating steps (a)-(b) when the exposure dose information is less than the predefined threshold level.

44. A non-transitory tangible computer-readable medium storing instructions which, when executed by one or more processors, cause the method of claim 39 to be performed.

* * * * *